(12) United States Patent
Yoshizawa et al.

(10) Patent No.: US 10,725,391 B2
(45) Date of Patent: Jul. 28, 2020

(54) ELECTROPHOTOGRAPHIC PHOTORECEPTOR AND IMAGE FORMING APPARATUS

(71) Applicant: Mitsubishi Chemical Corporation, Chiyoda-ku (JP)

(72) Inventors: Atsushi Yoshizawa, Kanagawa (JP); Mitsuo Wada, Kanagawa (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 27 days.

(21) Appl. No.: 15/713,126

(22) Filed: Sep. 22, 2017

(65) Prior Publication Data

US 2018/0011412 A1 Jan. 11, 2018

Related U.S. Application Data

(63) Continuation of application No. PCT/JP2016/059263, filed on Mar. 23, 2016.

(30) Foreign Application Priority Data

Mar. 23, 2015 (JP) .................................. 2015-060011
Mar. 26, 2015 (JP) .................................. 2015-064865
(Continued)

(51) Int. Cl.
*G03G 5/05* (2006.01)
*C08G 63/193* (2006.01)
*G03G 5/147* (2006.01)

(52) U.S. Cl.
CPC ......... *G03G 5/0567* (2013.01); *C08G 63/193* (2013.01); *G03G 5/056* (2013.01);
(Continued)

(58) Field of Classification Search
CPC .. G03G 5/0567; G03G 5/056; G03G 5/14752; G03G 5/14756; G03G 5/0564; C08G 63/193
See application file for complete search history.

(56) References Cited

U.S. PATENT DOCUMENTS

| 4,156,069 A | 5/1979 | Prevorsek et al. |
| 2003/0139564 A1 | 7/2003 | Kratschmer et al. |

(Continued)

FOREIGN PATENT DOCUMENTS

| CN | 1412219 A | 4/2003 |
| JP | 52-128992 A | 10/1977 |

(Continued)

OTHER PUBLICATIONS

International Search Report dated Jun. 21, 2016 in PCT/JP2016/059263 filed Mar. 23, 2016 (with English Translation).
(Continued)

*Primary Examiner* — John E Uselding
(74) *Attorney, Agent, or Firm* — Oblon, McClelland, Maier & Neustadt, L.L.P.

(57) ABSTRACT

The present invention relates to an electrophotographic photoreceptor comprising: a conductive support; and a photosensitive layer disposed on the conductive support, wherein the photosensitive layer includes a polyester resin containing a dihydric phenol residue and a dicarboxylic acid residue, and the dihydric phenol residue includes at least one dihydric phenol residue selected from the group of the specific dihydric phenol residues, and the other specific dihydric phenol residue.

16 Claims, 1 Drawing Sheet

(30) Foreign Application Priority Data

Oct. 28, 2015 (JP) ................................ 2015-212163
Nov. 30, 2015 (JP) ................................ 2015-233304

(52) U.S. Cl.
CPC ....... *G03G 5/0564* (2013.01); *G03G 5/14752* (2013.01); *G03G 5/14756* (2013.01)

(56) References Cited

U.S. PATENT DOCUMENTS

| | | |
|---|---|---|
| 2005/0002692 A1 | 1/2005 | Yao et al. |
| 2009/0047589 A1 | 2/2009 | Tajima et al. |
| 2011/0013278 A1 | 1/2011 | Hirayama et al. |

FOREIGN PATENT DOCUMENTS

| | | |
|---|---|---|
| JP | 56-14526 A | 2/1981 |
| JP | 03-6567 | 1/1991 |
| JP | 7-92709 A | 4/1995 |
| JP | 8-143655 A | 6/1996 |
| JP | 09-22126 | 1/1997 |
| JP | 10-20514 | 1/1998 |
| JP | 2001-265021 | 9/2001 |
| JP | 2002-311608 | 10/2002 |
| JP | 2003-119262 | 4/2003 |
| JP | 2004-294750 | 10/2004 |
| JP | 2005-24852 | 1/2005 |
| JP | 2006-52274 A | 2/2006 |
| JP | 2006-53549 | 2/2006 |
| JP | 2007-84650 | 4/2007 |
| JP | 2008-293006 | 12/2008 |
| JP | 2010-83986 | 4/2010 |
| JP | 2010-96929 A | 4/2010 |
| JP | 2014-157337 A | 8/2014 |
| WO | WO 2009/128325 A1 | 10/2009 |

OTHER PUBLICATIONS

Written Opinion dated Jun. 21, 2016 in PCT/JP2016/059263 filed Mar. 23, 2016.
Office Action dated Mar. 26, 2019 in corresponding Japanese Patent Application No. 2015-060011 (with English Translation), 9 pages.
Office Action dated Oct. 23, 2019 in Japanese Patent Application No. 2015-233304 (with unedited computer generated English translation), 11 pages.
Combined Office Action and Search Report dated May 5, 2019 in Chinese Patent Application No. 201680017656. 1 (with unedited computer generated English translation of the Office Action and English translation of category of cited documents), 11 pages.
Office Action dated Oct. 8, 2019 in corresponding Japanese Patent Application No. 2015-212163 (with English Translation), 6 pages.
Office Action as received in the corresponding Chinese Patent No. 201680017656.1 dated Mar. 31, 2020 w/English Translation.

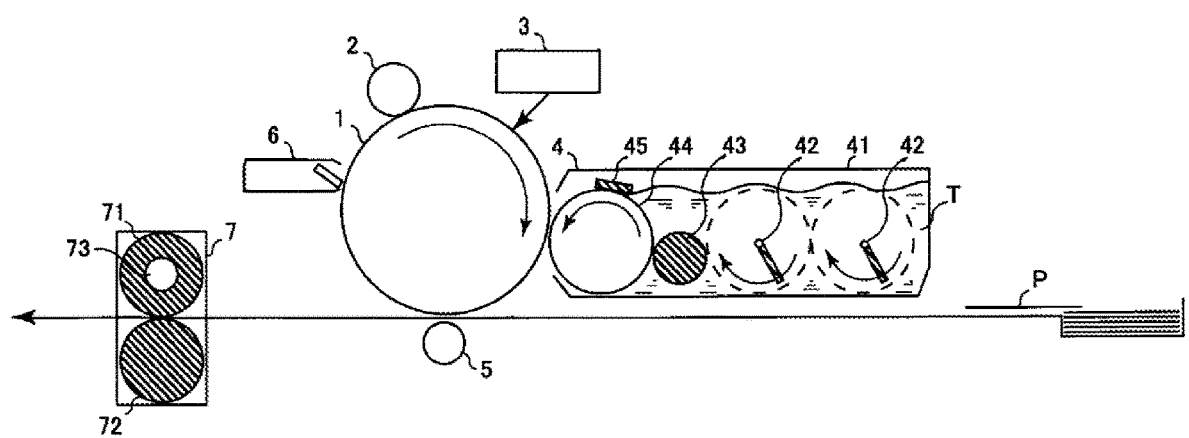

ELECTROPHOTOGRAPHIC PHOTORECEPTOR AND IMAGE FORMING APPARATUS

TECHNICAL FIELD

The present invention relates to an electrophotographic photoreceptor, and more particularly relates to an electrophotographic photoreceptor having an excellent wear resistance and electrical properties and an image forming apparatus. The present invention further relates to a resin included in the electrophotographic photoreceptor and a producing method of the same.

BACKGROUND ART

An electrophotographic photoreceptor is repeatedly used during an electrophotographic process, that is, in cycles of charging, exposure, developing, transfer, cleaning, neutralizing, and the like. Various stresses applied to the photoreceptor in the process degrade the photoreceptor. As examples of such degradations, there are chemical and electric degradations such as: chemical damages given to the photosensitive layer caused by strongly oxidizing ozone or NOx generated from a corona charging device, which is a charger usually used, and decomposition of the photosensitive layer composition caused by carrier (current) generated during image exposure period flowing within the photosensitive layer or light, e.g., neutralizing light and light from outside. There are also mechanical degradations such as occurrence of wears, scratches, and peeling-off of the film on the photosensitive layer surface, and the like, which are caused by rubbing of a cleaning blade or a magnetic brush, contacts with a developer or a paper or the like. Such damages accompanied with mechanical degradations are apt to appear on the image and directly impair quality of the image, and thus serve as one of the major reasons that limit the life of the photoreceptor.

A photosensitive layer in a typical photoreceptor, which does not include a functional layer (e.g. surface protect layer), is particularly vulnerable to these loads. A photosensitive layer usually includes a binder resin, which substantially determines the hardness of the layer, and a photoconductive substance. But a relatively high dope amount of the photoconductive substance has been an obstacle to achieving a sufficient mechanical strength of a photosensitive layer so far. As a binder resin for a photosensitive layer, polyester resins having excellent sensitivity and a wear resistance have recently been used (refer to PTL 1 to PTL 8).

Meanwhile, although there are various known producing methods of polyester resins, interfacial polymerization has widely been used to obtain high-molecular-weight, less-colored, and highly pure polyester resins. Unfortunately, in a case where a polyester resin is produced from, for example, a readily oxidizable monomer such as hydroquinone using an interfacial polymerization method, the monomer is promptly oxidized in an alkaline aqueous solution and becomes an oxidized form of the monomer such as quinone. Such an oxidized form shows poor reactivity with a dicarboxylic acid chloride, therefore, it is difficult to incorporate an intended amount thereof into the resin, and further, the oxidized form remaining in the resin causes coloration of the resin. A method for preventing such oxidation of monomers during polymerization has been studied, and a polymerization method in which an excessive amount of an antioxidant or the like is added is known (refer to PTL 9).

CITATION LIST

Patent Literature

[PTL 1] JP-A-3-6567
[PTL 2] JP-A-9-22126
[PTL 3] JP-A-10-20514
[PTL 4] JP-A-2001-265021
[PTL 5] JP-A-2004-294750
[PTL 6] JP-A-2005-24852
[PTL 7] JP-A-2006-53549
[PTL 8] JP-A-2008-293006
[PTL 9] JP-A-2010-83986

SUMMARY OF INVENTION

Technical Problem

However, through the investigation the present inventors have conducted, it has been found that the photoreceptors produced using a polyester resin by the techniques disclosed in PTLs 1 to 8 have insufficient mechanical strengths for a high-end model with a long-life and high-speed capable of printing 100,000 or more sheets. It has also been found that the polyester resins produced using the technique disclosed in PTL 6 exhibit an insufficient solubility, with which the polyester resins hardly dissolve in a coating fluid, or causing a coating fluid to gel within a few days. It has further been found that although the technique disclosed in PTL 9 allows production of polyester resins using readily oxidizable monomers, excessive use of antioxidants causes parts of the antioxidants to remain as an impurity in the polymerized resin, degrading the electrical properties thereof. Further, the oxygen in an aqueous solution needs to be precisely removed during the polymerization, which makes producing difficult in practice.

The present invention has been made in the consideration of the above problems. That is, an object of the present invention is to provide an electrophotographic photoreceptor excellent in wear resistance against practical loads and electrical properties by including a polyester resin having an excellent solubility, a wear resistance and electrical properties in a photosensitive layer. Another object of the present invention is to provide a polyester resin having an excellent solubility, a wear resistance, and electrical properties, and a process for producing the same.

Solution to Problem

The present inventors have found that, as a result of diligent investigation regarding an electrophotographic photoreceptor that can be a solution to the above problem, an electrophotographic photoreceptor having excellent mechanical properties, a high solubility with respect to the solvent used for a coating fluid for forming a photosensitive layer, excellent stability in the coating fluid, and excellent electrical properties can be obtained by incorporating a polyester resin having a specific chemical structure in the photosensitive layer, and have completed the present invention on the basis of such knowledge.

The present inventors diligently investigated a method capable of producing a polyester resin with which the above-mentioned difficulties can be solved. As a result, the present inventors have found that in producing the polyester resin, a polyester resin that exhibits excellent electrical properties, a solubility, and a wear resistance in a case of being included in an electrophotographic photoreceptor can be simply and easily obtained by causing the monomer thereof to form an ester oligomer as an intermediate and controlling the amount of residual carboxylic acid dichloride monomer in the ester oligomer. On the basis of such knowledge, the present inventors have completed the present invention.

That is, the gist of the invention resides in the following <1> to <8>.

<1> An electrophotographic photoreceptor comprising: a conductive support; and a photosensitive layer disposed on the conductive support, wherein the photosensitive layer includes a polyester resin containing a dihydric phenol residue and a dicarboxylic acid residue, and the dihydric phenol residue includes at least one dihydric phenol residue selected from the group of dihydric phenol residues represented by Formula (1) to Formula (3), and a dihydric phenol residue represented by Formula (4):

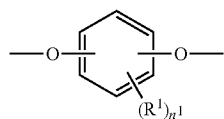

Formula (1)

(in Formula (1), $R^1$ represents any one of a hydrogen atom, an alkyl group having 1 to 20 carbon atoms which may have a substituent, an alkoxy group, an aromatic group that may be substituted, and a halogen group, and $n^1$ is an integer of 0 to 4)

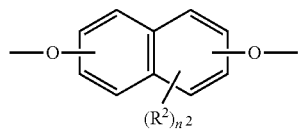

Formula (2)

(in Formula (2), $R^2$ represents any one of a hydrogen atom, an alkyl group having 1 to 20 carbon atoms which may have a substituent, an alkoxy group, an aromatic group that may be substituted, and a halogen group, and $n^2$ is an integer of 0 to 6)

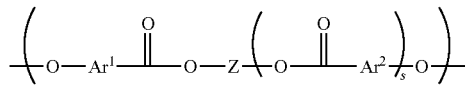

Formula (3)

(in Formula (3), $Ar^1$ and $Ar^2$ each independently represent an arylene group having 6 to 16 carbon atoms which may have a substituent; and Z is an arylene group that may have a substituent, and s is an integer of 0 or 1)

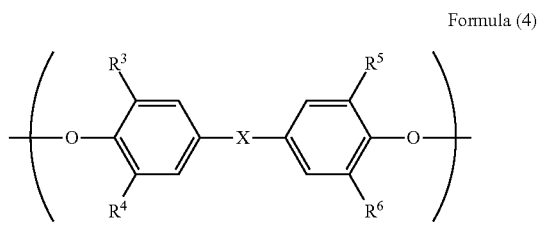

Formula (4)

(in Formula (4), $R^3$ to $R^6$ each independently represent any one of a hydrogen atom, an alkyl group having 1 to 20 carbon atoms which may have a substituent, an alkoxy group, an aromatic group that may be substituted, and a halogen group; X represents a single bond, —$CR^7R^8$—, O, CO, or S; and $R^7$ and $R^8$ each independently represent a hydrogen atom or an alkyl group having 1 to 10 carbon atoms, or $R^7$ and $R^8$ represent a cycloalkylidene group having 5 to 10 carbon atoms and formed by bonding $R^7$ and $R^8$).

<2> The electrophotographic photoreceptor according to the <1> above, wherein the content of the at least one dihydric phenol residue selected from the group of dihydric phenol residues represented by Formula (1) to Formula (3) is 5 to 80 mol % with respect to the entire dihydric phenol residue in the polyester resin.

<3> The electrophotographic photoreceptor according to the <1> or <2> above, wherein the dicarboxylic acid residue in the polyester resin is a dicarboxylic acid residue represented by Formula (5):

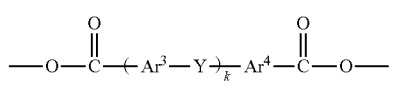

Formula (5)

(in Formula (5), $Ar^3$ and $Ar^4$ each independently represent an arylene group that may have a substituent; Y represents a single bond, an oxygen atom, a sulfur atom, a divalent organic residue having a structure represented by Formula (6) or Formula (7); $R^9$ and $R^{10}$ in Formula (6) each independently represent a hydrogen atom, an alkyl group, or an aryl group, or a cycloalkylidene group formed by bonding $R^9$ and $R^{10}$; $R^{11}$ in Formula (7) is an alkylene group, an arylene group, or a group represented by Formula (8); $R^{12}$ and $R^{13}$ in Formula (8) each independently represent an alkylene group, and $Ar^5$ represents an arylene group; and k represents an integer of 0 to 5)

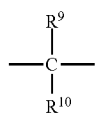

Formula (6)

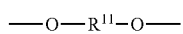

Formula (7)

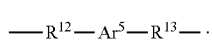

Formula (8)

<4> A method for producing a polyester resin containing a repeating unit represented by Formula (1a) and a repeating unit represented by Formula (2a), the method comprising: polymerizing a dihydric phenol represented by Formula ($4a_1$) and a dicarboxylic acid chloride represented by Formula (5a) to obtain an ester oligomer; and polymerizing the ester oligomer to obtain the polyester resin, wherein the residual amount of the dicarboxylic acid chloride monomer represented by Formula (5a) in the ester oligomer satisfies Expression (6a):

Formula (1a)

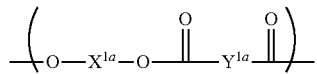

Formula (2a)

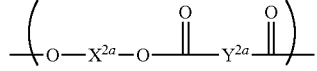

(in Formula (1a), $X^{1a}$ is a divalent group represented by Formula (3a), and $Y^{1a}$ is a divalent group; and in Formula (2a), $X^{2a}$ is a group having a divalent aromatic group that is not the same group as $X^{1a}$; and $Y^{2a}$ is a divalent group)

Formula (3a)

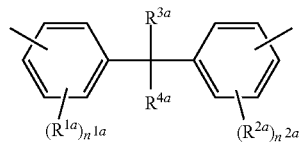

(in Formula (3a), $R^{1a}$ and $R^{2a}$ each independently represent any one of a hydrogen atom, an alkyl group having 1 to 20 carbon atoms which may have a substituent, an alkoxyl group, and an aromatic group that may be substituted, and $n^{1a}$ and $n^{2a}$ each are an integer of 0 to 4; and $R^{3a}$ and $R^{4a}$ each independently represent a hydrogen atom, an alkyl group having 1 to 20 carbon atoms, an aromatic group that may have a substituent, or a group having a ring structure that may have a substituent and formed by bonding $R^{3a}$ and $R^{4a}$ to each other)

Formula (4a₁)

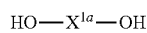

Formula (5a)

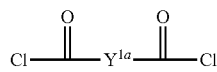

$$\frac{\text{Residual dicarboxylicacid chloride monomer (mol)}}{\text{Feed dicarboxylic acid chloride monomer (mol)}} \leq 0.20.$$

<5> A method for producing a polyester resin, comprising: carrying out polymerization by an interfacial polymerization method using at least one kind of ester oligomer as a starting material.
<6> The method for producing a polyester resin according to the <5> above, wherein the ester oligomer is obtained by a solution polymerization method or a melt polymerization method.
<7> The method for producing a polyester resin according to any one of the <4> to <6> above, wherein the polyester resin is obtained by polymerizing a dihydric phenol residue and a dicarboxylic acid residue, and the dihydric phenol residue includes at least one dihydric phenol residue selected from the group of dihydric phenol residues represented by the Formula (1) to the Formula (3), and a dihydric phenol residue represented by the Formula (4).
<8> A polyester resin comprising: a dihydric phenol residue; and a dicarboxylic acid residue, wherein the dihydric phenol residue includes at least one dihydric phenol residue selected from the group of dihydric phenol residues represented by Formula (1) to Formula (3), and a dihydric phenol residue represented by Formula (4):

Formula (1)

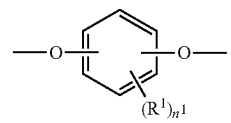

(in Formula (1), $R^1$ represents any one of a hydrogen atom, an alkyl group having 1 to 20 carbon atoms which may have a substituent, an alkoxy group, an aromatic group that may be substituted, and a halogen group, and $n^1$ is an integer of 0 to 4)

Formula (2)

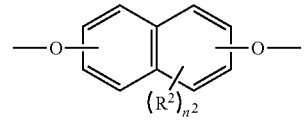

(in Formula (2), $R^2$ represents any one of a hydrogen atom, an alkyl group having 1 to 20 carbon atoms which may have a substituent, an alkoxy group, an aromatic group that may be substituted, and a halogen group, and $n^2$ is an integer of 0 to 6)

Formula (3)

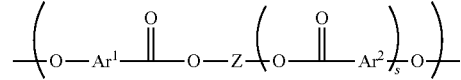

(in Formula (3), $Ar^1$ and $Ar^2$ each independently represent an arylene group having 6 to 16 carbon atoms which may have a substituent, and Z is an arylene group that may have a substituent, and s is an integer of 0 or 1)

Expression (6a)

Formula (4)

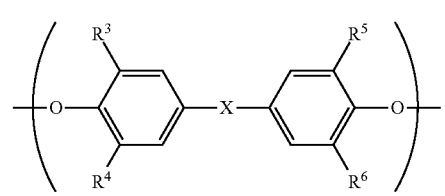

(in Formula (4), $R^3$ to $R^6$ each independently represent any one of a hydrogen atom, an alkyl group having 1 to 20 carbon atoms which may have a substituent, an alkoxy group, an aromatic group that may be substituted, and a halogen group; X represents a single bond, —$CR^7R^8$—, O, CO, or S; and $R^7$ and $R^8$ each independently represent a hydrogen atom or an alkyl group having 1 to 10 carbon atoms, or $R^7$ and $R^8$ represent a cycloalkylidene group having 5 to 10 carbon atoms and formed by bonding $R^7$ and $R^8$).

Advantageous Effects of Invention

According to the present invention, an electrophotographic photoreceptor having a particularly excellent wear resistance and excellent electrical properties can be obtained. A polyester resin having a particularly excellent solubility and a wear resistance can also be obtained.

BRIEF DESCRIPTION OF DRAWINGS

FIGURE is a schematic diagram showing an example of an image forming apparatus using an electrophotographic photoreceptor of the present invention.

DESCRIPTION OF EMBODIMENTS

Hereinafter, embodiments of the present invention are described in detail. The present invention is not limited thereto, and various modifications can be made within the scope of the gist of the invention.

<<Polyester Resin of First Embodiment>>

A photosensitive layer of an electrophotographic photoreceptor to which this embodiment is applied contains a polyester resin including at least one dihydric phenol residue selected from the dihydric phenol residues represented by Formulae (1) to (3).

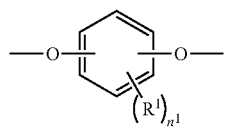

Formula (1)

In formula (1), $R^1$ represents a hydrogen atom, an alkyl group having 1 to 20 carbon atoms which may have a substituent, an alkoxy group having 1 to 20 carbon atoms which may have a substituent, an aromatic group having 1 to 20 carbon atoms which may have a substituent, or a halogen group, and $n^1$ represents an integer of 0 to 4.

The number of carbon atoms referred to here is the number of carbon atoms in the entire group including a substituent. Examples of the substituent of $R^1$ include an alkyl group, an alkoxy group, and a halogen atom, but $R^1$ preferably does not have a substituent.

Specific examples of the alkyl group having 1 to 20 carbon atoms which may have a substituent include a methyl group, an ethyl group, a propyl group, an isopropyl group, a butyl group, a tert-butyl group, an isobutyl group, a cyclohexyl group, a chloromethyl group, a fluorinated alkyl group, a trifluoromethyl group, and a perfluoroalkyl group.

Specific examples of the alkoxy group having 1 to 20 carbon atoms which may have a substituent include a methoxy group, an ethoxy group, a propoxy group, and a cyclohexoxy group. Examples of the aromatic group having 1 to 20 carbon atoms which may have a substituent include a phenyl group, a methylphenyl group, a dimethylphenyl group, a halogenated phenyl group, and a naphthyl group.

Specific examples of the halogen group include a fluorine group, a chloro group, and a bromo group. From the standpoint of wear resistance, $R^1$ is preferably an alkyl group having 1 to 6 carbon atoms, an alkoxy group having 1 to 6 carbon atoms, or an unsubstituted aromatic group, and particularly preferably a methyl group, or an ethyl group. $n^1$'s each independently are an integer of 0 to 4, and preferably satisfy $n^1=0$ or 1 from the standpoint of ease of production.

Specific examples of the dihydric phenol compound from which the dihydric phenol residue represented by Formula (1) is derived include hydroquinone, methylhydroquinone, chlorohydroquinone, tert-butylhydroquinone, bromohydroquinone, 2,3-dimethylhydroquinone, 2,5-dimethylhydroquinone, trimethylhydroquinone, phenylhydroquinone, resorcinol, 2-methylresorcinol, 5-methylresorcinol, 5-bromoresorcinol, catechol, and 4-methylcatechol. Among them, the dihydric phenol compound is particularly preferably hydroquinone, methylhydroquinone, 2,3-dimethylhydroquinone, 2,5-dimethylhydroquinone, trimethylhydroquinone, or resorcinol from the standpoint of ease of production and wear resistance.

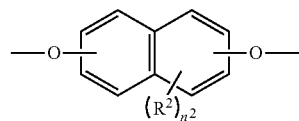

Formula (2)

In Formula (2), $R^2$ represents any one of a hydrogen atom, an alkyl group having 1 to 20 carbon atoms which may have a substituent, an alkoxy group having 1 to 20 carbon atoms which may have a substituent, and an aromatic group having 1 to 20 carbon atoms which may have a substituent, or a halogen group, and $n^2$ represents an integer of 0 to 6.

The number of carbon atoms referred to here is the number of carbon atoms in the entire group including a substituent. Examples of the substituent of $R^2$ include an alkyl group, an alkoxy group, and a halogen atom, but $R^2$ preferably does not have a substituent. As specific examples of the respective groups as $R^2$, those listed in the description of $R^1$ can be mentioned. From the standpoint of wear resistance, $R^2$ is preferably an alkyl group having 1 to 6 carbon atoms or an alkoxy group having 1 to 6 carbon atoms, and particularly preferably a methyl group or an ethyl group. $n^2$'s each independently are an integer of 0 to 4, and preferably satisfy $n^2=0$ from the standpoint of ease of production.

Specific examples of the dihydric phenol compound from which the dihydric phenol residue represented by Formula (2) is derived include 1,2-dihydroxynaphthalene, 1,3-dihydroxynaphthalene, 1,5-dihydroxynaphthalene, 1,6-dihydroxynaphthalene, 1,7-dihydroxynaphthalene, 2,3-dihydroxynaphthalene, 2,6-dihydroxynaphthalene, and 2,7-dihydroxynaphthalene. Among these, from the standpoint of ease of production and solubility, the dihydric phenol compound is preferably 1,6-dihydroxynaphthalene, 1,7-dihydroxynaphthalene, 2,6-dihydroxynaphthalene or 2,7-dihydroxynaphthalene; and from the standpoint of wear resistance, particularly preferably 2,6-dihydroxynaphthalene or 2,7-dihydroxynaphthalene.

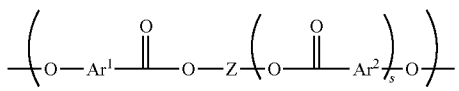

Formula (3)

In Formula (3), $Ar^1$ and $Ar^2$ each independently represent an arylene group having 6 to 16 carbon atoms which may have a substituent. Z represents an arylene group that may have a substituent, and s is an integer of 0 or 1.

Specific examples of the arylene group that may have a substituent for $Ar^1$ and $Ar^2$ in Formula (3) include a phenylene group, a naphthylene group, an anthrylene group, a phenanthrylene group, a pyrenylene group, and a biphenylene group. From the standpoint of ease of production, $Ar^1$ and $Ar^2$ are preferably a phenylene group.

Examples of the substituent include an alkyl group having 1 to 10 carbon atoms, an alkoxy group having 1 to 10 carbon atoms, a halogenated alkyl group, a halogen group, and a benzyl group.

Specific examples of the alkyl group include a methyl group, an ethyl group, a propyl group, an isopropyl group, a butyl group, a tert-butyl group, an isobutyl group and a cyclohexyl group.

Specific examples of the alkoxy group include a methoxy group, an ethoxy group, a propoxy group, and a cyclohexoxy group.

Examples of the halogenated alkyl group include a chloromethyl group and a fluorinated group.

Examples of the halogen group include a fluorine group, a chloro group, and a bromo group. From the standpoint of wear resistance, the substituent is preferably an alkyl group having 1 to 6 carbon atoms or an alkoxy group having 1 to 6 carbon atoms, and particularly preferably a methyl group or an ethyl group.

Specific examples of the arylene group that may have a substituent for Z in Formula (3) include a p-phenylene group, a m-phenylene group, and a group having a structure represented by Formula (11). From the standpoint of ease of production, the arylene group is preferably a p-phenylene group or a group having a structure represented by Formula (11).

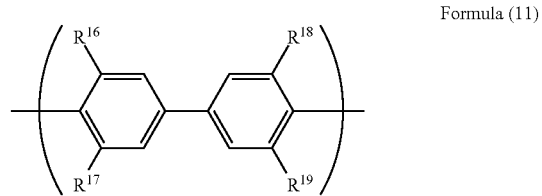

Formula (11)

(In Formula (11), $R^{16}$ to $R^{19}$ each independently represent a hydrogen atom or an alkyl group having 1 to 10 carbon atoms.)

Specific examples of the alkyl group in Formula (11) include a methyl group, an ethyl group, a propyl group, an isopropyl group, a butyl group, a tert-butyl group, an isobutyl group and a cyclohexyl group. From the standpoints of solubility, wear resistance, and ease of production, $R^{16}$ to $R^{19}$ are preferably a hydrogen atom or a methyl group.

From the standpoint of wear resistance, s is preferably an integer of 0 or 1, and from the standpoint of solubility, more preferably 0. Specific examples of a dihydric phenol compound from which the dihydric phenol residue represented by Formula (3) is derived are shown below.

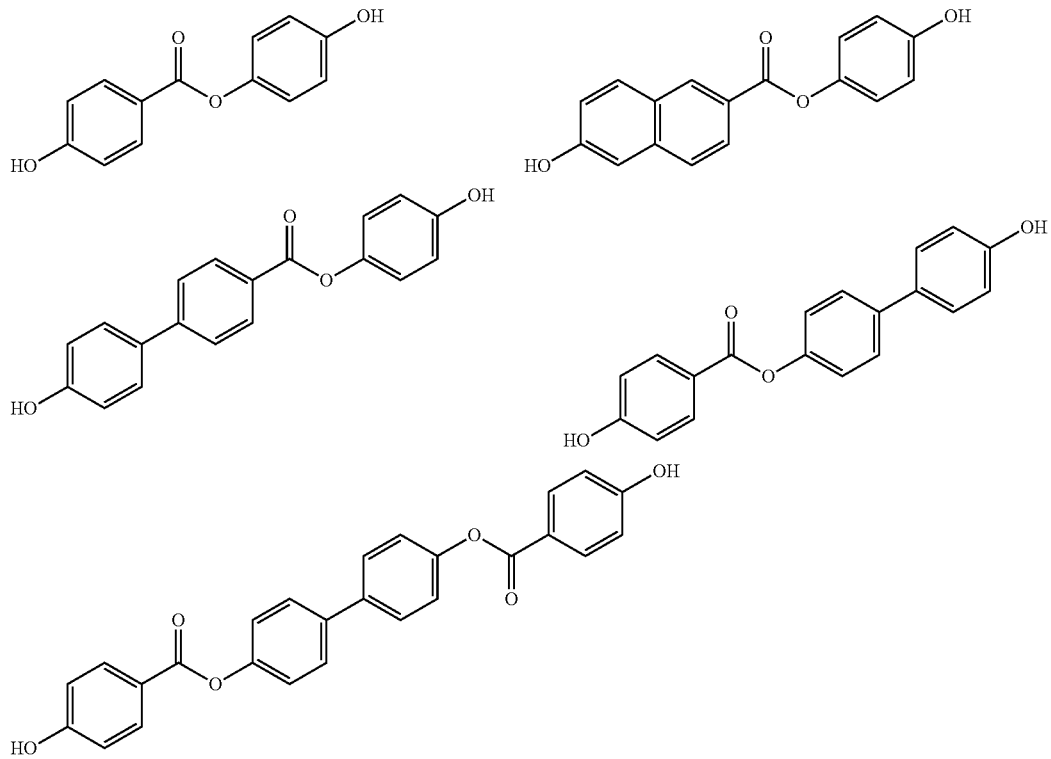

-continued
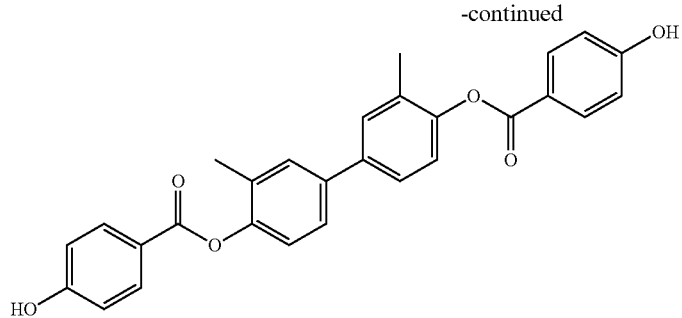
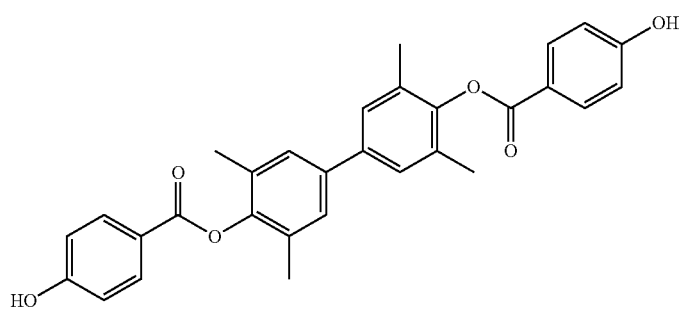
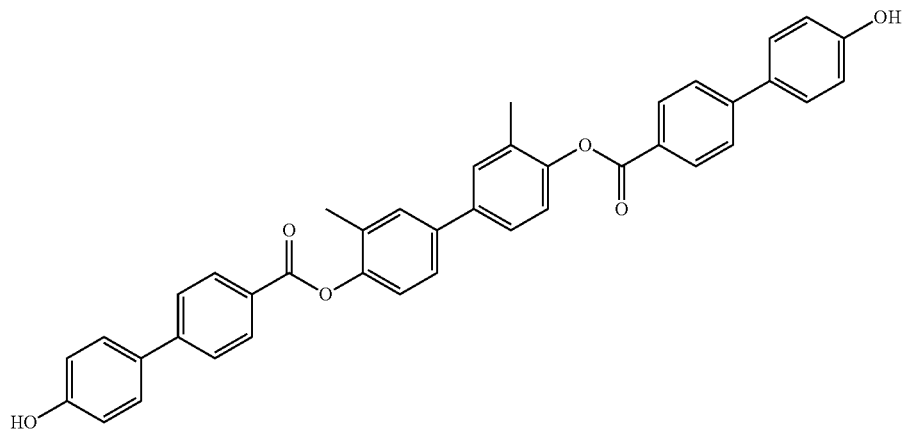
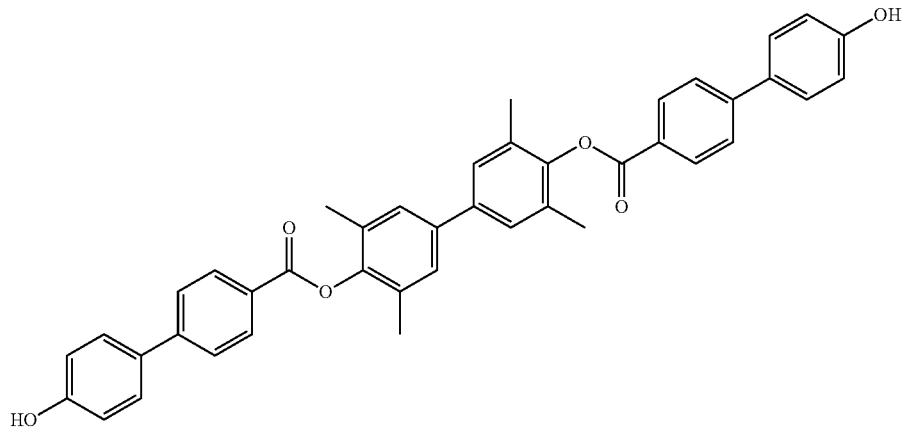

Further, the polyester resin according to the present invention includes a dihydric phenol residue represented by Formula (4).

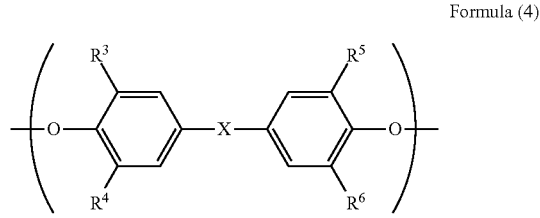

Formula (4)

In formula (4), $R^3$ to $R^6$ each independently represent a hydrogen atom, an alkyl group having 1 to 20 carbon atoms which may have a substituent, an alkoxy group having 1 to 20 carbon atoms which may have a substituent, an aromatic group having 1 to 20 carbon atoms which may have a substituent, or a halogen group. X represents a single bond, $-CR^7R^8-$, O, CO, or S. $R^7$ and $R^8$ each independently represent a hydrogen atom, an alkyl group having 1 to 10 carbon atoms, or represent a cycloalkylidene group having 5 to 10 carbon atoms and formed by bonding $R^7$ and $R^8$.

As specific examples of the respective groups of $R^3$ to $R^6$, those listed in the description of $R^1$ can be mentioned. From the standpoint of ease of production and wear resistance, $R^3$ to $R^6$ are preferably an alkyl group having 1 to 6 carbon atoms or an alkoxy group having 1 to 6 carbon atoms, and particularly preferably a methyl group.

Specific examples of the alkyl group having 1 to 10 carbon atoms as $R^7$ or $R^8$ include a methyl group, an ethyl group, a propyl group, an isopropyl group, a butyl group, and an isobutyl group. From the standpoints of solubility, wear resistance, and ease of production, the alkyl group is preferably a methyl group or an ethyl group. In addition, examples of the cycloalkylidene group having 5 to 10 carbon atoms and formed by bonding $R^7$ and $R^8$ include a cyclopentylidene group, a cyclohexylidene group, and a cycloheptylidene group.

Specific examples of the bisphenol residue represented by Formula (4) include bis-(4-hydroxyphenyl)methane, bis-(4-hydroxy-3-methylphenyl) methane, bis-(3,5-dimethyl-4-hydroxyphenyl)methane, 1,1-bis-(4-hydroxyphenyl)ethane, 1,1-bis-(4-hydroxy-3-methylphenyl)ethane, 1,1-bis-(3,5-dimethyl-4-hydroxyphenyl)ethane, 1,1-bis-(4-hydroxyphenyl)propane, 1,1-bis-(4-hydroxy-3-methylphenyl)propane, 1,1-bis-(3,5-dimethyl-4-hydroxyphenyl)propane, 2,2-bis-(4-hydroxyphenyl)propane, 2,2-bis-(4-hydroxy-3-methylphenyl) propane, 2,2-bis-(3,5-dimethyl-4-hydroxyphenyl) propane, 1,1-bis-(4-hydroxyphenyl)cyclohexane, 1,1-bis-(4-hydroxy-3-methylphenyl)cyclohexane, 1,1-bis-(3,5-dimethyl-4-hydroxyphenyl)cyclohexane, 1,1-bis-(4-hydroxyphenyl)-1-phenylethane, 4,4'-biphenol, 3,3'-dimethyl-4,4'-biphenol, 3,3',5,5'-tetramethyl-4,4'-biphenol, 4,4'-dihydroxydiphenyl ether, 3,3'-dimethyl-4,4'-dihydroxydiphenyl ether, bis(4-hydroxyphenyl)sulfide, and 4,4'-dihydroxy benzophenone.

Among them, considering ease of production, solubility, and electrical properties of the dihydric phenol component, the bisphenol residue is preferably bis-(4-hydroxyphenyl) methane, bis-(4-hydroxy-3-methylphenyl)methane, bis-(3, 5-dimethyl-4-hydroxyphenyl)methane, 1,1-bis-(4-hydroxyphenyl)ethane, 1,1-bis-(4-hydroxy-3-methylphenyl)ethane, 2,2-bis-(4-hydroxyphenyl)propane, 2,2-bis-(4-hydroxy-3-methylphenyl) propane, 2,2-bis-(3,5-dimethyl-4-hydroxyphenyl)propane, 1,1-bis-(4-hydroxyphenyl)cyclohexane, 4,4'-biphenol, 3,3'-dimethyl-4,4'-biphenol, 3,3',5,5'-tetramethyl-4,4'-biphenol, or 4,4'-dihydroxydiphenyl ether.

Further, considering the mechanical properties, the bisphenol residue is more preferably bis-(4-hydroxyphenyl)methane, bis-(4-hydroxy-3-methylphenyl)methane, 1,1-bis-(4-hydroxyphenyl)ethane, 1,1-bis-(4-hydroxy-3-methylphenyl)ethane, 2,2-bis-(4-hydroxy-3-methylphenyl)propane, 4,4'-biphenol, or 1,1-bis-(4-hydroxyphenyl)cyclohexane.

The content of the dihydric phenol residue represented by Formulae (1) to (3) is preferably 5 mol % to 80 mol % with respect to the total amount of the entire dihydric phenol residue in the polyester resin. Further, from the standpoint of solubility, the content is more preferably 60 mol % or less, even more preferably 50 mol % or less, and particularly preferably 40 mol % or less. From the standpoint of wear resistance, the content is more preferably 8 mol % or more, and more preferably 10 mol % or more.

Further, the content of the dihydric phenol residue represented by Formula (4) is preferably 20 mol % or more with respect to the total amount of the entire dihydric phenol residue, and from the standpoint of solubility, is more preferably 40 mol % or more, even more preferably 50 mol % or more, and particularly preferably 60 mol % or more. The content is preferably 95 mol % or less, and from the standpoint of wear resistance, more preferably 92 mol % or less, and even more preferably 90 mol % or less.

The dihydric phenol residues exemplified as Formulae (1) to (4) may be used in combination with a plurality of compounds as necessary. The dihydric phenol residue may also be used in combination with a dihydric alcohol other than the dihydric phenol residue represented by Formulae (1) to (4). Specific examples of the dihydric alcohols other than the dihydric phenol residue represented by Formulae (1) to (4) include ethylene glycol, 1,3-propanediol, 1,4-butanediol, 1,8-octanediol, polyester diols, polycarbonate diols, polytetramethylene glycol, and polysiloxane-containing diol.

A dicarboxylic acid residue in the polyester resin is preferably a dicarboxylic acid residue represented by Formula (5).

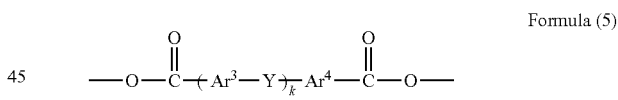

Formula (5)

In Formula (5), $Ar^3$ and $Ar^4$ each independently represent an arylene group that may have a substituent. Y represents a single bond, an oxygen atom, a sulfur atom, or a divalent organic residue having a structure represented by Formula (6) or (7). In Formula (6), $R^9$ and $R^{10}$ each independently represent a hydrogen atom, an alkyl group, or an aryl group, or a cycloalkylidene group formed by bonding $R^9$ and $R^{10}$. Further, in Formula (7), $R^{11}$ is an alkylene group, an arylene group, or a group represented by Formula (8), and in Formula (8), $R^{12}$ and $R^{13}$ each independently represent an alkylene group, and $Ar^5$ represents an arylene group. k represents an integer of 0 to 5.

Formula (6)

-continued

   Formula (7)

   Formula (8)

In Formula (5), $Ar^3$ and $Ar^4$ are preferably an arylene group having 6 to 20 carbon atoms, such as a phenylene group, a naphthylene group, an anthrylene group, a phenanthrylene group, and a pyrenylene group. Among them, from the standpoint of production cost, $Ar^3$ and $Ar^4$ are more preferably a phenylene group, a naphthylene group, or a biphenylene group.

Examples of the substituents that the arylene group may each independently have include a hydrogen atom, an alkyl group, an alkoxy group, an aryl group, a condensed polycyclic group, and a halogen group. Considering the mechanical properties of the polyester resin as a binder resin for a photosensitive layer and the solubility thereof with respect to the coating fluid for forming a photosensitive layer, the aryl group is preferably a phenyl group or a naphthyl group; the halogen group is preferably, a fluorine group, chloro group, a bromo group, or an iodo group; the alkoxy group is preferably a methoxy group, an ethoxy group, or a butoxy group; and the alkyl group is preferably an alkyl group having 1 to 10 carbon atoms, more preferably an alkyl group having 1 to 8 carbon atoms, particularly preferably an alkyl group having 1 or 2 carbon atoms, and specifically, particularly preferably a methyl group.

The number of the substituents in $Ar^3$ and $Ar^4$ is not particularly specified, but preferably 3 or less, and more preferably 2 or less, and particularly preferably 1 or less. From the standpoint of electrical properties and solubility, $Ar^3$ and $Ar^4$ are preferably the same arylene group having the same substituent(s), and more preferably an unsubstituted phenylene group.

In Formula (5), Y represents a single bond, an oxygen atom, a sulfur atom, or a divalent organic residue having a structure represented by Formula (6) or (7). In Formula (6), $R^9$ and $R^{10}$ each independently represent a hydrogen atom, an alkyl group, or an aryl group, or a cycloalkylidene group formed by bonding $R^9$ and $R^{10}$.

Examples of the alkyl group of $R^9$ and $R^{10}$ include a methyl group, an ethyl group, a propyl group, and a butyl group. Examples of the aryl group thereof include a phenyl group and a naphthyl group. Examples of the cycloalkylidene group formed by bonding $R^9$ and $R^{10}$ in Formula (6) include a cyclopentylidene group, a cyclohexylidene group, and a cycloheptylidene group.

In formula (7), $R^{11}$ is an alkylene group, arylene group, or a group represented by Formula (8), $R^{12}$ and $R^{13}$ in Formula (8) each independently represent an alkylene group, and $Ar^5$ represents an arylene group.

Examples of the alkylene group as $R^{11}$ in Formula (7) include a methylene group, an ethylene group, and a propylene group, and examples of the arylene group in Formula (7) as $R^{11}$ include a phenylene group and a terphenylene group. Specific examples of the group represented by Formula (8) include a group represented by Formula (9).

Y is preferably an oxygen atom from the standpoint of wear resistance.

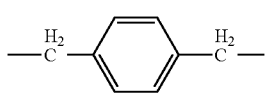   Formula (9)

In Formula (5), k is an integer of 0 to 5, but preferably an integer of 0 or 1, and from the standpoint of wear resistance, particularly preferably 1. In a case where k is 0, specific examples of the dicarboxylic acid compound from which the dicarboxylic acid residue is derived include a terephthalic acid and an isophthalic acid. In a case where k is 1, Formula (5) is particularly preferably a compound represented by the Formula (10).

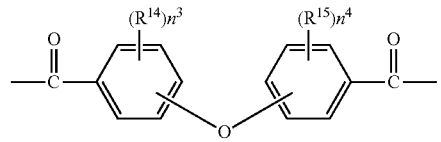   Formula (10)

In Formula (10), $R^{14}$ and $R^{15}$ each independently represent a hydrogen atom, an alkyl group, an aryl group, a halogen group, or an alkoxy group, and $n^3$ and $n^4$ each independently are an integer of 0 to 4. Examples of $R^{14}$ and $R^{15}$ in Formula (10) include a hydrogen atom; alkyl groups having 1 to 6 carbon atoms such as a methyl group, an ethyl group and an isopropyl group; aryl groups such as a phenyl group and a naphthyl group; halogen groups such as a fluorine atom, a chlorine atom, a bromine atom, and an iodine atom; and an alkoxy group such as a methoxy group, an ethoxy group, and a butoxy group.

Considering ease of production of a dicarboxylic acid compound from which the dicarboxylic acid residue represented by Formula (10) is derived, $R^{14}$ and $R^{15}$ are particularly preferably a hydrogen atom or a methyl group. $n^3$ and $n^4$ each independently represent an integer of 0 to 4, and particularly preferably satisfy $n^3=n^4=0$.

Specific examples of the dicarboxylic acid compound from which dicarboxylic acid residue represented by Formula (10) is derived include diphenyl ether-2,2'-dicarboxylic acid, diphenyl ether-2,4'-dicarboxylic acid, and diphenyl ether-4,4'-dicarboxylic acid. Among these, considering ease of production, the dicarboxylic compound is particularly preferably diphenyl ether-4,4'-dicarboxylic acid.

The compound exemplified as Formula (5) may be used in combination with a plurality of compounds as necessary. Specific examples of a dicarboxylic acid compound that may be used in combination include adipic acid, suberic acid, sebacic acid, phthalic acid, isophthalic acid, terephthalic acid, toluene-2,5-dicarboxylic acid, p-xylene-2,5-dicarboxylic acid, pyridine-2,3-dicarboxylic acid, pyridine-2,4-dicarboxylic acid, pyridine-2,5-dicarboxylic acid, pyridine-2,6-dicarboxylic acid, pyridine-3,4-dicarboxylic acid, pyridine 3,5-dicarboxylic acid, naphthalene-1,4-dicarboxylic acid, naphthalene-2,3-dicarboxylic acid, naphthalene-2,6-dicarboxylic acid, biphenyl-2,2-dicarboxylic acid, biphenyl-4,4'-dicarboxylic acid, diphenyl ether-2,2'-dicarboxylic acid, diphenyl ether-2,3'-dicarboxylic acid, diphenyl ether-2,4'-dicarboxylic acid, diphenyl ether-3,3'-dicarboxylic acid, diphenyl ether-3,4'-dicarboxylic acid, and diphenyl ether-4,4'-dicarboxylic acid. Considering the ease of preparation of the dicarboxylic acid component, the dicarboxylic acid is particularly preferably isophthalic acid, terephthalic acid, or diphenyl ether-4,4'-dicarboxylic acid.

In the polyester resin, the total content of the dicarboxylic acid residue represented by Formula (5) is preferably 70 mol % or more with respect to the entire dicarboxylic acid component content. From the standpoint of wear resistance, the content is preferably 90 mol % or more, and particularly preferably 100 mol %.

The viscosity-average molecular weight (Mv) of the polyester resin is usually 10,000 or more, and from the standpoint of mechanical strength, preferably 25,000 or more, and more preferably 35,000 or more. The viscosity-average molecular weight of the polyester resin is usually 200,000 or less, and from the standpoint of applicability, preferably 150,000 or less.

The amount of the carboxylic acid chloride group present at the terminal of the polyester resin is usually 0.1 µeq/g or less, and preferably 0.05 µeq/g or less. In a case where the amount of the terminal carboxylic acid chloride group exceeds the above range, the storage stability tends to decrease when the polyester resin is used as a coating fluid for an electrophotographic photoreceptor.

The carboxylic acid value of the polyester resin is preferably set to be 300 µeq/g or less, and more preferably 150 µeq/g or less. In a case where the carboxylic acid value exceeds 150 µeq/g, the electrical properties of the photoreceptor tend to degrade, and further the storage stability of a coating fluid obtained by dissolving the resin in a solvent tends to decrease.

The amount of OH group present at the terminal of the polyester resin is usually 100 µeq/g or less, and preferably 50 µeq/g or less. In a case where the amount of the terminal OH group exceeds the above range, the electrical properties of the electrophotographic photoreceptor produced from the polyester resin may degrade.

The total amount of nitrogen included in the polyester resin (T-N amount) is preferably 3000 ppm or less, more preferably 1500 ppm or less, even more preferably 1000 ppm or less, particularly preferably 500 ppm or less, and most preferably 300 ppm or less. In a case where the total amount of nitrogen exceeds 3000 ppm, the electrical properties of the photoreceptor may degrade.

The amount of free dicarboxylic acid included in the polyester resin is not particularly specified, but is preferably 50 ppm or less, and more preferably 10 ppm or less. In a case where the amount of the free dicarboxylic acid exceeds 50 ppm, electrical properties of a photoreceptor may degrade or the free dicarboxylic acid may appear as a foreign object at the time of image evaluation. From the standpoints of the electrical properties and image properties of the photoreceptor, the less the amount of the free dicarboxylic acid is, the better, but from the standpoint of the stability of the polyester resin, the amount thereof is preferably 0.01 ppm or more, and particularly preferably 0.1 ppm or more.

The amount of free dihydric phenol included in the polyester resin is not particularly specified, but is preferably 100 ppm or less, and more preferably 50 ppm or less. In a case where the amount of dihydric phenol exceeds 100 ppm, degradation of electrical properties or colorization of the polyester resin may occur, or depending on the solvent, an impurity may appear in the resin. From the standpoint of electrical properties of the photoreceptor, the less free dihydric phenol is, the better, but from the standpoint of ease of production, the amount thereof is preferably 0.001 ppm or more, and particularly preferably 0.01 ppm or more.

<<Polyester Resin of Second Embodiment>>

A polyester resin to which the production method according to the present invention is applied has a repeating unit represented by Formula (1a) and a repeating unit represented by Formula (2a).

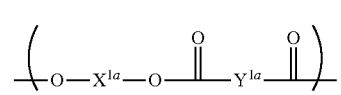

Formula (1a)

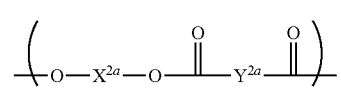

Formula (2a)

In Formula (1a), $X^{1a}$ represents a divalent group represented by Formula (3a), and $Y^{1a}$ is a divalent group. In Formula (2a), $X^{2a}$ is a group including a divalent aromatic group. $Y^{2a}$ is a divalent group. However, $X^{2a}$ and $X^{1a}$ are not the same group.

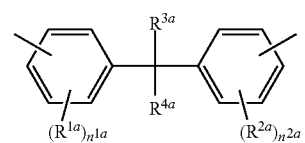

Formula (3a)

In Formula (3a), $R^{1a}$ and $R^{2a}$ each independently represent a hydrogen atom, an alkyl group having 1 to 20 carbon atoms which may have a substituent, an alkoxy group having 1 to 20 carbon atoms which may have a substituent, or an aromatic group having 1 to 20 carbon atoms which may have a substituent. The number of carbon atoms referred to here is the number of carbon atoms in the entire group including a substituent. Examples of the substituent of $R^{1a}$ and $R^{2a}$ include an alkyl group, an alkoxy group, and a halogen atom, but $R^{1a}$ and $R^{2a}$ preferably do not have a substituent.

Specific examples of the alkyl group include a methyl group, an ethyl group, a n-propyl group, an isopropyl group, a n-butyl group, an isobutyl group, a tert-butyl group, and a cyclohexyl group. Specific examples of the alkoxy group include a methoxy group, an ethoxy group, a n-propoxy group, and a n-butoxy group. Specific examples of the aromatic group that may have a substituent include a phenyl group, a naphthyl group, and a 4-methylphenyl group. Among them, from the standpoint of solubility, wear resistance, and ease of production, the alkyl group is preferably a methyl group or an ethyl group.

$n^{1a}$ and $n^{2a}$ each are an integer of 0 to 4. From the standpoint of wear resistance, $n^{1a}$ and $n^{2a}$ are preferably an integer of 0 to 2, and particularly preferably 0 or 1.

$R^{3a}$ and $R^{4a}$ each independently a hydrogen atom, an alkyl group having 1 to 20 carbon atoms, or an aromatic group having 1 to 20 carbon atoms which may have a substituent. However, $R^{3a}$ and $R^{4a}$ may be bonded to each other to form a ring. The number of carbon atoms referred to here is the number of carbon atoms in the entire group including a substituent.

As substituents of $R^{1a}$ and $R^{4a}$, those listed in the description of the substituent of $R^{1a}$ and $R^{2a}$ can be applied. Specific examples of the alkyl groups include a methyl group, an ethyl group, a n-propyl group, an isopropyl group, a n-butyl group, and an isobutyl group. Specific examples of the aromatic group that may have a substituent include a phenyl group, naphthyl group, and a biphenyl group. Specific examples of the cyclic group formed by bonding $R^{3a}$ and $R^{4a}$ to each other include a cyclopentylidene group, a cyclohexylidene group, and a cyclohexylidene group substituted with 1 to 3 methyl groups. $R^{3a}$ and $R^{4a}$ are preferably a hydrogen atom, a methyl group, an ethyl group, or a cyclohexylidene group, from the standpoints of solubility, wear resistance, and ease of production.

Specific examples of a bisphenol as the original group of the divalent group represented by Formula (3a) include bis-(4-hydroxyphenyl)methane, bis-(4-hydroxy-3-methylphenyl)methane, bis-(3,5-dimethyl-4-hydroxyphenyl)methane, 1,1-bis-(4-hydroxyphenyl)ethane, 1,1-bis-(4-hydroxy-3-methylphenyl)ethane, 1,1-bis-(3,5-dimethyl-4-hydroxyphenyl)ethane, 1,1-bis-(4-hydroxyphenyl)propane, 1,1-bis-(4-hydroxy-3-methylphenyl) propane, 1,1-bis-(3,5-dimethyl-4-hydroxyphenyl)propane, 2,2-bis-(4-hydroxyphenyl)propane, 2,2-bis-(4-hydroxy-3-methylphenyl)propane, 2,2-bis-(3,5-dimethyl-4-hydroxyphenyl)propane, 1,1-bis-(4-hydroxyphenyl)cyclohexane, 1,1-bis-(4-hydroxy-3-methylphenyl)cyclohexane, 1,1-bis-(3,5-dimethyl-4-hydroxyphenyl)cyclohexane, and 1,1-bis-(4-hydroxyphenyl)-1-phenylethane.

Among them, considering ease of production, solubility, and electrical properties, the bisphenol is preferably bis-(4-hydroxyphenyl)methane, bis-(4-hydroxy-3-methylphenyl)methane, bis-(3,5-dimethyl-4-hydroxyphenyl)methane, 1,1-bis-(4-hydroxyphenyl)ethane, 1,1-bis-(4-hydroxy-3-methylphenyl)ethane, 2,2-bis-(4-hydroxyphenyl)propane, 2,2-bis-(4-hydroxy-3-methylphenyl)propane, 2,2-bis-(3,5-dimethyl-4-hydroxyphenyl)propane, or 1,1-bis-(4-hydroxyphenyl)cyclohexane. Considering further the mechanical properties, a bisphenol is more preferably bis-(4-hydroxyphenyl)methane, bis-(4-hydroxy-3-methylphenyl)methane, 1,1-bis-(4-hydroxyphenyl)ethane, 1,1-bis-(4-hydroxy-3-methylphenyl)ethane, 2,2-bis-(4-hydroxy-3-methylphenyl)propane, or 1,1-bis-(4-hydroxyphenyl)cyclohexane.

$X^{2a}$ in Formula (2a) is a group including a divalent aromatic group that is not the same group as $X^{1a}$. Examples of the group including a divalent aromatic group include a divalent group such as Formula (3a) and divalent groups represented by Formulae (7a) to (10a). From the standpoint of printing durability, the divalent aromatic group is preferably a group including at least one divalent aromatic group represented by Formulae (7a) to (10a).

Formula (7a)

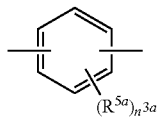

In Formula (7a), $R^{5a}$ represent a hydrogen atom, an alkyl group having 1 to 20 carbon atoms which may have a substituent, an alkoxy group having 1 to 20 carbon atoms which may have a substituent, an aromatic group having 1 to 20 carbon atoms which may have a substituent, or a halogen group. The number of carbon atoms referred to here is the number of carbon atoms in the entire group including a substituent. Specific examples of the alkyl group include a methyl group, an ethyl group, a n-propyl group, an isopropyl group, a n-butyl group, an isobutyl group, a tert-butyl group, and a cyclohexyl group.

Specific examples of the alkoxy group include a methoxy group, an ethoxy group, a n-propoxy group, and a n-butoxy group. Specific examples of the aromatic group that may have a substituent include a phenyl group, a naphthyl group, and a phenyl group substituted with methyl. Examples of the halogen group include a fluoro group, a chloro group, and a bromo group. From the standpoints of solubility, wear resistance and ease of production, $R^{5a}$ is preferably a methyl group, a phenyl group, a fluoro group, or a chloro group. $n^{3a}$ is an integer of 0 to 4. From the standpoint of printing durability, $n^{3a}$ is preferably an integer of 0 to 2, and particularly preferably 0. Specific examples of a dihydric phenol group as an original group of the divalent group represented by Formula (7a) include hydroquinone, methyl hydroquinone, chloro hydroquinone, fluoro hydroquinone, resorcinol, and catechol. From the standpoint of printing durability, the original group is preferably hydroquinone.

Formula (8a)

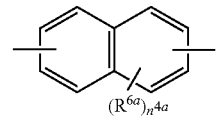

In Formula (8a), $R^{6a}$ is a hydrogen atom, an alkyl group having 1 to 20 carbon atoms which may have a substituent, an alkoxy group having 1 to 20 carbon atoms which may have a substituent, an aromatic group having 1 to 20 carbon atoms which may have a substituent, or a halogen group. Specific examples of $R^{6a}$ include those equivalents to $R^{5a}$.

$n^{4a}$ is an integer of 0 to 6. From the standpoint of printing durability, $n^{4a}$ is preferably an integer of 0 to 2, and particularly preferably 0.

Specific examples of a dihydric phenol as an original group of the divalent group represented by Formula (8a) include 1,6-dihydroxynaphthalene, 1,7-dihydroxynaphthalene, 1,4-dihydroxynaphthalene, 2,6-dihydroxynaphthalene, and 2,7-dihydroxynaphthalene. From the standpoint of printing durability, the dihydric phenol is preferably 2,6-dihydroxynaphthalene or 2,7-dihydroxynaphthalene.

Formula (9a)

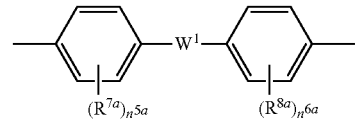

In Formula (9a), $R^{7a}$ and $R^{8a}$ each independently represent an alkyl group having 1 to 20 carbon atoms which may have a substituent, an alkoxy group having 1 to 20 carbon atoms which may have a substituent, and an aromatic group having 1 to 20 carbon atoms which may have a substituent, or a halogen group. Specific examples of $R^{7a}$ and $R^{8a}$ include those equivalents to $R^{5a}$.

$n^{5a}$ and $n^{6a}$ are an integer of 0 to 4. From the standpoint of printing durability, $n^{5a}$ and $n^{6a}$ are preferably an integer of 0 to 2, and particularly preferably 0 or 1. $W^1$ represents a single bond, an oxygen atom, or a sulfur atom.

Specific examples of a dihydric phenol as an original group of the divalent group represented by Formula (9a) include 4,4'-biphenol, 4,4'-dihydroxy-3,3'-dimethyl biphenyl, 4,4'-dihydroxy-3,3',5,5'-tetramethyl-biphenyl, 4,4'-dihydroxy-2,2',3,3',5,5'-hexamethyl biphenyl, 4,4'-dihydroxydiphenyl ether, 4,4'-dihydroxy-3,3'-dimethyl diphenyl ether, 4,4'-dihydroxy-3,3',5,5'-tetramethyl diphenyl ether, 4,4'-dihydroxydiphenyl sulfide, 4,4'-dihydroxy-3,3'-dimethyl diphenyl sulfide, and 4,4'-dihydroxy-3,3',5,5'-tetramethyl diphenyl sulfide. From the standpoint of printing durability and availability, the dihydric phenol is preferably 4,4'- biphenol, 4,4'-dihydroxy-3,3'-dimethyl biphenyl, 4,4'-dihydroxy-3,3',5,5'-tetramethyl biphenyl, or 4,4'-dihydroxy diphenyl ether.

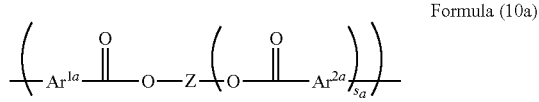

Formula (10a)

In Formula (10a), $Ar^{1a}$ and $Ar^{2a}$ each independently represent an arylene group having 6 to 16 carbon atoms which may have a substituent. Z represents an arylene group that may have a substituent or an alkylene group that may have a substituent, and $s_a$ is an integer of 0 or 1.

Specific examples of the arylene group represented by $Ar^{1a}$ and $Ar^{2a}$ in Formula (10a) include a phenylene group, a naphthylene group, an anthrylene group, a phenanthrylene group, a pyrenylene group, and a biphenylene group. From ease of production, the arylene group is preferably a phenylene group.

Examples of a substituent of the arylene group include an alkyl group having 1 to 10 carbon atoms, an alkoxy group having 1 to 10 carbon atoms, a halogenated alkyl group, a halogen group, and a benzyl group. Specific examples of the alkyl group include a methyl group, an ethyl group, a propyl group, an isopropyl group, a butyl group, a tert-butyl group, an isobutyl group, and a cyclohexyl group. Examples of the alkoxy group include a methoxy group, an ethoxy group, a propoxy group, and a cyclohexoxy group. Examples of the halogenated alkyl group include a chloromethyl group and a fluorinated alkyl group. Examples of the halogen group include a fluorine group, a chloro group, and a bromo group. From the standpoint of wear resistance, the substituent is preferably an alkyl group having 1 to 6 carbon atoms or an alkoxy group having 1 to 6 carbon atoms, and particularly preferably a methyl group or an ethyl group.

Examples of the arylene group that may have a substituent for Z in Formula (10a) include a p-phenylene group, a m-phenylene group, and a group having a structure represented by Formula (11). Specific examples of the alkylene group that may have a substituent group, include an ethylene group, a propylene group, a cyclohexylene group, and a 1,4-dimethyl cyclohexane group. From standpoint of ease of production, the arylene group is preferably a p-phenylene group, a group having a structure represented by Formula (11) that has already been noted in the description of the first embodiment, or ethylidene.

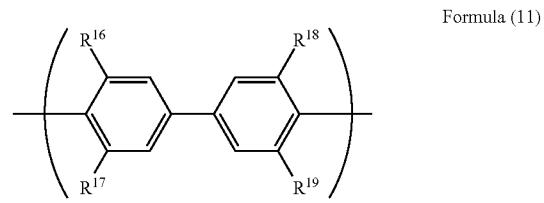

Formula (11)

In Formula (11), $R^{16}$ to $R^{19}$ each independently represent a hydrogen atom or an alkyl group having 1 to 10 carbon atoms.

Specific examples of the alkyl group in Formula (11) include a methyl group, an ethyl group, a propyl group, an isopropyl group, a butyl group, a tert-butyl group, an isobutyl group and a cyclohexyl group. From the standpoints of solubility, wear resistance, ease of production, $R^{16}$ to $R^{19}$ are preferably a hydrogen atom or a methyl group.

In Formula (10a), $s_a$ is preferably an integer of 0 or 1 from the standpoint of wear resistance, and more preferably 0 from the standpoint of solubility.

Specific examples of the dihydric phenol from which divalent group represented by Formula (10a) is derived are shown below.

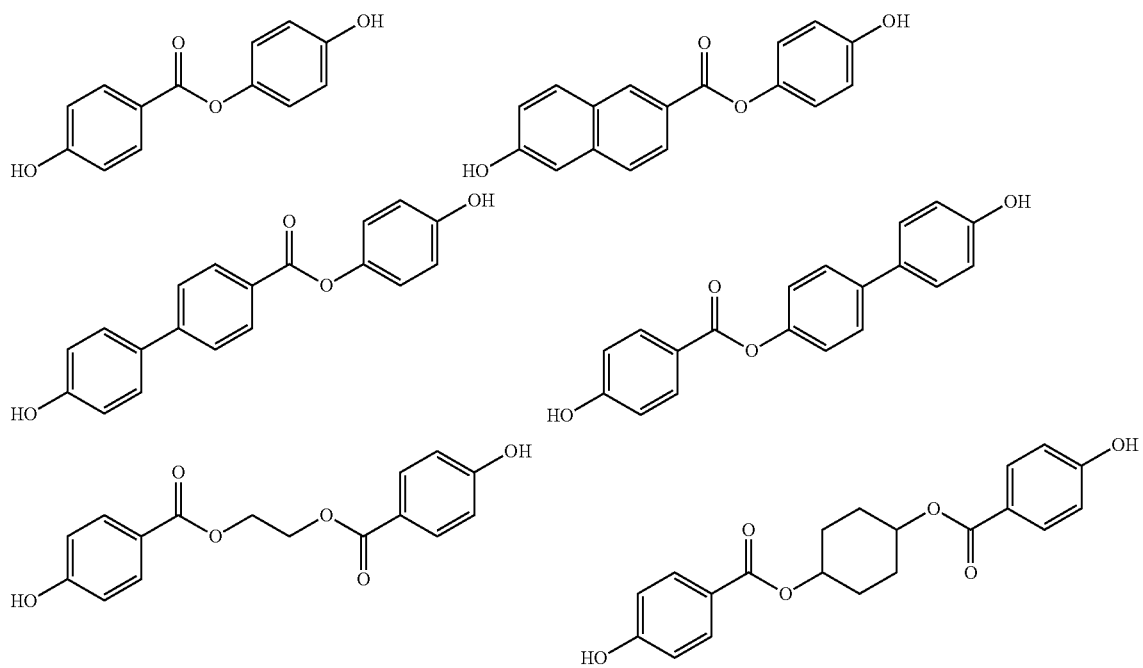

-continued
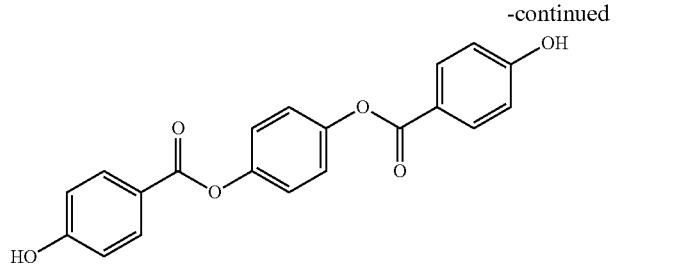
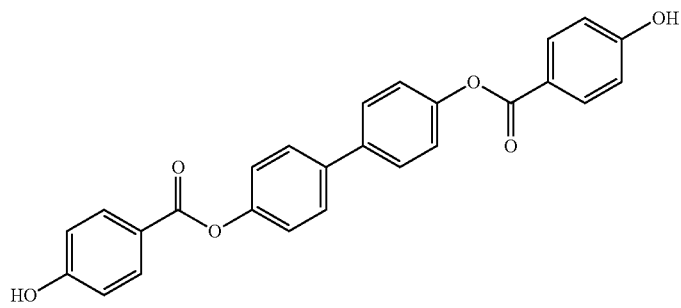
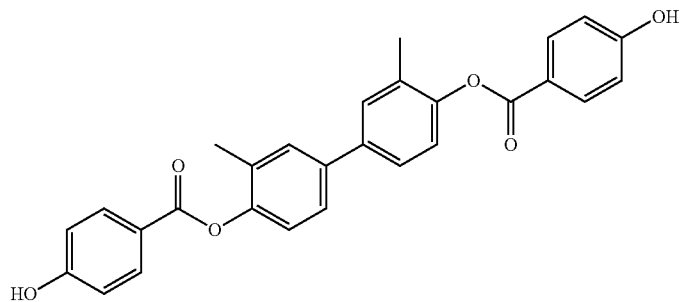
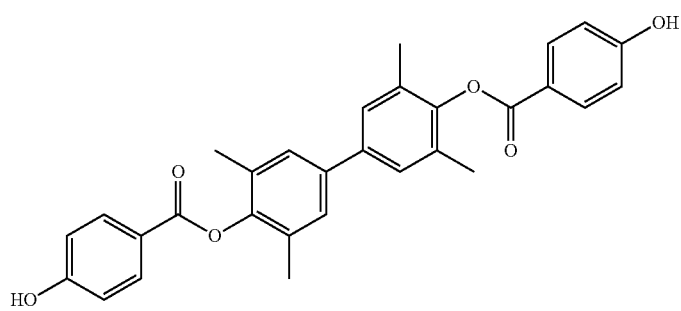
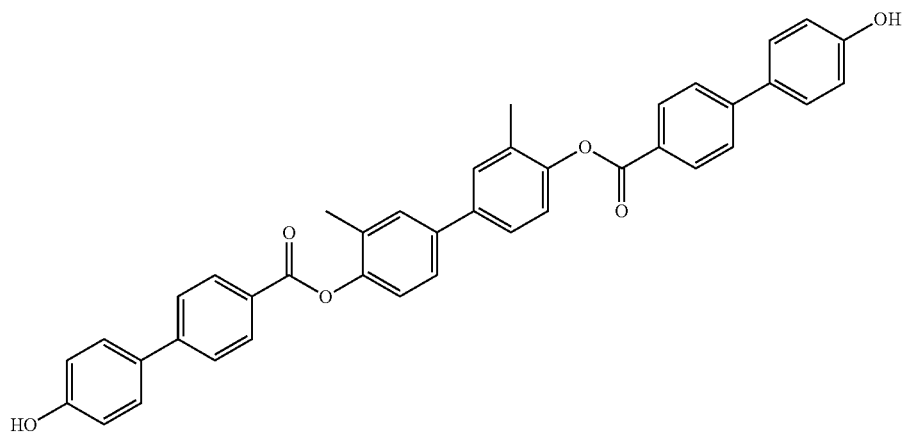

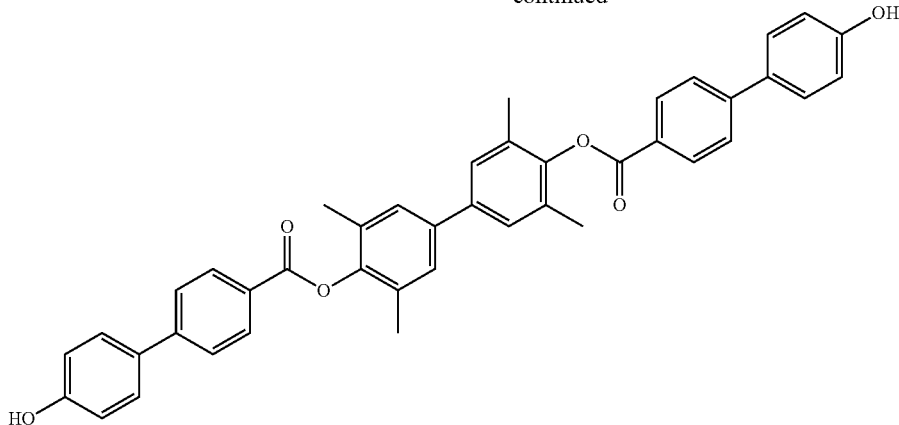

In addition, Formulae (4a$_1$) and (4a$_2$) are dihydric phenols corresponding to Formulae (1a) and (2a), and X$^{1a}$ and X$^{2a}$ are those described above.

$$HO\text{—}X^{1a}\text{—}OH \quad \text{Formula (4a}_1\text{)}$$

$$HO\text{—}X^{2a}\text{—}OH \quad \text{Formula (4a}_2\text{)}$$

Y$^{1a}$ and Y$^{2a}$ in Formulae (1a) and (2a) are preferably divalent groups represented by Formula (11a). Y$^{1a}$ and Y$^{2a}$ are preferably the same group.

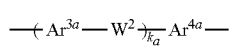
Formula (11a)

Ar$^{3a}$ and Ar$^{4a}$ each independently represent an arylene group that may have a substituent. W$^2$ represents a single bond, an oxygen atom, a sulfur atom, and a divalent organic residue having a structure represented by Formula (12a), or a divalent organic residue having a structure represented by Formula (13a). R$^{9a}$ and R$^{10a}$ in Formula (12a) each independently represent a hydrogen atom, an alkyl group, or aryl group, or a cycloalkylidene group formed by bonding R$^{9a}$ and R$^{10a}$. Further, in Formula (13a), R$^{11a}$ represents an alkylene group, an arylene group, or a group represented by Formula (14a). In Formula (14a), R$^{12a}$ and R$^{13a}$ each independently represent an alkylene group, Ar$^{5a}$ represents an arylene group. k$_a$ represents an integer of 0 to 5.

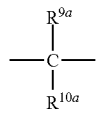
Formula (12a)

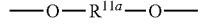
Formula (13a)

Formula (14a)

In Formula (11a), Ar$^{3a}$ and Ar$^{4a}$ are preferably an arylene group having 6 to 20 carbon atoms, such as a phenylene group, a naphthylene group, a biphenylene group, an anthrylene group, a phenanthrylene group, and a pyrenylene group. Among them, from the standpoint of production cost, Ar$^{3a}$ and Ar$^{4a}$ are preferably a phenylene group, a naphthylene group, or a biphenylene group.

Examples of substituents that the arylene groups each independently may have include an alkyl group, an alkoxy group, an aryl group, a condensed polycyclic group, and a halogen group. Considering mechanical properties of the binder resin for a photosensitive layer and solubility of the same with respect to coating fluids for forming a photosensitive layer, the aryl group is preferably a phenyl group or a naphthyl group; the halogen group is preferably a fluorine group, chloro group, bromo group, or an iodo group; the alkoxy group is preferably a methoxy group, an ethoxy group, or a butoxy group; and the alkyl group is preferably an alkyl group having 1 to 10 carbon atoms, more preferably an alkyl group having 1 to 8 carbon atoms, particularly preferably an alkyl group having 1 to 2 carbon atoms, and specifically particularly preferably a methyl group.

The number of substituents of Ar$^{3a}$ and Ar$^{4a}$ is not particularly specified, but is preferably 3 or less, more preferably 2 or less, and particularly preferably 1 or less. From the standpoints of wear resistance and ease of production, Ar$^{3a}$ and Ar$^{4a}$ are preferably the same arylene group having the same substituent, and more preferably an unsubstituted phenylene group.

In Formula (12a), R$^{9a}$ and R$^{10a}$ each independently represent a hydrogen atom, an alkyl group, or an aryl group, or a cycloalkylidene group formed by bonding R$^{9a}$ and R$^{10a}$. Examples of the alkyl group of R$^{9a}$ and R$^{10a}$ include a methyl group, an ethyl group, a propyl group, and a butyl group. Examples of the aryl group thereof include a phenyl group and a naphthyl group.

Examples of the cycloalkylidene group formed by bonding R$^{9a}$ and R$^{10a}$ in Formula (12a) include a cyclopentylidene group, a cyclohexylidene group, and a cycloheptylidene group. In Formula (13a), R$^{11a}$ is an alkylene group, an arylene group, or a group represented by Formula (14a), and in Formula (14a), R$^{12a}$ and R$^{13a}$ each independently represent an alkylene group, and Ar$^{5a}$ an arylene group. Examples of the alkylene group as R$^{11a}$ in Formula (13a) include a methylene group, an ethylene group, and a propylene group, and examples of the arylene group as R$^{11a}$ include a phenylene group and a terphenylene group. Specific examples of the group represented by Formula (14a) include a group represented by Formula (15a). W$^2$ is preferably an oxygen atom from the standpoint of wear resistance.

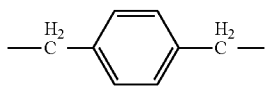

Formula (15a)

In Formula (11a), ka is an integer of 0 to 5. From the standpoint of wear resistance, ka is preferably an integer of 0 or 1, and particularly preferably 1. In a case where ka is 0, specific examples of a dicarboxylic acid as the original group of a divalent group represented by Formula (11a), include terephthalic acid and isophthalic acid. In a case where ka is 1, Formula (11a) is particularly preferably Formula (16a).

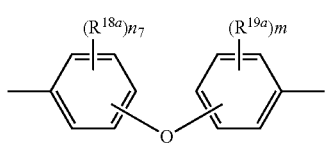

Formula (16a)

In Formula (16a), $R^{18a}$ and $R^{19a}$ each independently represent a hydrogen atom, an alkyl group, an aryl group, a halogen group, or an alkoxy group, $n_7$ and m are each independently an integer of 0 to 4. Examples of $R^{18a}$ and $R^{19a}$ in Formula (16a) include a hydrogen atom; an alkyl group having 1 to 6 carbon atoms such as a methyl group, an ethyl group and an isopropyl group; an aryl group such as a phenyl group and a naphthyl group; a halogen group such as a fluorine atom, a chlorine atom, a bromine atom, and an iodine atom; and an alkoxy group such as a methoxy group, an ethoxy group, and a butoxy group.

Considering ease of production of a dicarboxylic acid compound from which a divalent group represented by Formula (16a) is derived, $R^{18a}$ and $R^{19a}$ are particularly preferably a hydrogen atom or a methyl group. $n_7$ and m each independently represent an integer of 0 to 4, and particularly preferably satisfy $n_7=m=0$. Specific examples of the dicarboxylic acid compound from which a divalent group represented by Formula (16a) is derived include diphenyl ether-2,2'-dicarboxylic acid, diphenyl ether-2,4'-dicarboxylic acid, and diphenyl ether-4,4'-dicarboxylic acid. Among these, considering ease of production, the dicarboxylic acid compound is particularly preferably diphenyl ether-4,4'-dicarboxylic acid.

The dicarboxylic acid residue may be used in combination with a plurality of compounds as necessary. Specific examples of a dicarboxylic acid compound that may be used in combination include adipic acid, suberic acid, sebacic acid, phthalic acid, isophthalic acid, terephthalic acid, toluene-2,5-dicarboxylic acid, p-xylene-2,5-dicarboxylic acid, pyridine-2,3-dicarboxylic acid, pyridine-2,4-dicarboxylic acid, pyridine-2,5-dicarboxylic acid, pyridine-2,6-dicarboxylic acid, pyridine-3,4-dicarboxylic acid, pyridine-3,5-dicarboxylic acid, naphthalene-1,4-dicarboxylic acid, naphthalene-2,3-dicarboxylic acid, naphthalene-2,6-dicarboxylic acid, biphenyl-2,2'-dicarboxylic acid, biphenyl-4,4'-dicarboxylic acid, diphenyl ether-2,2'-dicarboxylic acid, diphenyl ether-2,3'-dicarboxylic acid, diphenyl ether-2,4'-dicarboxylic acid, diphenyl ether-3,3'-dicarboxylic acid, diphenyl ether-3,4'-dicarboxylic acid, and diphenyl ether-4,4'-dicarboxylic acid. Considering the ease of production of the dicarboxylic acid component, the dicarboxylic acid compound is particularly preferably isophthalic acid, terephthalic acid, and diphenyl ether-4,4'-dicarboxylic acid.

Further, Formula (5a) is a dicarboxylic compound corresponding to $Y^{1a}$, and $Y^{1a}$ is as described above.

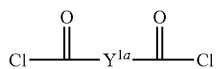

Formula (5a)

In terms of a molar ratio between the repeating unit represented by Formula (1a) and the repeating unit represented by Formula (2a), the content of the repeating unit represented by Formula (2a) in a polyester resin preferably satisfies the relationship $0.45≥(2a)/((1a)+(2a))≥0.05$. Further, from the standpoints of the solubility and wear resistance of the polyester resin, the content thereof more preferably satisfies the relationship $0.40≥(2a)/((1a)+(2a))≥0.08$, and even more preferably $0.35≥(2a)/((1a)+(2a))≥0.10$.

The viscosity-average molecular weight (Mv) of the polyester resin is usually 10,000 or more, and preferably 20,000 or more from the standpoint of the mechanical strength thereof. The viscosity-average molecular weight of a polyester resin is usually 200,000 or less, and preferably 150,000 or less from the standpoint of applicability.

The amount of the carboxylic acid chloride group present at the terminal of the polyester resin is usually 0.1 μeq/g or less, and preferably 0.05 μeq/g or less. In a case where the amount of the terminal carboxylic acid chloride group exceeds the above range, the storage stability tends to decrease in a case where the polyester resin is used as a coating fluid for an electrophotographic photoreceptor.

The carboxylic acid value of the polyester resin is preferably set to be 300 μeq/g or less, and more preferably 150 μeq/g or less. In a case where the carboxylic acid value exceeds 300 μeq/g, electrical properties of the photoreceptor tend to degrade, and further the storage stability of a coating fluid obtained by dissolving the resin in a solvent tends to decrease.

The amount of OH group present at the terminal of the polyester resin is usually 200 μeq/g or less, and preferably 100 μeq/g or less. In a case where the amount of the terminal OH group exceeds the above range, electrical properties of the electrophotographic photoreceptor produced from the polyester resin may degrade.

The total amount of nitrogen included in the polyester resin (T-N amount) is preferably 500 ppm or less, more preferably 300 ppm or less, and particularly preferably 150 ppm or less. In a case where the total amount of nitrogen exceeds 500 ppm, the electrophotographic photoreceptor may have inferior electrical properties.

The amount of free dicarboxylic acid included in the polyester resin is not particularly specified, but is preferably 50 ppm or less, and more preferably 10 ppm or less. In a case where the content of the free dicarboxylic acid exceeds 50 ppm, electrical properties of a photoreceptor may degrade or the free dicarboxylic acid may appear as a foreign object at the time of image evaluation. From the standpoints of the electrical properties and image properties of the photoreceptor, the less the amount of the free dicarboxylic acid is, the better, but from the standpoint of the stability of polyester resin, the amount thereof is preferably 0.01 ppm or more, and particularly preferably 0.1 ppm or more.

The amount of free dihydric phenol included in the polyester resin is not particularly specified, but is preferably 100 ppm or less, and more preferably 50 ppm or less. In a case where the amount of dihydric phenol exceeds 100 ppm, degradation of electrical properties or colorization of the polyester resin may occur, or depending on the solvent, an impurity may appear in the resin. From the standpoint of the electrical properties of the photoreceptor, the less free dihydric phenol is, the better, but from the standpoint of ease of production, the amount thereof is preferably 0.001 ppm or more, and particularly preferably 0.01 ppm or more.

<<Polyester Resin of Third Embodiment>>

The structure of the polyester resin produced according to the present invention is not limited to a particular structure, but from the standpoints of solubility, mechanical properties, and electrical properties, the polyester resin produced according to the present invention preferably has a structure shown below. In a case of using at least two kinds of dicarboxylic acid chlorides, or in a case of using at least two kinds of dihydric phenols or dihydric alcohols, the production method of the polyester resin is effective. The term "kind" referred to here is used to distinguish molecular structure so as to treat the positional isomers and stereoisomers as distinctive kinds.

(Dicarboxylic Acid Residue)

The polyester resin preferably has at least one dicarboxylic acid residue represented by Formulae (1b) to (4b).

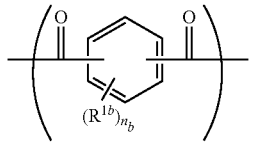

Formula (1b)

In Formula (1b), $R^{1b}$'s each independently represent an alkyl group having 1 to 10 carbon atoms, an alkoxy group having 1 to 10 carbon atoms, a halogenated alkyl group, a halogen group, or a benzyl group, and $n_b$ is are an integer of 0 to 4.

Specific examples of the alkyl group include a methyl group, an ethyl group, a propyl group, an isopropyl group, a butyl group, a tert-butyl group, an isobutyl group, and a cyclohexyl group. Specific examples of the alkoxy group include a methoxy group, an ethoxy group, a propoxy group, and a cyclohexoxy group.

Examples of the halogenated alkyl group include a chloromethyl group and a fluorinated alkyl group. Examples of the halogen group include a fluorine group, a chloro group, and a bromo group. From the standpoint of wear resistance, $R^{1b}$ is preferably an alkyl group having 1 to 6 carbon atoms or an alkoxy group having 1 to 6 carbon atoms, and particularly preferably a methyl group or an ethyl group.

$n_b$'s each independently are an integer of 0 to 4, and preferably satisfy $n_b=0$ from the standpoint of ease of production. Specific examples of the dicarboxylic acid compound from which the dicarboxylic acid residue represented by Formula (1b) is derived include orthophthalic acid, isophthalic acid, and terephthalic acid. Among these, from the standpoint of wear resistance, the dicarboxylic acid compound is particularly preferably isophthalic acid or terephthalic acid.

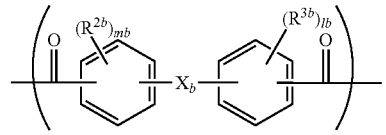

Formula (2b)

In Formula (2b), $R^{2b}$ and $R^{3b}$ each independently represent an alkyl group having 1 to 10 carbon atoms, an alkoxy group having 1 to 10 carbon atoms, a halogenated alkyl group, a halogen group, or a benzyl group, and mb and lb are an integer of 0 to 4. $X_b$ is a single bond or an oxygen atom. Specific examples of the alkyl group include a methyl group, an ethyl group, a propyl group, an isopropyl group, a butyl group, a tert-butyl group, an isobutyl group, and a cyclohexyl group.

Specific examples of the alkoxy group include a methoxy group, an ethoxy group, a propoxy group, and a cyclohexoxy group. Examples of the halogenated alkyl group include a chloromethyl group and a fluorinated alkyl group. Examples of the halogen group include a fluorine group, a chloro group, and a bromo group. From the standpoint of wear resistance, $R^{2b}$ and $R^{3b}$ are preferably an alkyl group having 1 to 6 carbon atoms or an alkoxy group having 1 to 6 carbon atoms, and particularly preferably a methyl group or an ethyl group. mb and lb each independently are an integer of 0 to 4, and from the standpoint of ease of production, preferably satisfy mb=lb=0.

Specific examples of the dicarboxylic acid compound from which the dicarboxylic acid residue represented by Formula (2b) is derived include diphenyl ether-2,2'-dicarboxylic acid, diphenyl ether-2,4'-dicarboxylic acid, diphenyl ether-4,4'-dicarboxylic acid, 4,4'-diphenyl dicarboxylic acid, 2,2'-diphenyl dicarboxylic acid, and 2,4'-diphenyl dicarboxylic acid. Among these, from the standpoint of ease of production and wear resistance, the dicarboxylic acid compound is particularly preferably diphenyl ether 4,4'-dicarboxylic acid or 4,4'-diphenyl dicarboxylic acid.

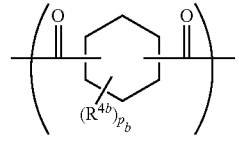

Formula (3b)

In Formula (3b), $R^{4b}$'s each independently represent an alkyl group having 1 to 10 carbon atoms. Specific examples of the alkyl group include a methyl group, an ethyl group, a propyl group, an isopropyl group, a butyl group, a tert-butyl group, an isobutyl group, and a cyclohexyl group. From the standpoint of wear resistance, $R^{4b}$ is preferably an alkyl group having 1 to 6 carbon atoms, and particularly preferably a methyl group or an ethyl group. $p_b$'s each independently are an integer of 0 to 10, and from the standpoint of ease of production, preferably satisfy the $p_b=0$.

Specific examples of the dicarboxylic acid compound from which the dicarboxylic acid residue represented by Formula (3b) is derived include trans-1,4-cyclohexanedicarboxylic acid, cis-1,4-cyclohexanedicarboxylic acid, trans-1,3-cyclohexanedicarboxylic acid, and cis-1,3-cyclohexanedicarboxylic acid. Among these, from the standpoint of production and wear resistance, the dicarboxylic acid compound is particularly preferably trans-1,4-cyclohexanedicarboxylic acid or cis-1,4-cyclohexanedicarboxylic acid.

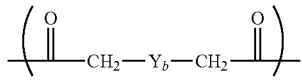

Formula (4b)

In Formula (4b), $Y_b$ represents a single bond, an alkylene group having 1 to 14 carbon atoms, a p-phenylene group, a m-phenylene group, or a 4,4'-biphenyl group. Specific examples of the alkylene group include a methylene group, an ethylene group, a propylene group, a butylene group, 2,2'-dimethylpropylene group, a cyclohexylene group, and a cyclohexanedimethyl group. Specific examples of the dicarboxylic acid compound from which the dicarboxylic acid residue represented by Formula (4b) is derived include malonic acid, succinic acid, 2,2-dimethylsuccinic acid, glutaric acid, azelaic acid, 1,3-adamantanedicarboxylic acid, sebacic acid, 1,10-decanedicarboxylic acid, and 1,4-phenylenediacetic acid.

The above dicarboxylic acid residues may be used in combination as necessary. In particular, in a case where a dicarboxylic acid residue represented by Formula (3b) or (4b) is included in the polyester resin, from the standpoint of wear resistance and solubility, it is preferable to be copolymerized with a dicarboxylic acid residue represented by Formula (1b) or (2b).

(Dihydric Phenol Residue and Dihydric Aliphatic Alcohol Residue)

The polyester resin preferably includes at least one of a dihydric phenol and/or a dihydric alcohol represented by Formulae (5b) to (12b).

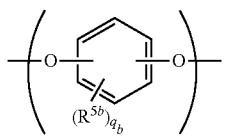

Formula (5b)

In Formula (5b), $R^{5b}$'s each independently represent an alkyl group having 1 to 10 carbon atoms, an alkoxy group having 1 to 10 carbon atoms, a halogenated alkyl group, a halogen group, or a benzyl group, and $q_b$ is an integer of 0 to 4.

Specific examples of the alkyl group include a methyl group, an ethyl group, a propyl group, an isopropyl group, a butyl group, a tert-butyl group, an isobutyl group, and a cyclohexyl group. Specific examples of the alkoxy group include a methoxy group, an ethoxy group, a propoxy group, and a cyclohexoxy group. Examples of the halogenated alkyl group include a chloromethyl group and a fluorinated alkyl group. Examples of the halogen group include a fluorine group, a chloro group, and a bromo group.

From the standpoint of wear resistance, $R^{5b}$ is preferably an alkyl group having 1 to 6 carbon atoms, or an alkoxy group having 1 to 6 carbon atoms and particularly preferably a methyl group or an ethyl group. $q_b$'s each independently are an integer of 0 to 4, and more preferably satisfy $q_b=0$ or 1.

Specific examples of the dihydric phenol compound from which the dihydric phenol residue represented by Formula (5b) is derived include hydroquinone, methylhydroquinone, bromohydroquinone, 2,3-dimethylhydroquinone, trimethylhydroquinone, resorcinol, 2-methylresorcinol, 5-methylresorcinol, 5-bromoresorcinol, catechol, and 4-methylcatechol. Among them, the dihydric phenol compound is particularly preferably hydroquinone, methylhydroquinone, or resorcinol from the standpoints of ease of production and wear resistance.

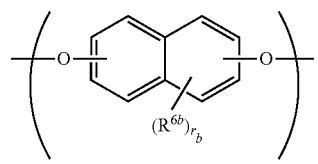

Formula (6b)

In Formula (6b), $R^{6b}$'s each independently represent an alkyl group having 1 to 10 carbon atoms, an alkoxy group having 1 to 10 carbon atoms, a halogenated alkyl group, a halogen group, or a benzyl group, and $r_b$ is an integer of 0 to 6.

Specific examples of the alkyl group include a methyl group, an ethyl group, a propyl group, an isopropyl group, a butyl group, a tert-butyl group, an isobutyl group, and a cyclohexyl group. Specific examples of the alkoxy group include a methoxy group, an ethoxy group, a propoxy group, and a cyclohexoxy group.

Examples of the halogenated alkyl group include a chloromethyl group and a fluorinated alkyl group. Examples of the halogen group include a fluorine group, a chloro group, and a bromo group. From the standpoint of wear resistance, the halogenated alkyl group is preferably an alkyl group having 1 to 6 carbon atoms or an alkoxy group having 1 to 6 carbon atoms, and particularly preferably a methyl group or an ethyl group. $r_b$'s each independently are preferably an integer of 0 to 4, and more preferably satisfy $r_b=0$ from the standpoint of ease of production.

Specific examples of the dihydric phenol compound from which the dihydric phenol residue represented by Formula (6b) is derived include 1,2-dihydroxynaphthalene, 1,3-dihydroxynaphthalene, 1,5-dihydroxynaphthalene, 1,6-dihydroxynaphthalene, 1,7-dihydroxynaphthalene, 2,3-dihydroxynaphthalene, 2,6-dihydroxynaphthalene, and 2,7-dihydroxynaphthalene.

Among these, from the standpoint of ease of production, solubility and wear resistance, the dihydric phenol compound is particularly preferably 1,6-dihydroxynaphthalene, 1,7-dihydroxynaphthalene 2,6-dihydroxynaphthalene, or 2,7-dihydroxynaphthalene.

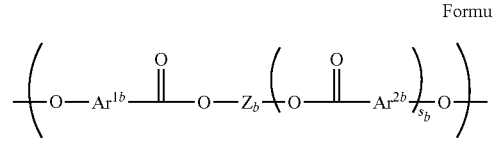

Formula (7b)

In Formula (7b), $Ar^{1b}$ and $Ar^{2b}$ each independently represent a p-phenylene group, a m-phenylene group, a divalent naphthalene group, or a divalent biphenyl group, $Z_b$ represents an alkylene group having 1 to 10 carbon atoms, a p-phenylene group, or a compound having a structure represented by Formula (12b), and $s_b$ is an integer of 0 or 1.

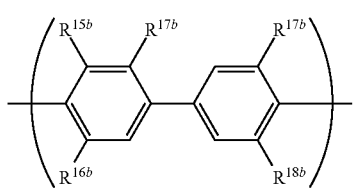

Formula (12b)

In Formula (12b), $R^{15b}$ to $R^{18b}$ each independently represent a hydrogen atom or an alkyl group having 1 to 10 carbon atoms.

Specific examples of the alkylene group in Formula (7b) include a methylene group, an ethylene group, a propylene group, a butylene group, a 2,2-dimethylpropylene group, a cyclohexylene group, and a cyclohexanedimethyl group. From the standpoints of solubility and wear resistance, the alkylene group is preferably an alkylene group having 1 to 8 carbon atoms, and particularly preferably an ethylene group, a cyclohexylene group, or a cyclohexanedimethyl group.

Specific examples of the alkyl group in Formula (12b) include a methyl group, an ethyl group, a propyl group, an isopropyl group, a butyl group, a tert-butyl group, an isobutyl group, and a cyclohexyl group. From the standpoints of solubility, wear resistance, and ease of production, the alkyl group is preferably a methyl group.

Specific examples of a dihydric phenol compound from which the dihydric phenol residue represented by Formula (7b) is derived are shown below.

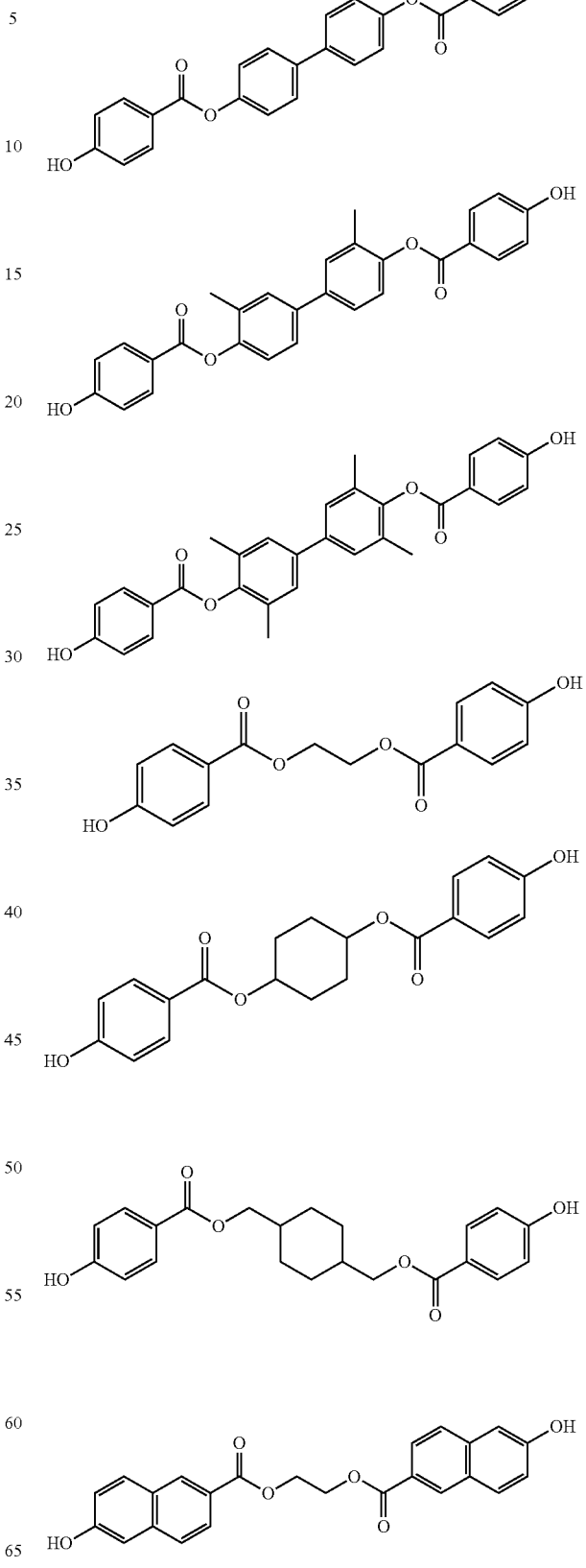

-continued

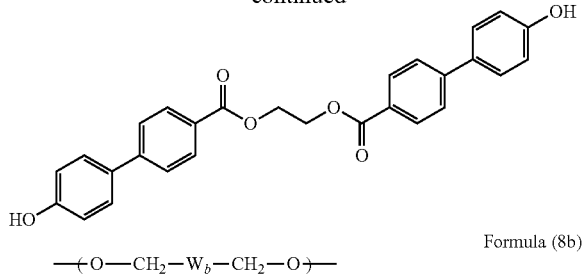

Formula (8b)

In Formula (8b), $W_b$ represents a single bond, an alkylene group having 1 to 16 carbon atoms, a perfluoroalkylene group having 3 to 10 carbon atoms, a m-phenylene group, a p-phenylene group, a divalent biphenyl group, or a divalent naphthalene group.

Specific examples of the alkylene group include a methylene group, an ethylene group, a propylene group, a butylene group, a hexylene group, a cyclohexylene group, and an octylene group. Specific examples of the perfluoroalkylene group include a hexafluoro-1,3-propylene group, an octafluoro-1,4-butylene group, a dodecafluoro-1,6-hexylene group, and a hexadecafluoro-1,8-octylene group. From the standpoint of solubility and wear resistance, $W_b$ is preferably is an alkylene group having 1 to 6 carbon atoms or a perfluoroalkylene group having 3 to 8 carbon atoms.

Specific examples of a dihydric alcohol compound from which the dihydric alcohol residue represented by Formula (8b) is derived include ethylene glycol, 1,3-propylene glycol, 1,4-butanediol, 1,5-pentanediol, 1,3-cyclopentane dimethanol, 1,6-hexanediol, 1,4-cyclohexanedimethanol, 1,8-octanediol, 1,10-decanediol, 1,12-dodecanediol, 1,16-hexadecanediol, 1,4-benzenedimethanol, 4,4'-biphenyldimethanol, 2,2,3,3,4,4-hexafluoro-1,5-pentanediol, 2,2,3,3,4,4,5,5,6,6,7,7-dodecafluoro-1,8-octanediol, and 1H,1H,10H,10H-hexadecafluoro-1,10-decanediol.

Among these, from the standpoint of ease of production, solubility, and wear resistance, the dihydric alcohol compound is particularly preferably ethylene glycol, 1,4-butanediol, 1,4-cyclohexanedimethanol, 1,8-octanediol, 1,4-benzenedimethanol, or 4,4'-biphenylmethanol.

Formula (9b)

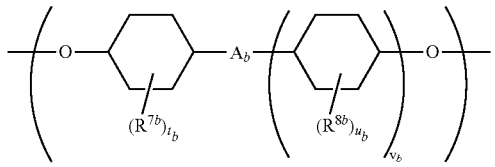

In Formula (9b), $R^{7b}$ and $R^{8b}$ each independently represent an alkyl group having 1 to 10 carbon atoms, or an alkoxy group having 1 to 10 carbon atoms, and $t_b$ and $u_b$ each are an integer of 0 to 10.

$A_b$ represents a single bond or $-CR^{9b}R^{10b}-$. $R^{9b}$ and $R^{10b}$ each independently represent a hydrogen atom, an alkyl group having 1 to 20 carbon atoms or a group that has a ring structure formed by bonding $R^{9b}$ and $R^{10b}$ to each other and may have a substituent. $v_b$ is an integer of 0 or 1.

Specific examples of the alkyl group include a methyl group, an ethyl group, a propyl group, an isopropyl group, a butyl group, a tert-butyl group, an isobutyl group, and a cyclohexyl group. Specific examples of the alkoxy group include a methoxy group, an ethoxy group, a propoxy group, and a cyclohexoxy group. From the standpoint of wear resistance, the alkyl group is preferably an alkyl group having 1 to 6 carbon atoms or an alkoxy group having 1 to 6 carbon atoms, and particularly preferably a methyl group or an ethyl group. $t_b$ and $u_b$ each independently are an integer of 0 to 10, and from the standpoint of ease of production, preferably satisfy $t_b=u_b=0$.

Specific examples of a dihydric alcohol compound from which the dihydric alcohol residue represented by Formula (9b) is derived include 1,4-cyclohexanediol, 2,2-bis(4-hydroxycyclohexyl)propane, and 4,4-bicyclohexanol.

Formula (10b)

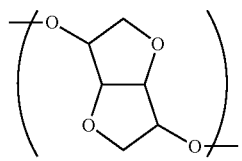

Specific examples of a dihydric alcohol compound from which the dihydric alcohol residue represented by Formula (10b) is derived include isomannide and isosorbide.

Formula (11b)

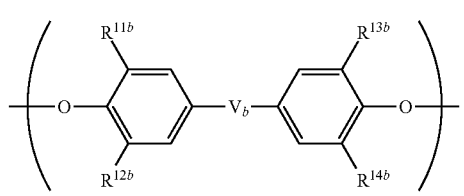

In Formula (11b), $R^{11b}$ to $R^{14b}$ each independently represent a hydrogen atom or a methyl group. $V_b$ represents a single bond, $-CR^{15b}R^{16b}-$, O, CO, or S. $R^{15b}$ and $R^{16b}$ each independently represent a hydrogen atom, a methyl group or an ethyl group, or $R^{15b}$ and $R^{16b}$ represent an cyclopentyl group or a cyclohexylidene group formed by bonding $R^{15b}$ and $R^{16b}$.

Specific examples of bisphenol residues of a polyester resin represented by Formula (11b) include bis-(4-hydroxyphenyl)methane, bis-(4-hydroxy-3-methylphenyl)methane, bis-(3,5-dimethyl-4-hydroxyphenyl)methane, 1,1-bis-(4-hydroxyphenyl)ethane, 1,1-bis-(4-hydroxy-3-methylphenyl) ethane, 1,1-bis-(3,5-dimethyl-4-hydroxyphenyl)ethane, 1,1-bis-(4-hydroxyphenyl)propane, 1,1-bis-(4-hydroxy-3-methylphenyl)propane, 1,1-bis-(3,5-dimethyl-4-hydroxyphenyl)propane, 2,2-bis-(4-hydroxyphenyl) propane, 2,2-bis-(4-hydroxy-3-methylphenyl)propane, 2,2-bis-(3,5-dimethyl-4-hydroxyphenyl)propane, 1,1-bis-(4-hydroxyphenyl)cyclohexane, 1,1-bis-(4-hydroxy-3-methylphenyl)cyclohexane, 1,1-bis-(3,5-dimethyl-4-hydroxyphenyl)cyclohexane, 1,1-bis-(4-hydroxyphenyl)-1-phenylethane, 4,4'-biphenol, 3,3'-dimethyl-4,4'-biphenol, 3,3',5,5'-tetramethyl-4,4'-biphenol, 4,4'-dihydroxydiphenyl ether, 3,3'-dimethyl-4,4'-dihydroxydiphenyl ether, bis(4-hydroxyphenyl)sulfide, and 4,4'-dihydroxybenzophenone.

Among these, considering ease of production, solubility, electrical properties of the dihydric phenol components, the bisphenol residues are preferably bis-(4-hydroxyphenyl) methane, bis-(4-hydroxy-3-methylphenyl)methane, bis-(3, 5-dimethyl-4-hydroxyphenyl)methane, 1,1-bis-(4-hydroxyphenyl)ethane, 1,1-bis-(4-hydroxy-3-methylphenyl)ethane, 2,2-bis-(4-hydroxyphenyl)propane, 2,2-bis-(4-hydroxy-3-methylphenyl)propane, 2,2-bis-(3,5-dimethyl-4-hydroxyphenyl)propane, 1,1-bis-(4-hydroxyphenyl)cyclohexane, 4,4'-biphenol, 3,3'-dimethyl-4,4'-biphenol, 3,3',5,5'-tetramethyl-4,4'-biphenol, or 4,4'-dihydroxydiphenyl ether.

Further, considering mechanical properties, the bisphenol residues are more preferably bis-(4-hydroxyphenyl)methane, bis-(4-hydroxy-3-methylphenyl)methane, 1,1-bis-(4-hydroxyphenyl)ethane, 1,1-bis-(4-hydroxy-3-methylphenyl)ethane, 2,2-bis-(4-hydroxy-3-methylphenyl)propane, 4,4'-biphenol, 3,3'-dimethyl-4,4'-biphenol, or 3,3',5,5'-tetramethyl-4,4'-biphenol.

In the case of producing the polyester resin according to the present invention using at least one of the dihydric phenol or dihydric alcohol represented by Formulae (5b) to (10b), the dihydric phenol represented by Formula (11b) is preferably copolymerized therewith from the standpoints of solubility, molecular weight of the resin, and mechanical properties. The content of Formula (11b) is not particularly specified, but the content is preferably 5 mol % or more, more preferably 30 mol % or more, and even more preferably 50 mol % or more based on the entire dihydric phenol and dihydric alcohol content.

<<Polyester-Polycarbonate Resin of Third Embodiment>>

Regarding the polyester moiety contained in the polyester-polycarbonate resin, a dicarboxylic acid, a dihydric phenol and/or a dihydric alcohol used for forming the polyester moiety is preferably equivalent to those of the above polyester resin. A carbonate oligomer and a polycarbonate resin have preferably a structure represented by Formula (13b).

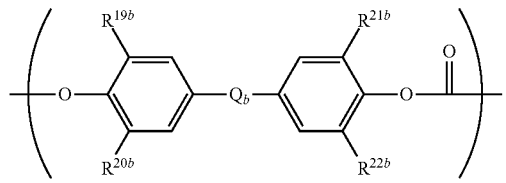

Formula (13b)

In Formula (13b), $R^{19b}$ to $R^{22b}$ each independently represent a hydrogen atom or a methyl group. $Q_b$ represents a single bond, $-CR^{23b}R^{24b}-$, O, CO, or S. $R^{23b}$ and $R^{24b}$ each independently represent a hydrogen atom, a methyl group, or an ethyl group, or $R^{23b}$ and $R^{24b}$ represent a cyclopentyl group or a cyclohexylidene group formed by bonding $R^{23b}$ and $R^{24b}$. From the standpoints of wear resistance and ease of production, $R^{19b}$, $R^{21b}$, $R^{20b}$, and $R^{22b}$ preferably satisfy $R^{19b}=R^{21b}$=hydrogen atom or methyl group, $R^{20b}=R^{22b}$=hydrogen atom. $R^{23b}$ and $R^{24b}$ are preferably a hydrogen atom or a methyl group.

<<Properties of Resins of Third Embodiment>>

From the standpoint of mechanical strength, the viscosity-average molecular weight (Mw) of the polyester resin and the polyester-polycarbonate resin produced according to the production method of the present invention is usually 15,000 or more, and preferably 20,000 or more. From the standpoint of applicability, the viscosity-average molecular weight of the polyester resin and the polyester-polycarbonate resin is usually 150,000 or less, and, preferably 100,000 or less.

The amount of the carboxylic acid chloride group present at the terminal of the polyester resin according to the present invention is usually 0.1 μeq/g or less, and preferably 0.05 μeq/g or less. In a case where the amount of the terminal carboxylic acid chloride group exceeds the above range, the storage stability tends to decrease in a case where the polyester resin is used as a coating fluid for an electrophotographic photoreceptor.

The amount of OH group present at the terminal of the polyester resin according to the present invention is usually 100 μeq/g or less, and preferably 50 μeq/g or less. In a case where the amount of the terminal OH group exceeds the above range, the electrophotographic photoreceptor produced from the polyester resin may have inferior electrical properties.

The amount of carboxylic acid group present at the terminal of the polyester resin according to the present invention is usually 200 μeq/g or less, and preferably 100 μeq/g or less. In a case where the amount of the terminal carboxylic acid group exceeds the above range, the electrophotographic photoreceptor produced from the polyester resin may have inferior electrical properties.

The total amount of nitrogen included in the polyester resin (T-N amount) is preferably 3000 ppm or less, more preferably 1500 ppm or less, and particularly preferably 1000 ppm or less. In a case where the total amount of nitrogen exceeds 3000 ppm, degradation of electrical properties may occur.

<<Producing Method of Polyester Resin of First Embodiment>>

Next, a producing method of a polyester resin used for an electrophotographic photoreceptor to which the present embodiment is applied will be described. In producing the polyester for an electrophotographic photoreceptor, the polyester for an electrophotographic photoreceptor is usually produced using an interfacial polymerization method.

However, in the production of the polyester resin according to the present invention, the monomer used here is a monomer such as hydroquinone that is readily oxidized in alkaline aqueous solution. Thus, in an interfacial polymerization method, the monomer that has become an alkali salt in an aqueous solution is promptly oxidized to ones such as a quinone. To prevent such oxidation, the producing method of the polyester resin according to the present invention is preferably a solution polymerization method, or a polymerization method combining a solution polymerization method and an interfacial polymerization method.

In another case of producing the polyester resins according to the present invention, since the dihydric phenols used for the polyester resins according to the present invention are dihydric phenols having an aromatic ester bond, in a case where interfacial polymerization method is used, dihydric phenols that have become alkali salts and then dissolved into an aqueous layer are promptly hydrolyzed by nucleophiles such as a hydroxide ion, which stops the polymerization. Therefore, the producing method of the polyester resin according to the present invention is preferably a solution polymerization method or a polymerization method combining a solution polymerization method and an interfacial polymerization method.

An example of the producing method of the polyester resin is described below.

<Production Method by Solution Polymerization Method>

In production by the solution polymerization method, for example, the polyester resin can be obtained by polymerizing a mixture obtained by adding a base such as triethylamine into a solvent to which a dihydric phenol compound and a dicarboxylic acid chloride compound have been dissolved. From the standpoint of productivity, polymerization is preferably performed at a polymerization temperature in a range of −10° C. to 40° C. and for a polymerization time in a range of 0.5 hours to 10 hours. By washing and collecting the polyester resin that has been dissolved in the organic phase after completion of the polymerization, the target polyester resin is obtained.

Examples of a base used in a solution polymerization method include tertiary amines such as triethylamine, tripropylamine, tributylamine, N,N-diisopropylethylamine, N,N-dipropylethylamine, N,N-diethylmethylamine, N,N-dimethylethylamine, N,N-dimethylbutylamine, N,N-dimethylisopropylamine, N,N-diethyl isopropylamine, N,N,N',N'-tetramethyldiethylamine, and 1,4-diazabicyclo[2,2,2]octane; pyridines such as pyridine and 4-methylpyridine; and organic bases such as 1,8-diazabicyclo[5.4.0]-undec-7-ene.

The base is not particularly specified so long as the base can be used for esterification reaction of bases such as phosphazene bases and inorganic bases. Among these, from the standpoints of reactivity on esterification reaction and availability, the base is preferably triethylamine N,N-dipropylethylamine, N,N-diethylmethylamine, or pyridine; and from the standpoints of suppressing decomposition of acid chloride and ease of removal in cleaning, the base is particularly preferably triethylamine. The amount of the base to be used is preferably in the range of 1.01 equivalents to 2 equivalents of the carboxylic acid chloride group present in the reaction system.

Examples of the solvent include halogenated hydrocarbon compounds such as dichloromethane, chloroform, 1,2-dichloroethane, trichloroethane, tetrachloroethane, chlorobenzene, and dichlorobenzene; aromatic hydrocarbon compounds such as toluene, anisole, and xylene; hydrocarbon compounds such as cyclohexane and methyl cyclohexane; ether compounds such as tetrahydrofuran, tetrahydropyran, 1,4-dioxane, and 1,3-dioxolane; ester compounds such as ethyl acetate, methyl benzoate, and benzyl acetate; and amide compounds such as N,N-dimethylformamide and N,N-dimethylacetamide.

Pyridine may be used as both base and solvent. Among these, from the standpoints of solubility and reactivity on esterification reaction of monomer or oligomer to be generated, the solvent is preferably dichloromethane, chloroform, 1,2-dichloroethane, tetrahydrofuran, N,N-dimethylformamide, or pyridine. Further, from the standpoints of cleaning efficiency and electrical properties, the solvent is particularly preferably dichloromethane.

In producing the polyester resin by a solution polymerization method, the ratio of the dihydric phenol and the dicarboxylic acid chloride is not particularly specified, but from the standpoints of producing polyester resin having a high molecular weight and controllability of the terminal groups thereof, the dihydric phenol and the dicarboxylic acid chloride are preferably in a molar ratio of 1:0.95 to 1:1.05, more preferably 1:0.99 to 1:1.01, and particularly preferably 1:0.995 to 1:1.005.

In a case where a dihydric phenol has a poor solubility with respect to the solvent, precipitation may occur in the reaction of the dihydric phenol and a dicarboxylic acid chloride, which may cause the insoluble portion of the polyester resin to be produced to remain and may degrade electrical properties thereof. In another case where a dihydric phenol has a poor solubility with respect to the solvent, precipitation may occur in the reaction of the dihydric phenol and a dicarboxylic acid chloride, which may lead to cloudiness of the reaction solution and inhibit oligomerization. Therefore, in a case where a dihydric phenol having poor solubility is employed for producing the polyester resin, the dihydric phenol is preferably copolymerized with a dihydric phenol with an excellent solubility. In order to enhance the solubility, the dihydric phenol having a poor solubility is more preferably added into a reaction system, in which oligomer has been generated in advance through reaction between a dihydric phenol with an excellent solubility and a dicarboxylic acid chloride, and subjected to a reaction so as to produce the polyester resin.

In producing the polyester resin, molecular weight regulator may be used. Examples of the molecular weight regulator include alkyl phenols such as phenol, o,m,p-cresol, o,m,p-ethylphenol, o,m,p-propylphenol, o,m,p-(tert-butyl)phenol, pentylphenol, hexylphenol, octylphenol, nonylphenol, 2,6-dimethylphenol derivatives, and 2-methylphenol derivatives; monofunctional phenols such as o,m,p-phenylphenol; and monofunctional acid halides such as acetic acid chloride, butyric acid chloride, octylic acid chloride, benzoyl chloride, benzene sulfonyl chloride, benzene sulfinyl chloride, sulfinyl chloride, and benzene phosphonyl chloride and substituted groups thereof.

Examples of the molecular weight regulator further include monofunctional aliphatic alcohols such as methanol, ethanol, and propanol; monofunctional alcohols having an acryl such as 2-hydroxyethyl acrylate, 4-hydroxybutyl acrylate, and 2-hydroxyethyl methacrylate; monofunctional alcohols having a perfluoroalkyl such as 1H,1 H,2H,2H-tridecafluoro-1-n-octanol and 1H,1 H,2H,2H-heptadecafluoro-1-decanol; and monofunctional alcohols having a siloxane. Among these, in terms of high molecular weight controllability and solution stability, the molecular weight regulator is preferably an o,m,p-(tert-butyl)phenol, a 2,6-dimethylphenol derivative, or a 2-methylphenol derivative. The molecular weight regulator is particularly preferably p-(tert-butyl) phenol, 2,3,6-trimethylphenol or 2,3,5-trimethylphenol.

Further, in order not to oxidize the dihydric phenol, an antioxidant can be added during the polymerization reaction or in the washing solution. Examples of the antioxidant include sodium sulfite, hydrosulfite (sodium hyposulfite), sulfur dioxide, potassium sulfite, sodium hydrogen sulfite, and the like. Among these, hydrosulfite is particularly preferable from the standpoints of the effect of oxidation prevention and reduction of environmental load. The amount of the antioxidant to be used is preferably 0.01 mass % to 10.0 mass % with respect to the total dihydric phenol. The amount of the antioxidant to be used is more preferably 0.1 mass % to 5 mass %.

Any cleaning method of the polyester resin after polymerization that does not significantly impair the effect of the present invention can be used. Examples of the cleaning method include a method in which the solution of the polyester resin is washed using an aqueous solution of alkaline substance such as sodium hydroxide and potassium hydroxide; an aqueous solution of acidic substance such as hydrochloric acid, nitric acid, and phosphoric acid; or water, and then separated by static separation or by centrifugation.

The polyester resin solution after washing may be taken out by: subjecting to precipitation with water, alcohol, or other organic solvents in which the polyester resin is insoluble; or distilling off the solvent in the polyester resin solution with hot water or dispersion medium in which the polyester resin is insoluble; or distilling the solvent off with heating or reducing pressure; or, in a case where the polyester resin solution has been taken out in a slurry form, the solid content thereof may be taken out using a centrifuge or filter.

The polyester resin is usually dried at the decomposition temperature of the polyester resin or below, but preferably dried at 20° C. or above and at the melting temperature of the polyester resin or below. The polyester resin is preferably dried under reduced pressure. The drying time is preferably longer than the time taken until the purity of the impurities such as residual solvent decreases a certain level or lower. Specifically, the drying time is usually longer than the time taken until the purity of the residual solvent decreases to 1000 ppm or lower, preferably 300 ppm or lower, and more preferably 100 ppm or lower.

<Producing Method combining Solution Polymerization Method and Interfacial Polymerization Method>

The polyester resin of the present invention can be produced in two steps: in a first step, an ester oligomer is produced from a dihydric phenol having an aromatic ester bond by a solution polymerization method, or an carbonate oligomer or a polycarbonate resin is produced by a melt polymerization method; and in a second step, using the ester oligomer, the carbonate oligomer, or the polycarbonate, the polyester resin of the present invention is obtained by an interfacial polymerization method. By introducing a dihydric phenol residue having an aromatic ester bond to the oligomer produced in the first step, the oligomer becomes insoluble to an aqueous layer during the interfacial polymerization in the second step and thus does not undergone hydrolysis of the aromatic ester bond, thereby allowing the polyester resin to be produced.

(First Step: (1) Producing Method of Ester Oligomer)

Examples of producing the ester oligomer include a solution polymerization, melt polymerization, and interfacial polymerization. Among these, from the standpoints of preventing oxidization of bisphenol, reactivity of dihydric alcohol, and stability of ester bonding in a monomer, a solution polymerization and a melt polymerization are preferable. Further, from the standpoint of ease of production solution polymerization is particularly preferable.

In a case where a dihydric phenol having an ester bond is used, the dihydric phenol is preferably used during production of the ester oligomer. In general interfacial polymerization methods in producing polyester for an electrophotographic photoreceptor, in a case where a dihydric phenol that has become an alkali salt is dissolved in an aqueous layer, the ester bond is promptly hydrolyzed by nucleophiles such as hydroxide ion, and this stops the polymerization. On the contrary, in a case where a dihydric phenol having an ester bond in an ester oligomer is introduced by a solution polymerization method or melt polymerization method, the solubility of the ester oligomer in an aqueous solution decreases and hydrolysis of the ester oligomer is prevented, which makes possible the use of the dihydric phenol in production of polyester described below.

In a case where a readily oxidizable dihydric phenol is used, the dihydric phenol is preferably used during production of the ester oligomer. Readily oxidizable dihydric phenols become particularly readily oxidizable in an anionic form. Therefore, in an interfacial polymerization method, the readily oxidizable dihydric phenol changes into an anion by a strongly alkaline aqueous solution that is promptly oxidized, through which the polymerization stops. On the contrary, in a case where a solution polymerization method or melt polymerization method in which an anion is not formed is used, a readily oxidizable dihydric phenol is introduced into the ester oligomer in advance, and this makes possible the use of the readily oxidizable dihydric phenol in production of polyester that will be described below.

In the production of the ester oligomer using a solution polymerization method, the ester oligomer can be obtained, for example, by polymerizing a mixture obtained by adding a base such as triethylamine into a solvent to which a dihydric phenol compound and/or dihydric alcohol compound, and a dicarboxylic acid chloride compound have been dissolved. From the standpoint of productivity, polymerization is preferably performed at a polymerization temperature in a range of −10° C. to 40° C. and for a polymerization time in a range of 0.5 hours to 10 hours. By washing and collecting the oligomer that has been dissolved in the organic phase after completion of the polymerization, the target oligomer is obtained. The washed oligomer solution may not be collected and used for the following polyester polymerization as it is. In the production of the ester oligomer, the conditions of the base, solvent, terminating agent, and antioxidant using the solution polymerization method are preferably equivalent to those of the polyester resin by solution polymerization method.

Examples of the base used in the solution polymerization method include tertiary amines such as triethylamine, tripropylamine, tributylamine, N,N-diisopropylethylamine, N,N-dipropylethylamine, N,N-diethylmethylamine, N,N-dimethylethylamine, N,N-dimethylbutylamine, N,N-dimethylisopropylamine, N,N-diethylisopropylamine, N,N,N',N'-tetramethyldiethylamine, and 1,4-diazabicyclo[2,2,2]octane; pyridines such as pyridine and 4-methylpyridine; and organic bases such as 1,8-diazabicyclo[5.4.0]-undec-7-ene.

The base is not particularly specified so long as the base can be used for esterification reaction of bases such as phosphazene bases and inorganic bases. Among these, from the standpoints of reactivity on esterification reaction and availability, the base is preferably triethylamine N,N-dipropylethylamine, N,N-diethylmethylamine, or pyridine; and from the standpoints of suppressing decomposition of acid chloride and ease of removal in cleaning, the base is particularly preferably triethylamine. The amount of the base to be used is preferably in the range of 1.01 equivalents to 2 equivalents of the carboxylic acid chloride group present in the reaction system.

Examples of the solvent include halogenated hydrocarbon compounds such as dichloromethane, chloroform, 1,2-dichloroethane, trichloroethane, tetrachloroethane, chlorobenzene, and dichlorobenzene; aromatic hydrocarbon compounds such as toluene, anisole, and xylene; hydrocarbon compounds such as cyclohexane and methyl cyclohexane; ether compounds such as tetrahydrofuran, tetrahydropyran, 1,4-dioxane, and 1,3-dioxolane; ester compounds such as ethyl acetate, methyl benzoate, and benzyl acetate; and amide compounds such as N,N-dimethylformamide and N,N-dimethylacetamide. Pyridine may be used as both base and solvent.

Among these, from the standpoints of solubility and reactivity on the esterification reaction of the monomer or generated oligomer, the solvent is preferably dichloromethane, chloroform, 1,2-dichloroethane, tetrahydrofuran, N,N-dimethylformamide or pyridine. Further, from the standpoints of cleaning efficiency and electrical properties, the solvent is particularly preferably dichloromethane.

In producing oligomer using a solution polymerization method, the ratio of the dihydric phenol and/or the dihydric alcohols and the dicarboxylic acid chloride is not limited to a particular ratio, any one of these needs to be excessively present in order to be used in the polyester production described below. Since an oligomer having phenol terminal has higher storage stability in air or solution than an oligomer having carboxylic acid chloride terminal, the dihydric phenol and/or dihydric alcohol are preferably more excessively present than dicarboxylic acid chloride. In a case where the dihydric phenol and/or dihydric alcohol are more excessively present than the dicarboxylic acid chloride, the ratio between the dihydric phenol and/or the dihydric alcohol and dicarboxylic acid chloride is preferably 10:1 to 1.1:1 in terms of molar ratio.

In a case where the dihydric alcohol is used in production of ester oligomer having an alcohol at the terminal thereof, there is a possibility that the oligomer is unusable for the production method of the polyester described below due to the low reactivity of the hydroxyl group. Therefore, in order to introduce dihydric alcohol residue into the structure of the ester oligomer, the dihydric alcohol needs to be copolymerized with dihydric phenol. With a copolymerization method in which a dihydric alcohol and dicarboxylic acid chloride react in advance and dihydric phenol is added thereto and subjected to a reaction, a oligomer as a copolymer thereof having a phenolic hydroxyl group at the terminal can be obtained. The ratio between a dihydric alcohol and a dicarboxylic acid chloride is 1:10 to 1:1.1 in terms of molar ratio, that is, it is preferable that a dihydric acid chloride is excessively used relative to a dihydric alcohol.

In production of the ester oligomer, in a case where a dihydric phenol having a poor solubility with respect to the solvent, precipitation may occur in reaction between the dihydric phenol and a dicarboxylic acid chloride, and may lead to cloudiness of the reaction solution and inhibit the oligomerization. Therefore, in a case where a dihydric phenol having a poor solubility is introduced into ester oligomer, the dihydric phenol is preferably copolymerized with a dihydric phenol and/or dihydric alcohol with an excellent solubility. In order to enhance the solubility of the dihydric phenol having a poor solubility, the dihydric phenol having a poor solubility is more preferably added into a reaction system, after reaction between a dihydric phenol and/or a dihydric alcohol with an excellent solubility and a dicarboxylic acid chloride, and subjected to a reaction. Examples of monomers having a poor solubility include rigid aromatic compounds such as hydroquinone, 4,4'-biphenol, and 4-hydroxybenzoate-4-hydroxyphenyl.

In producing ester oligomers, a molecular weight regulator may be used. This molecular weight regulator may also be used in polyester production described below. Examples of the molecular weight regulator include alkyl phenols such as phenol, o,m,p-cresol, o,m,p-ethylphenol, o,m,p-propylphenol, o,m,p-(tert-butyl)phenol, pentylphenol, hexylphenol, octylphenol, nonylphenol, 2,6-dimethylphenol derivatives, and 2-methylphenol derivatives; monofunctional phenols such as o,m,p-phenylphenol; and monofunctional acid halides such as acetic acid chloride, butyric acid chloride, octylic acid chloride, benzoyl chloride, benzene sulfonyl chloride, benzene sulfinyl chloride, sulfinyl chloride, and benzene phosphonyl chloride and substituted groups thereof.

Examples of the molecular weight regulator further include monofunctional aliphatic alcohols such as methanol, ethanol, and propanol; monofunctional alcohols having an acryl such as 2-hydroxyethyl acrylate, 4-hydroxybutyl acrylate, and 2-hydroxy methacrylate; monofunctional alcohols having a perfluoroalkyl such as 1H,1H,2H,2H-tridecafluoro-1-n-octanol and 1H,1H,2H,2H-heptadecafluoro-1-decanol; and monofunctional alcohols having a siloxane.

Among these, from the standpoints of high molecular weight controllability and solution stability, the molecular weight regulator is preferably an o,m,p-(tert-butyl)phenol, a 2,6-dimethylphenol derivative, or 2-methylphenol derivative. The molecular weight regulator is particularly preferably p-(tert-butyl)phenol, 2,3,6-trimethylphenol or 2,3,5-trimethylphenol.

The viscosity-average molecular weight (Mv) of the ester oligomer is usually 800 or more and 20,000 or less, and preferably 15,000 or less. In a case where the viscosity-average molecular weight of the ester oligomer is less than 800, the ester oligomer may be dissolved into the alkaline aqueous solution at the time of polyester production and the ester bonding therein may be decomposed by interfacial polymerization described below. In a case where the viscosity-average molecular weight of the oligomer exceeds 20,000, the production efficiency may be reduced, and it may be difficult to adjust the viscosity-average molecular weight as intended at the time of producing the polyester described below.

Further, in order not to oxidize the dihydric phenol, an antioxidant can be added during the polymerization reaction or in the washing solution. Examples of the antioxidant include sodium sulfite, hydrosulfite (sodium hyposulfite), sulfur dioxide, potassium sulfite, sodium hydrogen sulfite, and the like. Among these, hydrosulfite is particularly preferable from the standpoints of effect of oxidation prevention and reduction of environmental load. The amount of the antioxidant to be used is usually 0.01 mass % or more with respect to the total dihydric phenol, and preferably 0.1 mass % or more from the standpoint of preventing oxidation. The amount of the antioxidant to be used is usually 10.0 mass % or less, preferably 5 mass % or less from the standpoint of electrical properties.

Any cleaning method of the ester oligomer after polymerization that does not significantly impair the effect of the present invention can be used. Examples of the cleaning method include a method in which the solution of the ester oligomer is washed using an aqueous solution of alkaline substance such as sodium hydroxide and potassium hydroxide; an aqueous solution of acidic substance such as hydrochloric acid, nitric acid, and phosphoric acid; or water, and then separated by static separation or by centrifugation.

The ester oligomer after washing may be taken out by subjecting to precipitation with water, alcohol, or other organic solvent to which the ester oligomer is insoluble; or distilling off the solvent in the ester oligomer solution with hot water or dispersion medium to which the polyester oligomer is insoluble or distilling of the solvent by heating or reducing pressure or, in a case where the ester oligomer has been taken out in a slurry form, the solid content thereof may be taken out using centrifuge or filter. The washed ester oligomer solution may not be taken out and used for the following polyester resin production as it is.

In a case where the ester oligomer is taken out, the ester oligomer is usually dried at the decomposition temperature of the ester oligomer or below, but preferably dried at 20° C. or above and at the melting temperature of the ester oligomer or below. The ester oligomer is preferably dried under reduced pressure. The drying time is preferably longer than the time taken until the purity of the impurities such as residual solvent decreases to a certain level or lower. Specifically, the drying time is usually longer than the time taken until the purity of the residual solvent decreases to 1000 ppm or lower, preferably 300 ppm or lower, and more preferably 100 ppm or lower.

The base used at the time of producing the ester oligomer may cause adverse effects on production of the polyester described below such as inhibition of reaction and decomposition of dicarboxylic acid chloride. Thus, the residual amount of the base is set to be usually 50,000 ppm or less, preferably 10,000 ppm or less, and more preferably 5,000 ppm or less.

(First Step: (2) Producing Method of Carbonate Oligomer and Polycarbonate Resin)

The carbonate oligomer or polycarbonate resin used in the present invention is produced by melt polymerization. The carbonate oligomer or polycarbonate produced by a melt polymerization has many phenol terminals and thus is able to react with carboxylic acid chloride at the time of producing the polyester described below so that a copolymer thereof can be easily obtained. The amount of OH groups present at the terminals of the carbonate oligomer and polycarbonate is usually 30 μeq/g or more, preferably 50 μeq/g or more. If the amount of the terminal OH group does not exceed the above range, the carbonate oligomer and polycarbonate may not react sufficiently at the time of production of the polyester resin described below such that the copolymer thereof may not be obtained.

(Second Step: Producing Method of Polyester)

In a case where a polyester resin is produced using at least one of the ester oligomer, carbonate oligomer, and polycarbonate resin, a solution polymerization method or an interfacial polymerization method is preferred. In particular, interfacial polymerization method is particularly preferable from the standpoints of ease of regulating molecular weight of the polyester resin to be produced and electrical properties.

In the case of production by an interfacial polymerization method, an alkaline aqueous solution and a solution of a halogenated hydrocarbon and aromatic hydrocarbon to which the above ester oligomer and an aromatic dicarboxylic acid chloride compound have been dissolved are mixed. Here, a quaternary ammonium salt and quaternary phosphonium salt may be present therein as a catalyst. From the standpoint of productivity, polymerization is preferably performed at a polymerization temperature in a range of 0° C. to 40° C. and for a polymerization time in a range of 2 hours to 20 hours. By separating the aqueous phase and the organic phase, washing and collecting the polymer that has been dissolved in the organic phase after completion of the polymerization, the target resin is obtained. In production by interfacial polymerization, dihydric phenol may be additionally added to the alkaline aqueous solution as necessary.

Examples of the alkaline component used in the interfacial polymerization method include alkaline metal hydroxides such as sodium hydroxide and potassium hydroxide. The amount of alkaline component to be used is preferably in the range of 1.01 equivalents to 3 equivalents of the phenolic hydroxyl group contained in the reaction system.

Examples of the halogenated hydrocarbon include dichloromethane, chloroform, 1,2-dichloroethane, trichloroethane, tetrachloroethane, and dichlorobenzene. Examples of the aromatic hydrocarbons include toluene, xylene, and benzene.

Examples of the quaternary ammonium salt or quaternary phosphonium salt used as a catalyst include salts (e.g. hydrochloride, bromate, and iodate salts) of tertiary alkyl amines such as tributylamine and trioctylamine; benzyltriethylammonium chloride, benzyltrimethylammonium chloride, benzyltributylammonium chloride, tetraethylammonium chloride, tetrabutylammonium chloride, tetrabutylammonium bromide, trioctylmethyl ammonium chloride, tetrabutylphosphonium bromide, triethyloctadecyl phosphonium bromide, N-laurylpyridinium chloride, and laurylpicolinium chloride.

In the interfacial polymerization method, a molecular weight regulator may be used. Examples of the molecular weight regulator include alkyl phenols such as phenol, o,m,p-cresol, o,m,p-ethylphenol, o,m,p-propylphenol, o,m, p-(tert-butyl)phenol, pentylphenol, hexylphenol, octylphenol, nonylphenol, 2,6-dimethylphenol derivatives, and 2-methylphenol derivatives; monofunctional phenols such as o,m,p-phenylphenol; and monofunctional acid halides such as acetic acid chloride, butyric acid chloride, octylic acid chloride, benzoyl chloride, benzene sulfonyl chloride, benzene sulfinyl chloride, sulfinyl chloride, and benzene phosphonyl chloride and substituted groups thereof.

Among these, from the standpoints of high molecular weight controllability and solution stability, the molecular weight regulator is preferably an o,m,p-(tert-butyl)phenol, a 2,6-dimethylphenol derivative, and a 2-methylphenol derivative. The molecular weight regulator is particularly preferably a p-(tert-butyl)phenol, a 2,3,6-trimethylphenol and a 2,3,5-trimethylphenol.

In order not to oxidize the dihydric phenol in the alkaline solution, an antioxidant can be added. Examples of the antioxidant include sodium sulfite, hydrosulfite (sodium hyposulfite), sulfur dioxide, potassium sulfite, and sodium hydrogen sulfite. Among them, hydrosulfite is particularly preferable from the standpoints of the effect of oxidation prevention and reduction of environmental load.

The amount of the antioxidant to be used is preferably 0.01 mass % or more and 10.0 mass % or less with respect to the total dihydric phenol. The amount thereof is more preferably 0.1 mass % or more and 5 mass % or less. If the content is too small, the oxidation prevention effect may be insufficient, if the content is too much, the antioxidant may remain in the polyester and adversely affect the electrical properties in some of the cases.

Any purification method of the polyester resin after polymerization that does not significantly impair the effect of the present invention can be used. Examples of the purification method include a method in which the solution of the polyester resin is washed using an aqueous solution of alkaline substance such as sodium hydroxide and potassium hydroxide; an aqueous solution of acidic substance such as hydrochloric acid, nitric acid, and phosphoric acid; or water, and then separated by static separation or by centrifugation.

Examples of other purification methods include a method of precipitating the solution of the produced polyester resin in a solvent in which the polyester resin is insoluble, a method of distilling off the solvent by dispersing the polyester resin solution in warm water and, a method of causing the polyester resin solution to pass through an adsorbing column or the like.

The polyester resin after purification may be taken out by subjecting to precipitation with water, alcohol, or other organic solvents in which the polyester resin is insoluble or distilling off the solvent in the polyester solution with hot water or dispersion medium in which the polyester resin is insoluble or distilling off the solvent with heating or reducing pressure or, in a case where the polyester resin has been taken out in a slurry form, the solid content thereof may be taken out using a centrifuge or filter. Drying of the polyester resin thus obtained is usually carried out at the decomposition temperature of the polyester resin or below, but preferably carried out at 20° C. or above and at the melting temperature of the resin or below. At this time, the drying is preferably carried out under reduced pressure.

The drying time is preferably longer than the time taken until the purity of the impurities such as residual solvent decrease to a certain level or lower. Specifically, the drying time is usually longer than the time taken until the purity of the residual solvent decreases to 1000 ppm or lower, preferably 300 ppm or lower, and more preferably 100 ppm or lower.

In the production of the polyester-polycarbonate resin in the present invention, conditions equivalent to those for the polyester production can be applied.

<<Producing Method of Polyester Resin of Second Embodiment>>

Next, the producing method of the polyester resin according to the second embodiment will be described. The production method of the polyester resin according to the second embodiment is a production method that includes a step of reacting the dihydric phenol represented by Formula ($4a_1$) with the dicarboxylic acid chloride represented by Formula (5a) to obtain an ester oligomer; and a step of reacting the ester oligomer with the dihydric phenol represented by the formula ($4a_2$) and the ester oligomer to obtain a polyester resin. Examples of a producing method of the polyester resin include a solution polymerization method, a polymerization method combining a solution polymerization method and an interfacial polymerization method, and an interfacial polymerization method.

In producing a polyester for an electrophotographic photoreceptor, the polyester for an electrophotographic photoreceptor is usually produced using an interfacial polymerization method. However, in a case where a monomer that is readily oxidized in alkaline aqueous solution such as a hydroquinone or a monomer that has an ester bond and easily hydrolyzed such as a dihydric phenol is used, in an interfacial polymerization method, the monomer that have become an alkali salt in an aqueous solution is promptly oxidized to one such as a quinone, or the ester bonding of the monomer may be promptly hydrolyzed by nucleophiles such as a hydroxide ion. To prevent this, a solution polymerization method or a polymerization method combining a solution polymerization method and an interfacial polymerization method is preferably used. From the standpoint of ease of production, a solution polymerization method is particularly preferable. An example of the producing method of the polyester resin by a solution polymerization method is described below.

<Production Method by Solution Polymerization Method>

In production by the solution polymerization method, for example, the polyester resin is obtained in one-pot as follows: A dihydric phenol compound and a dicarboxylic acid chloride compound from which the divalent group represented by $X^{1a}$ of Formula (1a) is derived are dissolved in a solvent, and a base such as triethylamine is added thereto to form an ester oligomer in the reaction system. Thereafter, a dihydric phenol compound from which a divalent group represented by $X^{2a}$ of Formula (2a) is derived is added into the same reaction vessel, and a base is further added thereto.

From the standpoint of productivity, polymerization is preferably performed at a polymerization temperature in a range of −10° C. to 40° C. and for a polymerization time in a range of 0.5 hours to 10 hours. By washing and collecting the polyester resin that has been dissolved in the organic phase after completion of the polymerization, the target polyester resin is obtained. In a case where $Y^{1a}$ and $Y^{2a}$ are different from each other, the polyester resin may be allowed to have $Y^{1a}$ and $Y^{2a}$ by polymerizing an ester oligomer containing $Y^{1a}$ and $Y^{2a}$; or alternatively, by polymerizing a mixture obtained by adding, into an ester oligomer containing $Y^{1a}$ that has been produced in advance, a dicarboxylic acid chloride monomer corresponding to $Y^{2a}$ and a dihydric phenol compound from which the divalent group represented by $X^{2a}$ of Formula (2a) is derived.

<Producing Method combining Solution Polymerization Method and Interfacial Polymerization Method>

In polymerization method combining a solution polymerization method and an interfacial polymerization method, for example, the polyester resin is obtained as follows: A dicarboxylic acid chloride compound and a dihydric phenol compound from which the divalent group represented by $X^{1a}$ of Formula (1a) is derived are dissolved in a solvent, and a base such as triethylamine is added thereto to form an ester oligomer (solution polymerization). Thereafter, a solution in which a dihydric phenol compound from which the divalent group represented by $X^{2a}$ of Formula (2a) is derived has been dissolved in an alkaline aqueous solution, and a solution of a halogenated hydrocarbon and an aromatic hydrocarbon in which an ester oligomer and a dicarboxylic acid chloride compound has been dissolved are mixed.

At this time, a quaternary ammonium salt and quaternary phosphonium salt may be present therein as a catalyst. From the standpoint of productivity, polymerization is preferably performed at a polymerization temperature in a range of 0° C. to 40° C. and for a polymerization time in a range of 2 hours to 20 hours. By separating the aqueous phase and the organic phase after completion of the polymerization, and washing and collecting the polymer that has been dissolved in the organic phase, the target resin is obtained.

Since the dihydric phenol compound from which the divalent group represented by $X^{1a}$ of Formula (1a) is derived has an excellent solubility, by using an ester oligomer formed of the dihydric phenol compound as an intermediate, even when a dihydric phenol having a poor solubility is combined therewith, a polyester resin having a high solubility and excellent transparency is produced, which is applicable to a coating film.

On the other hand, if the dihydric phenol having a poor solubility and the dihydric phenol from which the divalent group represented by $X^{1a}$ of Formula (1a) is derived are subjected to reaction with the dicarboxylic acid chloride in the same reaction vessel from the beginning without forming an ester oligomer as an intermediate, the reaction product of the dihydric phenol having a poor solubility and the dicarboxylic acid chloride precipitates in the reaction solution and remains as an insoluble matter in the polyester resin thus obtained. Therefore, the coating fluid formed from the polyester resin may become cloudy, and thus the resulting coating film may also become cloudy or the coating film may have non-uniform surface. Further, since acid chloride terminal and phenol terminal remain in the insoluble matter, electrical properties of the coating film to be obtained may degrade. This precipitation conspicuously occurs in a solution polymerization. In interfacial polymerization, even a dihydric phenol having a poor solubility becomes an alkali salt and dissolves in an aqueous solution, so that precipitation during the polymerization is not likely to occur. But in solution polymerization, an alkali salt of the dihydric phenol is not formed, and thus the dihydric phenol precipitates.

The amount of the residual dicarboxylic acid chloride monomer in the ester oligomer satisfies the condition of the following Expression (6a).

$$\frac{\text{Residual dicarboxylic acid chloride monomer (mol)}}{\text{Feed dicarboxylic acid chloride monomer (mol)}} \leq 0.20 \quad \text{Expression (6a)}$$

"Residual dicarboxylic acid chloride monomer" represents the amount of the dicarboxylic acid chloride monomer remaining in the ester oligomer. "Feed dicarboxylic acid chloride monomer" represents the amount of the dicarboxylic acid chloride monomer fed in the beginning to produce the ester oligomer. Further, even the case in which dicarboxylic acid chloride monomer is added after the ester oligomer has been produced is within the scope of the present invention as long as Formula (6a) is satisfied. That is, in that case, Expression (6a) is calculated by adding the amounts of the residual dicarboxylic acid chloride monomer and the feed dicarboxylic acid chloride monomer to the amount of dicarboxylic acid chloride monomer further added after the ester oligomer has been produced.

Even in a case where the amount of the residual dicarboxylic acid chloride monomer in the ester oligomer satisfies the condition of Expression (6a), from the standpoint of solubility of the polyester resin to be produced, the amount of the residual dicarboxylic acid chloride monomer in Expression (6a) is preferably 0.18 or less, and more preferably 0.16 or less. These values can be measured by the method described in Examples [Measurement of Residual Acid Chloride Monomer in Ester oligomer]. Further, the amount of the residual dicarboxylic acid chloride monomer in ester oligomer can be adjusted to a specific range by regulating the amount of base to be used to the range that will be described later.

In a case where the ester oligomer is produced, the charge ratio between the dihydric phenol compound from which the divalent group represented by $X^{1a}$ of Formula (1a) is derived and the dicarboxylic acid chloride, that is, the charge molar ratio between the dihydric phenol represented by Formula ($4a_1$) and the dicarboxylic acid chloride represented by Formula (5a) preferably satisfies the following expression.

$$1.8 \geq \frac{\text{Dicarboxylic acid chloride of } Fomula \text{ (5a) (mol)}}{\text{Dihydric phenol of } Fomula \text{ } (4a_1) \text{ (mol)}} \geq 1.05$$

The above expression shows the molar ratio of the dicarboxylic acid chloride and dihydric phenol is 1.05:1 to 1.8:1. From the standpoint of wear resistance when included in a photoreceptor, the molar ratio is more preferably 1.08 or more, and even more preferably 1.1 or more. From the standpoint of solubility of the resin, the molar ratio is more preferably 1.6 or less, and even more preferably 1.55 or less.

Examples of the base used in a solution polymerization method include tertiary amines such as triethylamine, tripropylamine, tributylamine, N,N-diisopropylethylamine, N,N-dipropylethylamine, N,N-diethylmethylamine, N,N-dimethylethylamine, N,N-dimethylbutylamine, N,N-dimethylisopropylamine, N,N-diethyl isopropylamine, N,N,N',N'-tetramethyldiethylamine, and 1,4-diazabicyclo[2,2,2]octane; pyridines such as pyridine and 4-methylpyridine; and organic bases such as 1,8-diazabicyclo[5.4.0]-undec-7-ene.

The base is not particularly specified so long as the base can be used for esterification reaction of bases such as phosphazene bases and inorganic bases. Among these, from the standpoints of reactivity on esterification reaction and availability, the base is preferably triethylamine N,N-dipropylethylamine, N,N-diethylmethylamine, or pyridine, and particularly preferably triethylamine from the standpoints of suppressing decomposition of acid chloride and ease of removal in cleaning.

In producing the ester oligomer, the amount of the base to be used is usually set to be 0.50 equivalents or more, and preferably 0.60 equivalents or more with respect to the carboxylic acid chloride group. The amount of the base to be used is usually set to be 0.95 equivalents or less, and preferably 0.90 equivalents or less. To prevent unnecessary decomposition of the acid chloride, the amount of the base to be used is preferably set to be 1.1 equivalents or less with respect to the phenolic hydroxyl group to be used for producing the ester oligomer.

In producing the polyester resin, the amount of the base to be used is usually set to be 1.01 equivalents or more; and in order for the polymerization reaction to proceed promptly, preferably set to be 1.05 equivalents or more with respect to the carboxylic acid chloride group used in the reaction. The amount of the base to be used is usually set to be 2 equivalents or less; and in order to prevent decomposition of the formed ester bonding or reduce the amount of the residual base, preferably set to be 1.8 equivalents or less.

Examples of the solvent used in a solution polymerization method include halogenated hydrocarbon compounds such as dichloromethane, chloroform, 1,2-dichloroethane, trichloroethane, tetrachloroethane, chlorobenzene, and dichlorobenzene; aromatic hydrocarbon compounds such as toluene, anisole, and xylene; hydrocarbon compounds such as cyclohexane and methyl cyclohexane; ether compounds such as tetrahydrofuran, tetrahydropyran, 1,4-dioxane, and 1,3-dioxolane; ester compounds such as ethyl acetate, methyl benzoate, and benzyl acetate; and amide compounds such as N,N-dimethylformamide and N,N-dimethylacetamide.

Pyridine may be used as both base and solvent. Among these, from the standpoints of solubility and reactivity on esterification reaction of monomer or oligomer to be generated, the solvent is preferably dichloromethane, chloroform, 1,2-dichloroethane, tetrahydrofuran, N,N-dimethylformamide, or pyridine. Further, from the standpoints of cleaning efficiency and electrical properties, the solvent is particularly preferably dichloromethane.

In producing the polyester resin using a solution polymerization method, regarding the ratio between the total dihydric phenol and the total dicarboxylic acid chloride, the total dihydric phenol and the total dicarboxylic acid chloride are preferably in a molar ratio of 1:0.95 to 1:1.05, more preferably 1:0.99 to 1:1.01, and particularly preferably 1:0.992 to 1:1.008 from the standpoints of producing polyester resin having a high molecular weight and controllability of the terminal groups thereof.

In producing the polyester resin, molecular weight regulator may be used. Examples of the molecular weight regulator include alkyl phenols such as phenol, o,m,p-cresol, o,m,p-ethylphenol, o,m,p-propylphenol, o,m,p-(tert-butyl) phenol, pentylphenol, hexylphenol, octylphenol, nonylphenol, 2,6-dimethylphenol derivatives, and 2-methylphenol derivatives; monofunctional phenols such as o,m,p-phenylphenol; and monofunctional acid halides such as acetic acid chloride, butyric acid chloride, octylic acid chloride, benzoyl chloride, benzene sulfonyl chloride, benzene sulfinyl chloride, sulfinyl chloride, and benzene phosphonyl chloride and substituted groups thereof.

Examples of the molecular weight regulator further include monofunctional aliphatic alcohols such as methanol, ethanol, and propanol; monofunctional alcohols having an acryl such as 2-hydroxyethyl acrylate, 4-hydroxybutyl acrylate, and 2-hydroxy methacrylate; monofunctional alcohols having a perfluoroalkyl such as 1H,1H,2H,2H-tridecafluoro-1-n-octanol and 1H,1H,2H,2H-heptadecafluoro-1-decanol; and monofunctional alcohols having a siloxane.

Among these, in terms of high molecular weight controllability and solution stability, the molecular weight regulator is preferably an o,m,p-(tert-butyl)phenol, a 2,6-dimethylphenol derivative, and a 2-methylphenol derivative. The molecular weight regulator is particularly preferably p-(tert-butyl)phenol, 2,3,6-trimethylphenol, or 2,3,5-trimethylphenol.

Further, in order not to oxidize the dihydric phenol, an antioxidant can be added during the polymerization reaction or in the washing solution. Examples of the antioxidant include sodium sulfite, hydrosulfite (sodium hyposulfite), sulfur dioxide, potassium sulfite, sodium hydrogen sulfite, and the like. Among these, hydrosulfite is particularly preferable from the standpoints of the effect of oxidation prevention and reduction of environmental load. The amount of the antioxidant to be used is preferably 0.01 mass % or more and 10.0 mass % or less with respect to the total dihydric phenol. The amount of the antioxidant to be used is more preferably 0.1 mass % or more and 5 mass % or less.

Examples of a method of cleaning the polymerized polyester resin include a method in which the solution of the polyester resin is washed using an aqueous solution of alkaline substance such as sodium hydroxide and potassium hydroxide; an aqueous solution of acidic substance such as hydrochloric acid, nitric acid, and phosphoric acid; or water, and then separated by static separation or by centrifugation. The polyester resin solution after washing may be taken out by: subjecting to precipitation with water, alcohol, or other organic solvents in which the polyester resin is insoluble; distilling off the solvent in the polyester solution with hot water or dispersion medium in which the polyester resin is insoluble, or distilling off the solvent with heating or reducing pressure; or, in a case where the polyester resin solution has been taken out in a slurry form, the solid content thereof may be taken out using a centrifuge or a filter.

The polyester resin is usually dried out at the decomposition temperature of the polyester resin or below, but preferably dried at 20° C. or above and at the melting temperature of the polyester resin or below. The polyester resin is preferably dried under reduced pressure. The drying time is preferably longer than the time taken until the purity of the impurities such as residual solvent decreases to a certain level or lower. Specifically, the drying time is usually longer than the time taken until the purity of the residual solvent decreases to 1000 ppm or lower, preferably 300 ppm or lower, and more preferably 100 ppm or lower.

Regarding production methods other than the solution polymerization method, a polymerization method combining a solution polymerization method and an interfacial polymerization method, or an interfacial polymerization method is also within the scope of the present invention under the condition that the amount of the residual dicarboxylic acid chloride monomer in an ester oligomer satisfies Expression (6a).

<<Electrophotographic Photoreceptor>>

The present embodiment is applied to an electrophotographic photoreceptor having a photosensitive layer disposed on a conductive support and in which the photosensitive layer includes the above polyester resin. Examples of a specific constitution of the photosensitive layer include a multilayer type photoreceptor formed by laminating a charge generation layer having a charge generation substance as a main component, and a charge transport layer having a charge transport substance and a binder resin as main components on the conductive support; and a dispersion type (single-layer type) photoreceptor including a conductive support and a photosensitive layer disposed thereon that is obtained by dispersing a charge generation substance in a layer containing a charge transport substance and a binder resin. The polyester resin is usually used for a layer including a charge transport substance, and preferably for a charge transport layer of a multilayer type photoreceptor.

As a specific constitution of the photosensitive layer used for an electrophotographic photoreceptor to which the present embodiment is applied, for example, in a case of a multilayer type photoreceptor, the multilayer type photoreceptor has a charge transport layer including a charge transport substance and a binder resin that transports charges generated by light exposure by holding static charge, and a charge generation layer including a charge generation substance that generates a charge pair when exposed to light. As needed, the multilayer type photoreceptor may also include layers other than those layers such as a charge blocking layer for blocking charge injection from a conductive support, and a light diffusing layer for preventing interference fringe occurrence by diffusing light, e.g. laser beam. In a case of the dispersion type (single-layer type) photoreceptor, the photosensitive layer includes a binder resin in which the charge transport substance and the charge generation substance are dispersed.

<Conductive Support>

Although the conductive support is not particularly limited, mainly used as the conductive support is, for example, a metallic material such as aluminum, an aluminum alloy, stainless steel, copper, or nickel, a resinous material to which electrical conductivity has been imparted by adding a conductive powder, e.g., a metal, carbon, or tin oxide, or a resin, glass, paper, or the like, having a surface on which a conductive metal material, e.g., aluminum, nickel, or ITO (indium oxide/tin oxide), has been vapor deposited or applied.

One selected from these may be used alone, or two or more of these selected from these can be used in any desired combination and in any desired proportion. Examples of the form of the conductive support a drum, sheet, belt, or the like. Use may be made of a metallic conductive support having a surface with a conductive material having a suitable resistance in order to control the conductivity and surface properties thereof, and to coat defects.

In a case where a metallic material such as an aluminum alloy is used as a conductive support, this material may be used after an anodized coating film is formed thereon. In the case where an anodized coating film has been formed, the material is preferably subjected to a pore-filling treatment by a known method.

The surface of the support may be smooth, or may have been roughened by using a special machining method or by performing a grinding treatment. Alternatively, use may be made of a support having a roughened surface obtained by incorporating particles with an appropriate particle diameter into the material for constituting the support. Furthermore, a drawn pipe can be used as such without subjecting the pipe to machining, for the purpose of cost reduction.

<Undercoat Layer>

An undercoat layer may be disposed between the conductive support and the photosensitive layer that will be described later in order to improve adhesiveness, blocking properties, etc. As the undercoat layer, use may be made, for example, of a resin or a resin in which particles of a metal oxide or the like are dispersed. The undercoat layer may consist of a single layer or a plurality of layer.

A known antioxidant and the like, pigment particles, resin particles, and the like may be incorporated into the undercoat layer. From the standpoints of improving properties of the electrophotographic photoreceptor such as electrical properties, intense exposure properties, image properties, repetitive properties, and applicability at the time of production, the thickness of the undercoat layer is usually 0.01 µm or more, preferably 0.1 µm or more, and usually 30 µm or less, preferably 20 µm or less.

Examples of the metal oxide particles used for the undercoat layer include particles of a metal oxide containing one metallic element, such as titanium oxide, aluminum oxide, silicon oxide, zirconium oxide, zinc oxide, or iron oxide, and particles of a metal oxide containing a plurality of metallic elements, such as calcium titanate, strontium titanate, or barium titanate. One of those particles may be used alone, or two or more of those particles may be mixed together and used.

Among these, the particulate metal oxide is preferably titanium oxide or aluminum oxide, and particularly preferably titanium oxide. The titanium oxide particles may have a surface which has been treated with an inorganic substance such as tin oxide, aluminum oxide, antimony oxide, zirconium oxide, and silicon oxide, or with an organic material such as stearic acid, a polyol and a silicon. The crystal form of the titanium oxide particles to be utilized may be any one of rutile, anatase, brookite, and amorphous. Further, the titanium oxide particles to be utilized may include particles in a plurality of crystal states.

Although metal oxide particles having various particle diameters can be utilized, from the standpoint of characteristics thereof and fluid stability, preferably used in those particles are metal oxide particles having an average primary-particle diameter of 10 nm to 100 nm, and particularly preferably 10 nm to 50 nm. This average primary-particle diameter can be obtained from transmission electron microscopy (TEM) image.

The undercoat layer is preferably formed so as to be configured of a binder resin and metal oxide particles dispersed therein. Examples of the binder resin to be used in the undercoat layer include known binder resins such as epoxy resins, polyethylene resins, polypropylene resins, acrylic resins, methacrylic resins, polyamide resins, vinyl chloride resins, vinyl acetate resins, phenolic resins, polycarbonate resins, polyurethane resins, polyimide resins, vinylidene chloride resins, polyvinyl acetal resins, vinyl chloride/vinyl acetate copolymers, polyvinyl alcohol resins, polyurethane resins, polyacrylic resins, polyacrylamide resins, polyvinylpyrrolidone resins, polyvinylpyridine resins, water-soluble polyester resins, cellulose ester resins such as nitrocellulose, cellulose ether resins, casein, gelatin, polyglutamic acid, starch, starch acetate, aminostarch, organozirconium compounds such as zirconium chelate compounds and zirconium alkoxide compounds, organic titanyl compounds such as titanyl chelate compounds and titanium alkoxide compounds, and silane coupling agents.

One of these resins may be used alone, or two or more thereof may be used in any desired combination and any desired proportion. The binder resin may be used together with a hardener to come into a hardened state. Among these, the binder resin is preferably an alcohol-soluble copolyamide, a modified polyamide, or the like, because of their excellent dispersibility and applicability. The proportion of the inorganic particles to be used, to the binder resin to be used in the undercoat layer, can be selected at will. However, from the standpoint of the stability and applicability of the dispersion, the amount of the inorganic particles to be used in the undercoat layer is usually in the range of 10 mass % to 500 mass % with respect to the binder resin.

<Photosensitive Layer>

Examples of forms of the photosensitive layer include: a single-layer type photoreceptor in which a charge generation substance and charge transport substance are present in the same layer and dispersed in a binder resin; and a function allocation type (multilayer type) photoreceptor which includes two layers formed of a charge generation layer in which a charge generation substance is dispersed in a binder resin and a charge transport layer in which a charge transport substance is dispersed in a binder resin, but any one of them can be employed.

Examples of the multilayer type photosensitive layer include: a normal-stack type photosensitive layer obtained by laminating a charge generation layer and a charge transport layer in this order from the conductive support side; and a reverse-stack type photosensitive layer obtained by disposing these layers in the reverse order, i.e., by laminating a charge transport layer and a charge generation layer in this order from the conductive support side. Although either of these can be employed, the normal-stack type photosensitive layer exhibits most-balanced photoconductivity, thus preferable.

[Charge Generation Layer—Multilayer Type]

In a case of the multilayer type photoreceptor (function allocation type photoreceptor), the charge generation layer is formed by binding a charge generation substance with a binder resin. The thickness of the charge generation layer is usually 0.1 µm or larger, preferably 0.15 µm or larger, and is usually 10 µm or less, preferably 0.6 µm or less.

Examples of the charge generation substance include inorganic photoconductive materials, such as selenium, alloys thereof, and cadmium sulfide, and organic photoconductive materials such as organic pigments. Preferred of these are organic photoconductive materials, and organic pigments are particularly preferred. Examples of the organic pigments include phthalocyanine pigments, azo pigments, dithioketopyrrolopyrrole pigments, squalene (squarylium) pigments, quinacridone pigments, indigo pigments, perylene pigments, polycyclic quinone pigments, anthanthrone pigments, and benzimidazole pigments.

Of these, phthalocyanine and azo pigments are particularly preferable. In a case of using these organic pigments as a charge generation substance, the organic pigment is used usually in the form of a dispersion layer in which fine particles thereof have been bound with any one of various binder resins.

In the case of using a metal-free phthalocyanine compound or a metal-containing phthalocyanine compound as a charge generation substance, a photoreceptor having high sensitivity to laser light having a relatively long wavelength, for example, laser light having a wavelength around 780 nm, is obtained. In the case of using an azo pigment such as a monoazo, diazo, or trisazo pigment, it is possible to obtain a photoreceptor having sufficient sensitivity to white light or to laser light having a wavelength around 660 nm or laser light having a relatively short wavelength, for example, laser light having a wavelength around 450 nm or 400 nm.

In the case of using an organic pigment as a charge generation substance, a phthalocyanine pigment or an azo pigment is especially preferred. Phthalocyanine pigments are superior in that a photoreceptor having high sensitivity to laser light having a relatively long wavelength can be obtained therewith, while azo pigments are superior in that the pigments have sufficient sensitivity to white light and laser light having a relatively short wavelength.

In the case of using a phthalocyanine pigment as a charge generation substance, use may be made specifically of metal-free phthalocyanines and phthalocyanine compounds to which a metal such as copper, indium, gallium, tin, titanium, zinc, vanadium, silicon, germanium, or aluminum, or an oxide, halide, hydroxide, alkoxide, or another form of the metal has coordinated, these phthalocyanines and phthalocyanine compounds having respective crystal forms, and phthalocyanine dimers in which oxygen or other atoms are used as crosslinking atoms.

Particularly preferred are X-form and τ-form metal-free phthalocyanines, which are crystal forms having high sensitivity, A-form (also called β-form), B-form (also called α-form), D-form (also called Y-form), and other titanyl phthalocyanines (other name: oxytitanium phthalocyanines), vanadyl phthalocyanines, chloroindium phthalocyanines, hydroxyindium phthalocyanines, II-form and other chlorogallium phthalocyanines, V-form and other hydroxygallium phthalocyanines, G-form, I-form, and other μ-oxo-gallium phthalocyanine dimers, and II-form and other μ-oxo-aluminum phthalocyanine dimers.

Of these phthalocyanines, particularly preferable are A-form (also called β-form) and B-form (also called α-form) titanyl phthalocyanines, D-form (Y-form) titanyl phthalocyanine characterized by showing a distinct peak at a diffraction angle 2θ(±0.2°) of 27.1° or 27.3° in X-ray powder diffractometry, II-form chlorogallium phthalocyanine, V-form hydroxygallium phthalocyanine, the hydroxygallium phthalocyanine characterized by having a most intense peak at 28.1° or characterized by having no peak at 26.2°, having a distinct peak at 28.1°, and having a half-value width W at 25.9° of 0.1°≤W≤0.4°, and a G-form μ-oxo-gallium phthalocyanine dimer. Preferred of these phthalocyanines is a D-form (Y-form) titanyl phthalocyanine for the excellent sensitivity.

A single phthalocyanine compound may be used alone, or a mixture of several phthalocyanine compounds or a phthalocyanine compound in a mixed-crystal state may be used. The state in which phthalocyanine compounds are mixed or the mixed-crystal state may be one obtained by mixing the constituent elements later, or may be one formed in steps for phthalocyanine compound production and treatments, such as synthesis, pigment formation, crystallization, etc. Known as such treatments are an acid pasting treatment, grinding treatment, solvent treatment, and the like. Examples of methods for producing a mixed-crystal state include a method in which two kinds of crystals are mixed together and the resultant mixture is mechanically ground and made amorphous and is then subjected to a solvent treatment to thereby convert the amorphous state into a specific crystalline state, as described in JP-A-10-48859.

The binder resin to be used in the charge generation layer is not limited to a particular resin. Examples thereof include insulating resins such as polyvinyl acetal-based resins, e.g., polyvinyl butyral resins, polyvinyl formal resins, and partly acetalized polyvinyl butyral resins in which some of the butyral moieties have been modified with formal, acetal, or the like, polyarylate resins, polycarbonate resins, polyester resins, modified ether-based polyester resins, phenoxy resins, polyvinyl chloride resins, polyvinylidene chloride resins, polyvinyl acetate resins, polystyrene resins, acrylic resins, methacrylic resins, polyacrylamide resins, polyamide resins, polyvinylpyridine resins, cellulosic resins, polyurethane resins, epoxy resins, silicon resins, polyvinyl alcohol resins, polyvinylpyrrolidone resins, casein, copolymers based on vinyl chloride and vinyl acetate, e.g., vinyl chloride/vinyl acetate copolymers, hydroxy-modified vinyl chloride/vinyl acetate copolymers, carboxyl-modified vinyl chloride/vinyl acetate copolymers, and vinyl chloride/vinyl acetate/maleic anhydride copolymers, styrene/butadiene copolymers, vinylidene chloride/acrylonitrile copolymers, styrene/alkyd resins, silicon/alkyd resins, and phenol/formaldehyde resins, and organic photoconductive polymers such as poly-N-vinylcarbazole, polyvinylanthracene, and polyvinylperylene. Any one of these binder resins may be used alone, or any desired combination of two or more thereof may be used as a mixture.

Regarding the incorporation ratio (by mass) between the binder resin and the charge generation substance in the charge generation layer, the amount of the charge generation substance with respect to 100 parts by mass of the binder resin is usually 10 parts by mass or more, preferably 30 parts by mass or more, and is usually 1,000 parts by mass or less, preferably 500 parts by mass or less.

[Charge Transport Layer—Multilayer Type]

The charge transport layer of the multilayer type photoreceptor includes a charge transport substance and usually also includes a binder resin and other components used as necessary. The charge transport layer may be formed of a single layer or may be a photoreceptor obtained by superimposing a plurality of layers having different constitution components or compositions. The thickness thereof is usually 5 μm to 50 μm, and preferably 10 μm to 45 μm.

The charge transport substance is not limited to a particular material, and any desired substances can be used. Examples of the charge transport substance include: electron-attracting substances such as aromatic nitro compounds, e.g., 2,4,7-trinitrofluorenone, cyano compounds, e.g., tetracyanoquinodimethane, and quinone compounds, e.g., diphenoquinone; and electron-donating substances such as heterocyclic compounds, e.g., carbazole derivatives, indole derivatives, imidazole derivatives, oxazole derivatives, pyrazole derivatives, thiadiazole derivatives, and benzofuran derivatives, aniline derivatives, hydrazone derivatives, aromatic amine derivatives, stilbene derivatives, butadiene derivatives, and enamine derivatives, and compounds each made up of two or more of these compounds bonded together or polymers each including, in the main chain or a side chain thereof, a group constituted of any one of these compounds.

Preferred of these are carbazole derivatives, aromatic amine derivatives, stilbene derivatives, butadiene derivatives, enamine derivatives, and compounds each made up of two or more of these compounds bonded together. These charge transport substances may be used singly, or two or more thereof may be used in combination. Specific suitable structure examples of the charge transport substance are shown below.

HTM1
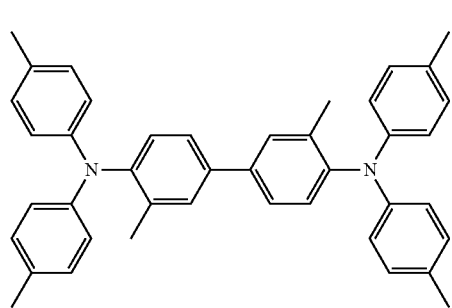
HTM2
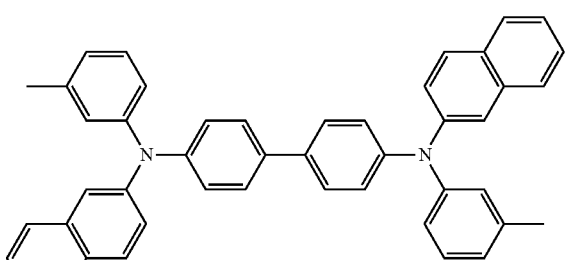
HTM3
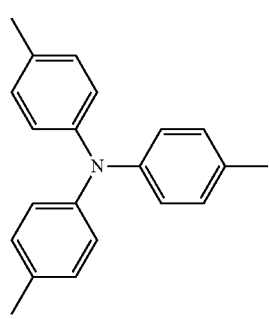
HTM4
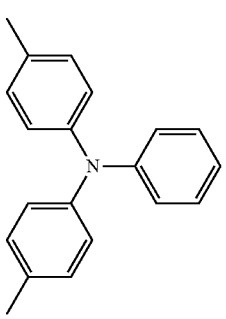
HTM5
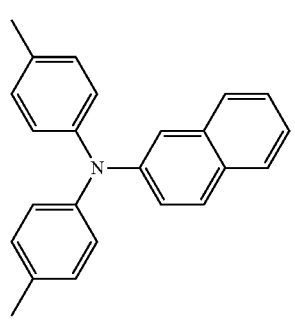
HTM6
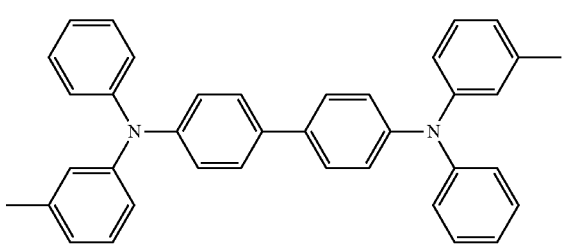
HTM7
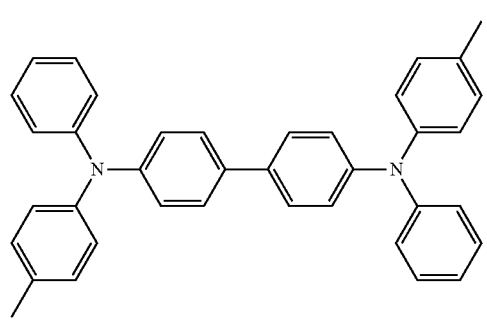
HTM8
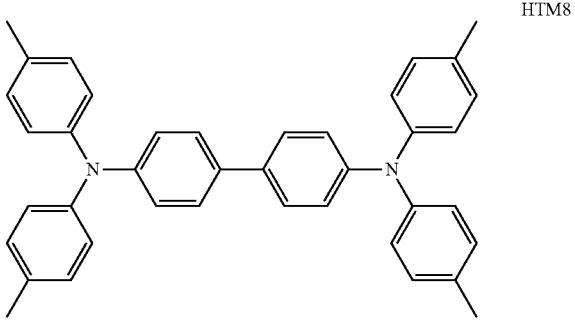
HTM9
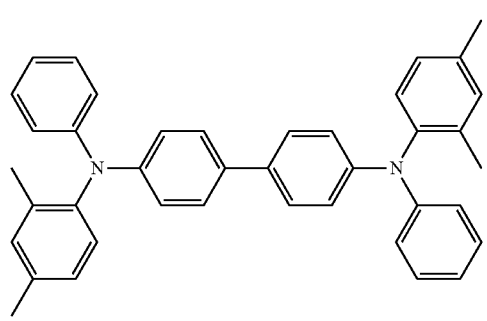
HTM10
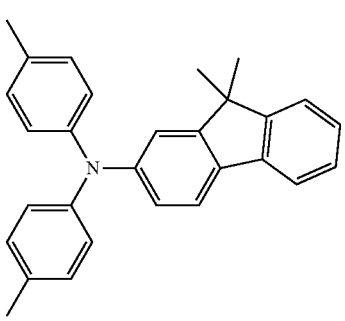

-continued
HTM11
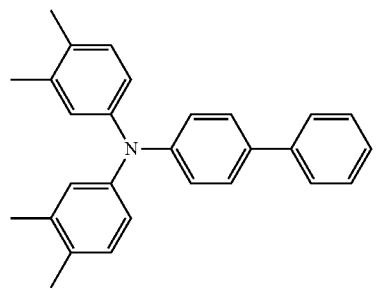
HTM12
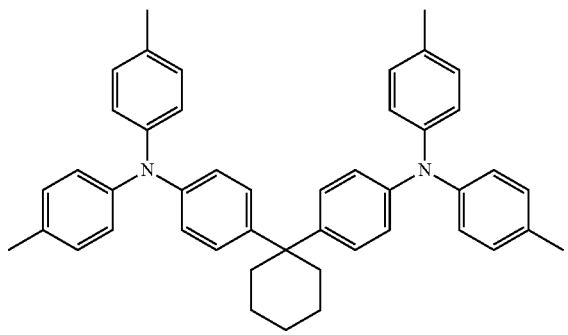
HTM13
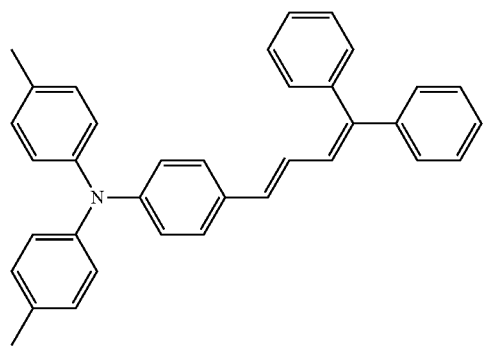
HTM14
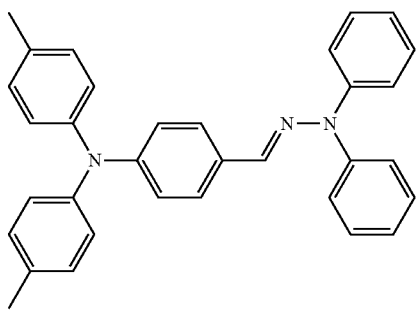
HTM15
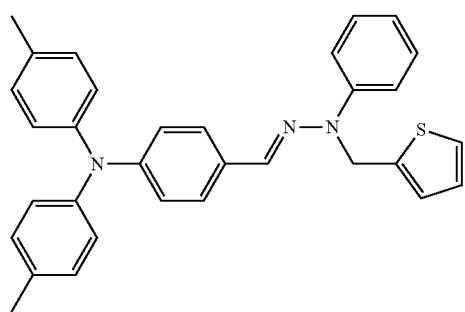
HTM16
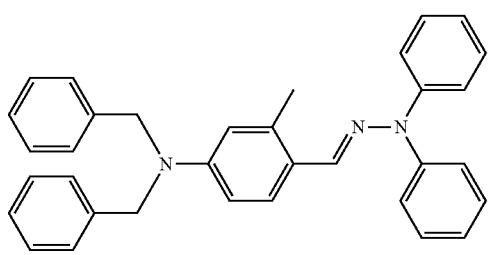
HTM17
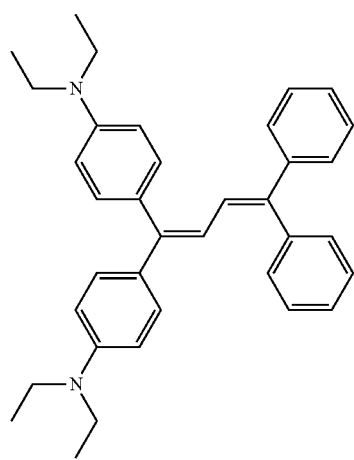
HTM18
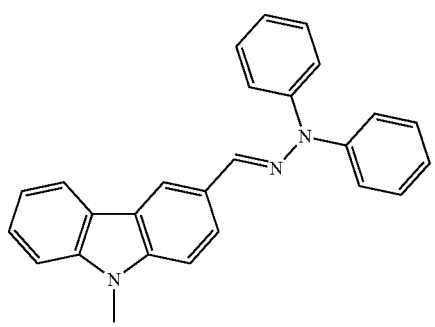

-continued
HTM19
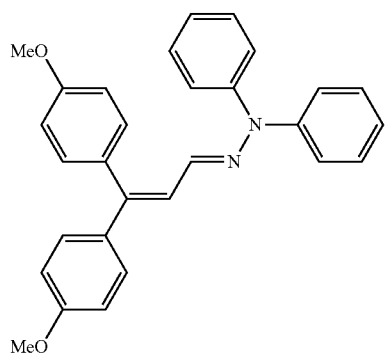
HTM20
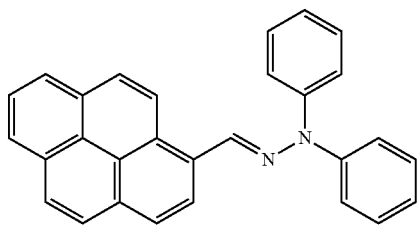
HTM21
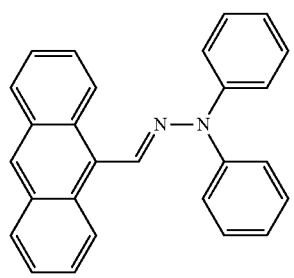
HTM22
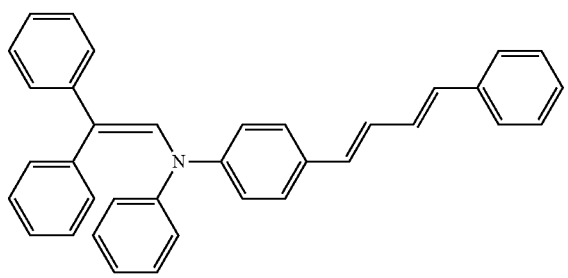
HTM23
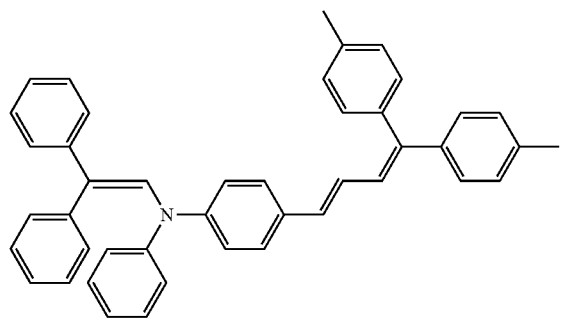
HTM24
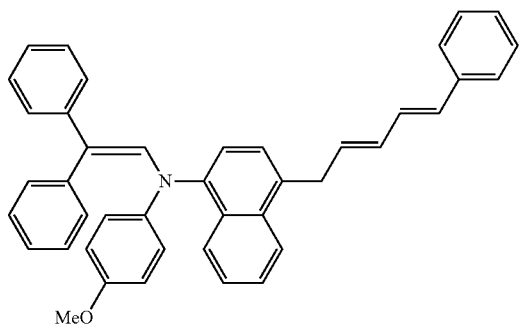
HTM25
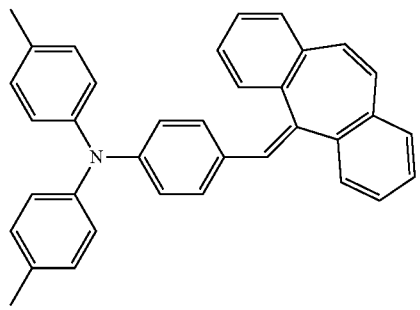
HTM26
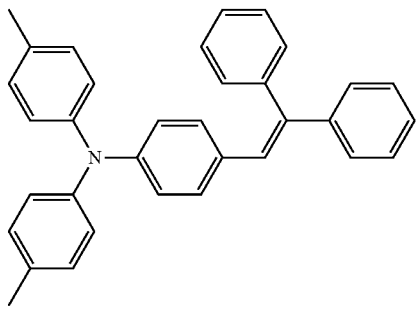
HTM27
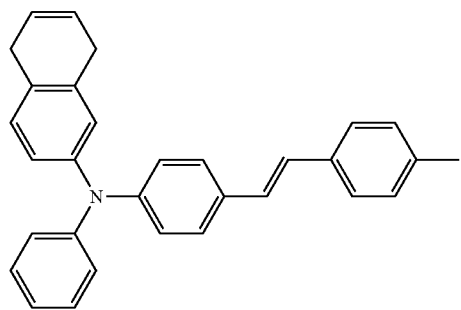
HTM28
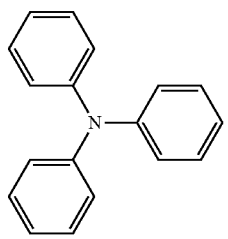

-continued
HTM29
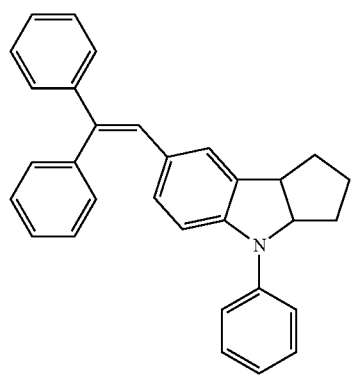
HTM30
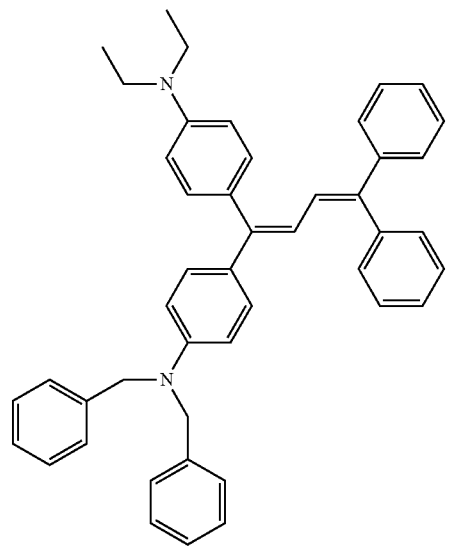
HTM31
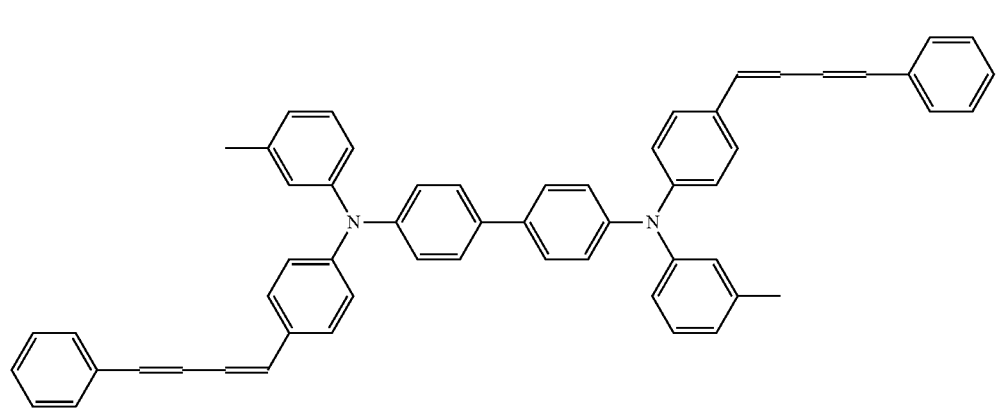
HTM32
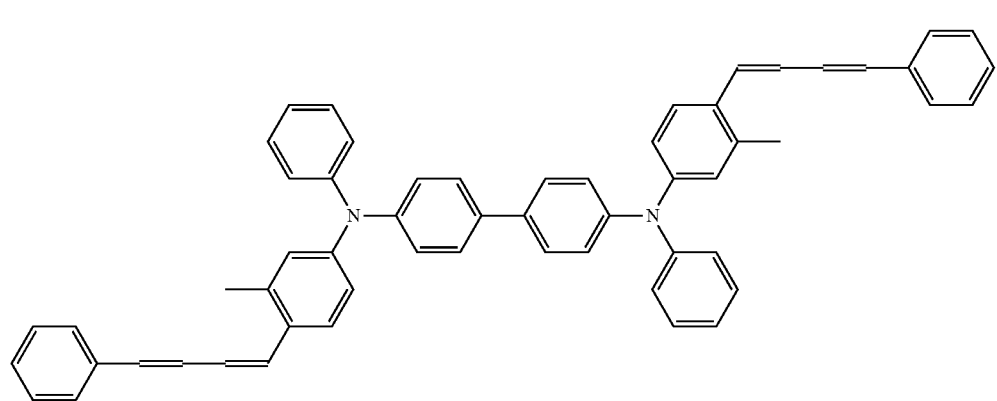

HTM33
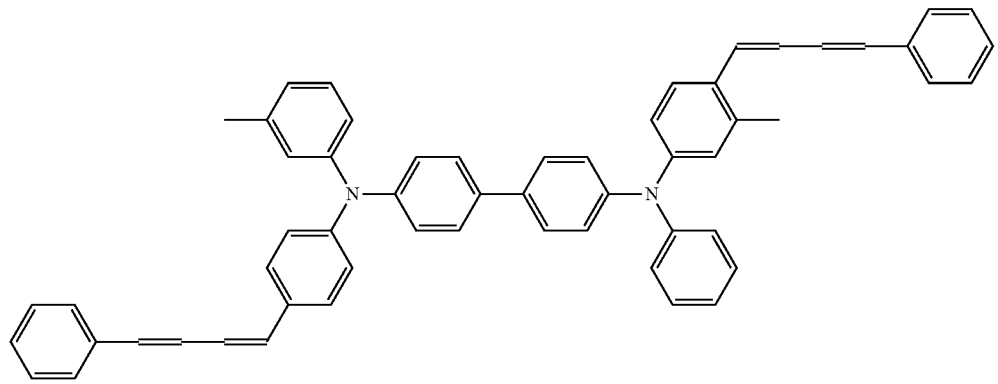
HTM34
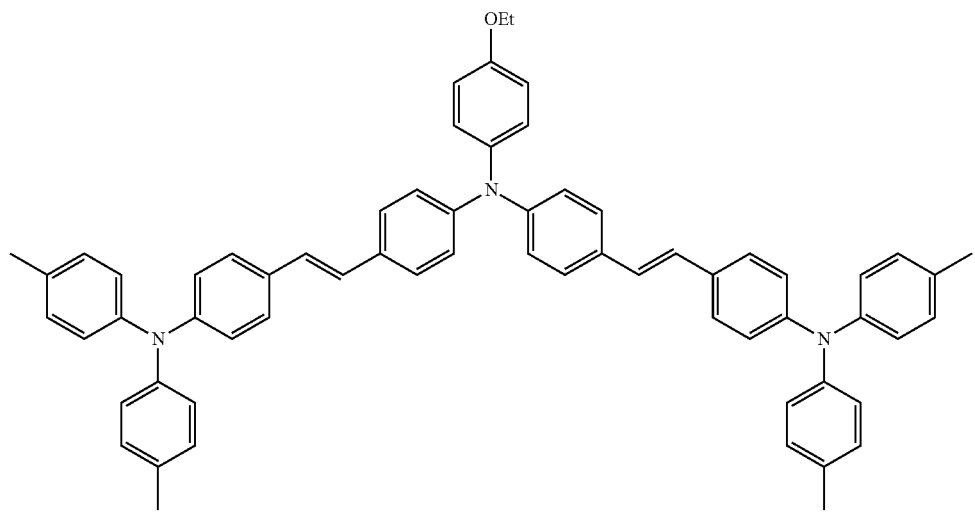
HTM35
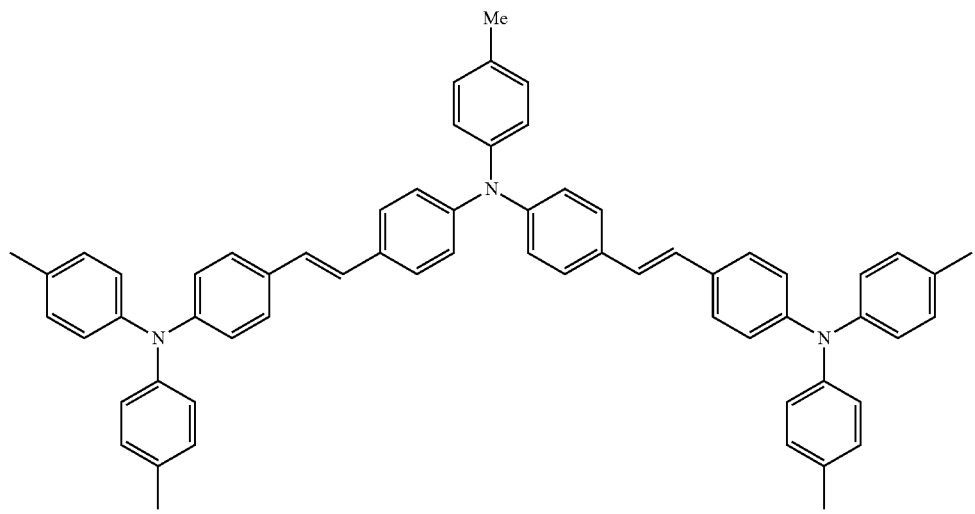

-continued
HTM36
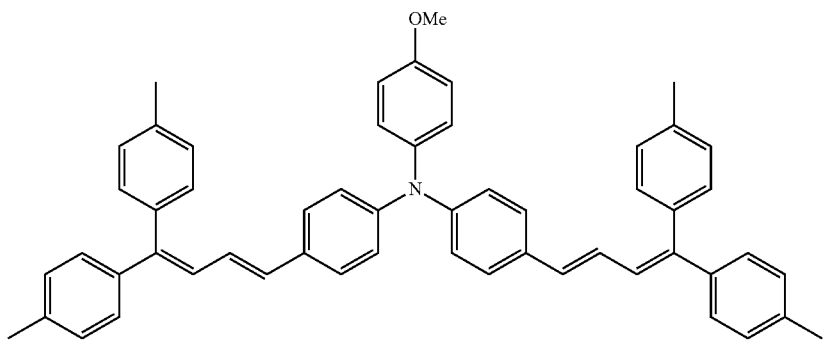
HTM37
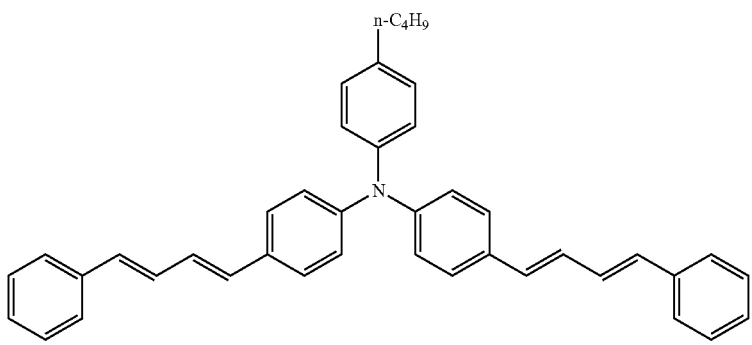
HTM38
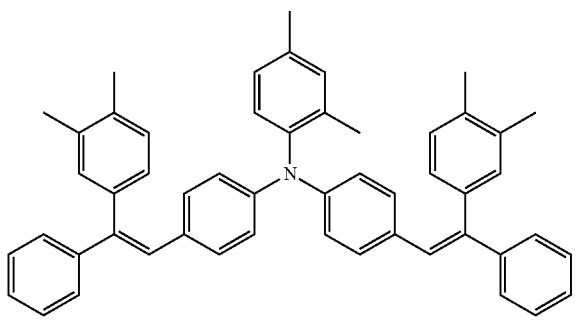
HTM39
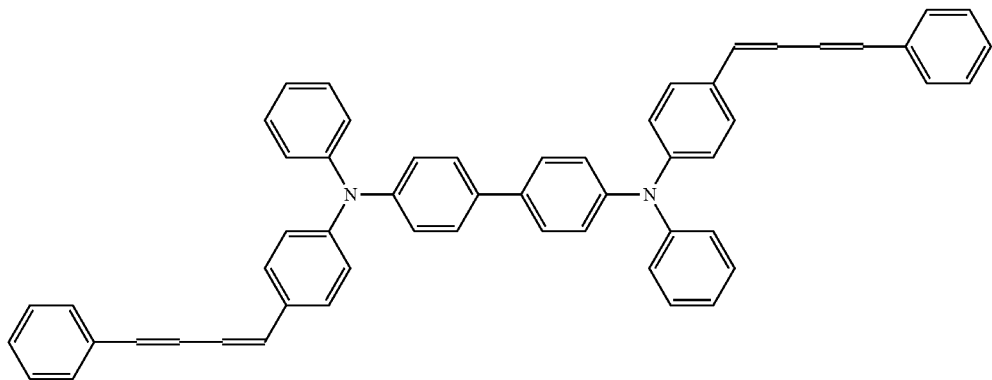

-continued
HTM40
HTM41
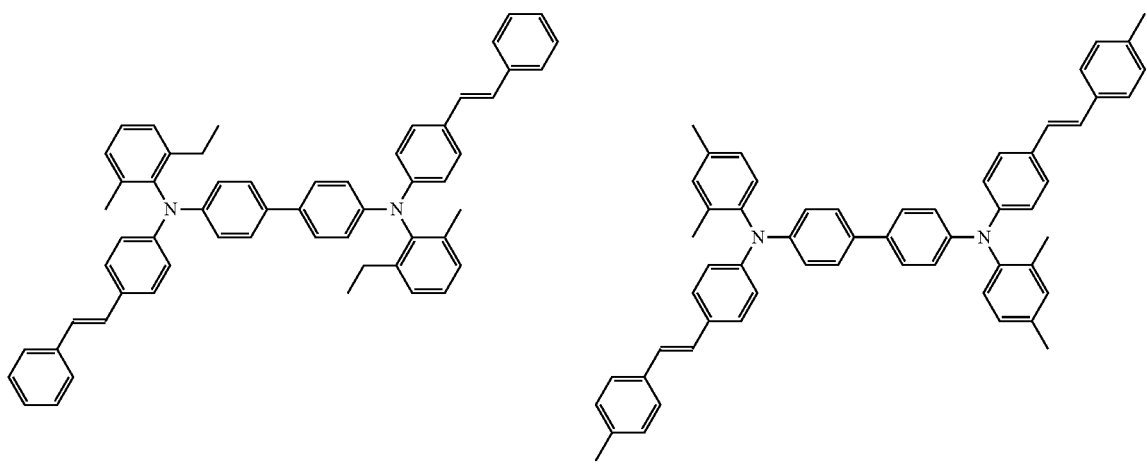
HTM42
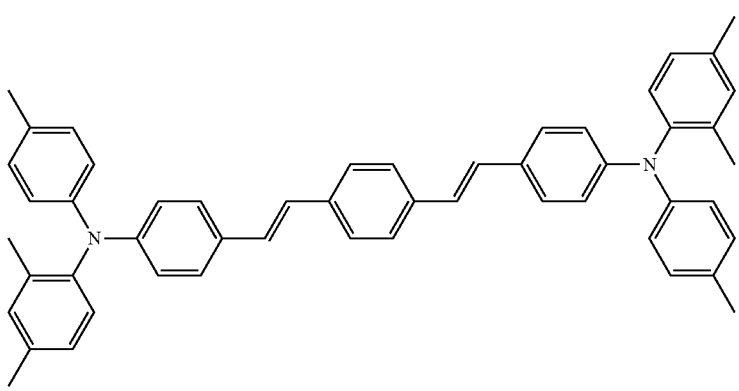
HTM43
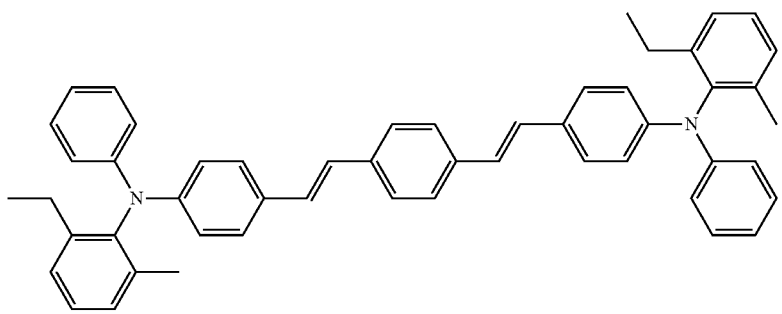
HTM44
HTM45
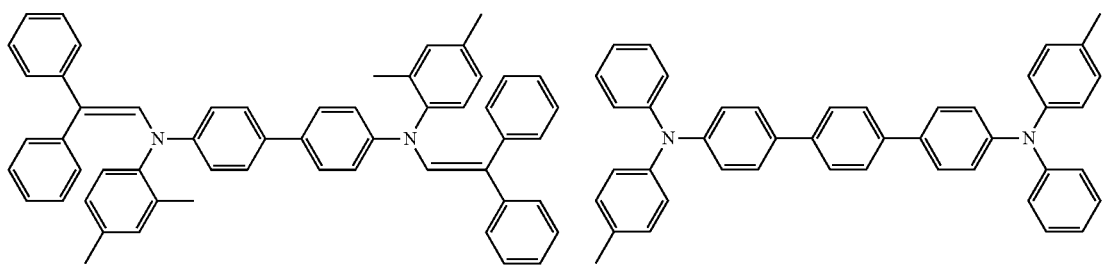

HTM46

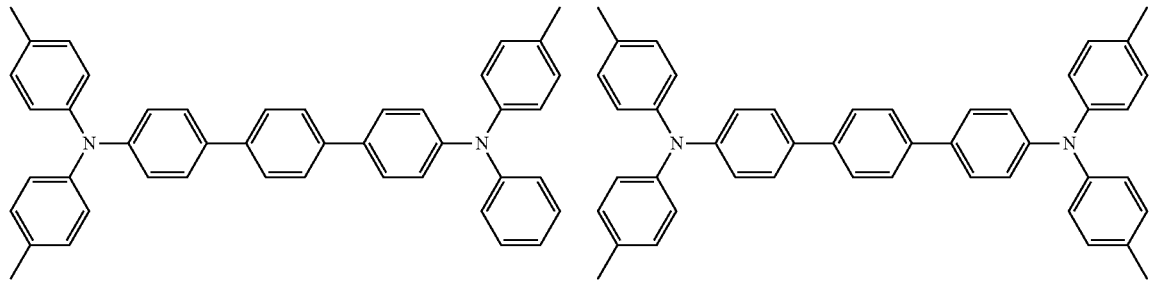

HTM47

The polyester resin is preferably used as the binder resin of the charge transport layer. The polyester resin may be mixed with another resin having another structure and used in combination. Examples of the resin having another structure to be mixed include vinyl polymers, e.g., polymethyl methacrylate, polystyrene, and polyvinyl chloride, and copolymers thereof; and thermoplastic resins and various thermosetting resins, such as polycarbonate resin, polyester resin, polyester-polycarbonate resin, polysulfone resin, phenoxy resin, epoxy resin, and silicone resin, and copolymers thereof.

Preferred of these resins are polycarbonate resins, polyester resins, copolymers of polycarbonate resin and silicone resin, and copolymers of polyester resin and silicone resin. The mixing ratio of the resin having another structure to be mixed is not particularly specified; but normally, it is preferable to use in combination within a range not exceeding the proportion of the polyester resin. Specifically, the content of the resin having another structure with respect to the polyester resin is usually 50 parts by mass or less, and from the standpoint of wear resistance, preferably 30 parts by mass or less.

Regarding the ratio between the polyester resin and the charge transport substance, the charge transport substance is used in an amount of 30 parts by mass or more with respect to 100 parts by mass of the polyester resin. From the standpoint of electrical properties, the amount thereof is preferably 40 parts by mass or more, and from the standpoint of wear resistance, 200 parts by mass or less, and preferably 150 parts by mass or less.

Specific suitable structure examples of the binder resin are shown below. However, the following are mere examples, and any known binder resin may be mixed and used so long as the use thereof does not depart from the spirit of the invention.

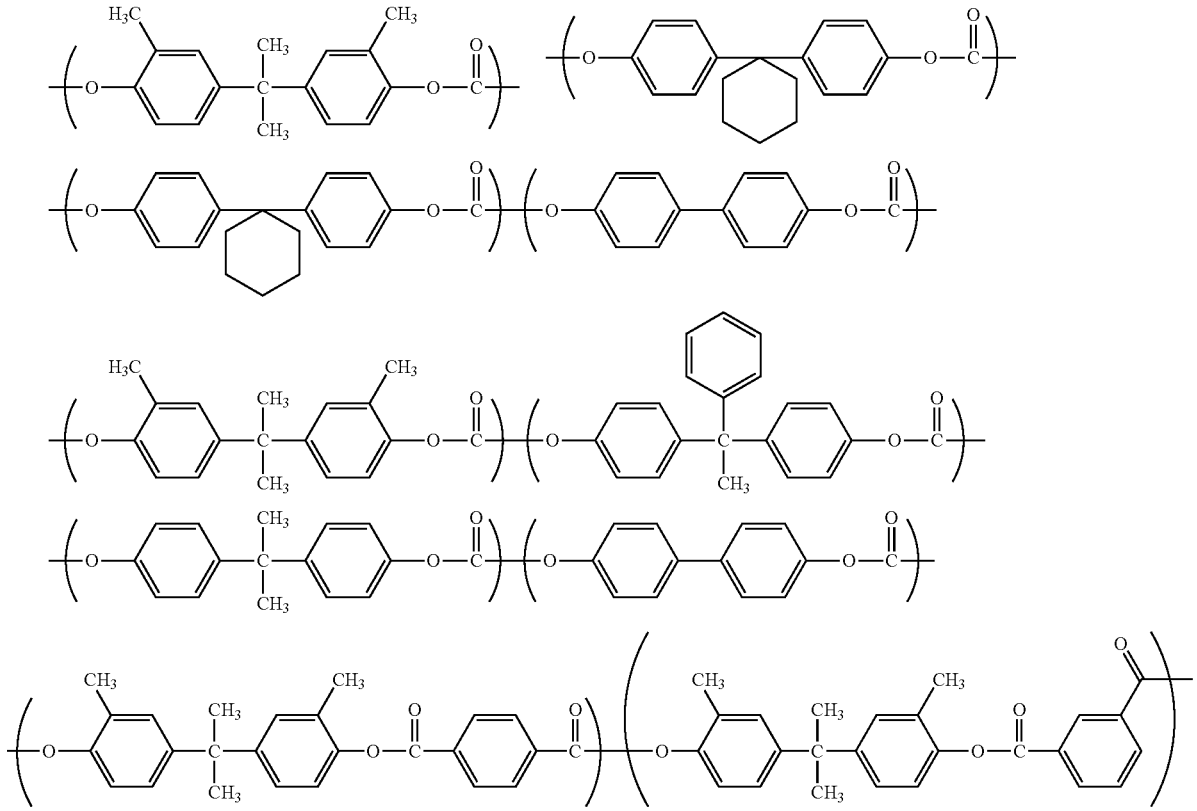

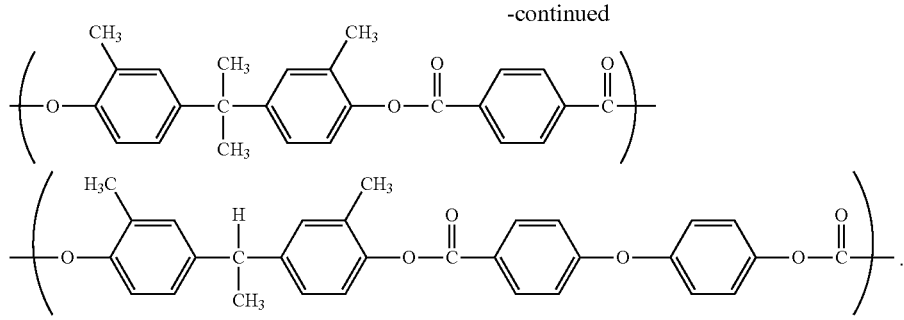

Regarding the ratio between the entire binder resin and the charge transport substance, the charge transport substance is usually used in an amount of 10 parts by mass or more with respect to 100 parts by mass of the binder resin in the same layer. From the standpoint of reducing residual potential, the amount thereof is preferably 20 parts by mass or more, and from the standpoints of stability upon repeated use and charge mobility, more preferably 30 parts by mass or more, and even more preferably 40 parts by mass or more.

The charge transport substance is usually used in an amount of 150 parts by mass or less, and from the standpoint of thermal stability of photosensitive layer, 120 parts by mass or less. From the standpoint of compatibility between the charge transport substance and the binder resin, the amount thereof is preferably 110 parts by mass or less, more preferably 100 parts by mass or less, even more preferably 80 parts by mass or less from the standpoint of wear resistance, and particularly preferably 70 parts by mass or less from the standpoint of scratch resistance.

The charge transport layer may include known additives such as an antioxidant, a plasticizer, an ultraviolet absorber, an electron-attracting compound, a dye, a pigment, and a leveling agent for the purposes of enhancing the film-forming properties, flexibility, applicability, nonfouling properties, gas resistance, light fastness, and the like. Examples of the antioxidant include hindered phenol compounds and hindered amine compounds. Examples of dyes or pigments include various colorant compounds and azo compounds.

<Single-Layer Type Photosensitive Layer>

A single-layer type photosensitive layer is formed, similar to the charge transport layer of the multilayer type photoreceptor, by using a binder resin in addition to charge generation substance and charge transport substance in order to secure the film strength. Specifically, the photosensitive layer may be formed by dissolving or dispersing a charge generation substance, a charge transport substance, and various binder resins in a solvent to prepare a coating fluid, and applying this coating fluid to a conductive support (or to an undercoat layer in the case where the undercoat layer has been disposed) and drying the coating fluid.

The kinds of the charge transport substances and the binder resins and the use ratio therebetween are the same as those described for the charge transport layer of the multilayer type photoreceptor. The charge generation substance is dispersed in the charge transport medium formed of these charge transport substances and binder resins.

As the charge generation substance, those similar to those described for the charge generation layer of the multilayer type photoreceptor are available. However, in the case of the photosensitive layer of the single-layer photoreceptor, the particle diameter of the charge generation substance needs to be sufficiently small. Specifically, the diameter thereof is usually within a range of 1 μm or less, and preferably 0.5 μm or less.

If the amount of the charge generation substance dispersed in the single-layer type photosensitive layer is too small, sufficient sensitivity cannot be obtained, whereas if the amount thereof is too much, there are adverse effects such as a decrease in chargeability and a decrease in sensitivity. Therefore, the charge generation substance is usually used in an amount of 0.5 mass % or more, preferably 1 mass % or more, and usually 50 mass % or less, preferably 20 mass % or less with respect to the entire single-layer type photosensitive layer.

Regarding the ratio between the charge generation substances and the binder resins in the single-layer type photosensitive layer, the charge generation substance is usually used in an amount of 0.1 parts by mass or more, preferably 1 part by mass or more, and usually 30 parts by mass or less, preferably 10 parts by mass or less with respect to 100 parts by mass of the binder resin.

The film thickness of the single-layer type photosensitive layer is usually within a range of 5 μm or more, preferably 10 μm or more, and usually 50 μm or less, preferably 100 μm or less. In this case as well, other additives may be included such as: known plasticizers for improving film-forming properties, flexibility, and mechanical strength; additives for suppressing residual potential; auxiliary dispersants for increasing dispersion stability; leveling agents for improving applicability; surfactants, e.g., silicone oil and fluorine-containing oil; and other such additives.

<Other Functional Layers>

Both multilayer type photoreceptor and single-layer type photoreceptor may include, in the photosensitive layer or in each of the layers constituting thereof, known additives such as an antioxidant, plasticizer, ultraviolet absorber, electron-attracting compound, leveling agent, and visible-light-shielding agent for the purposes of enhancing the film-forming properties, flexibility, applicability, nonfouling properties, gas resistance, light fastness, and the like.

Furthermore, particles formed of a fluororesin, silicon resin, polyethylene resin, or the like, or an inorganic compound may be incorporated into the surface layer for the purposes of reducing the frictional resistance or wear of the photoreceptor surface, heightening the efficiency of toner transfer from the photoreceptor to a transfer belt or to paper, and the like. Alternatively, a layer including these resins or particles may be newly provided as a surface layer. Further, as necessary, those photoreceptors may have a layer for improving the electrical properties and the mechanical properties, e.g., an intermediate layer such as a barrier layer, adhesive layer, and a blocking layer, and a transparent insulating layer.

<Methods for Forming Layers>

Layers that constitutes the above-described photoreceptor may be formed by repeatedly and successively performing application and drying steps, in which a coating fluid obtained by dissolving or dispersing, in a solvent, substances to be incorporated is applied to a support by a known method, such as dip coating, spray coating, nozzle coating, bar coating, roll coating, or blade coating, and dried to form each layer.

Although solvents or dispersion media used in preparation of the coating fluid is not particularly limited to specific solvents or dispersion media, specific examples thereof include alcohols such as methanol, ethanol, propanol, and 2-methoxyethanol, ethers such as tetrahydrofuran, 1,4-dioxane, and dimethoxyethane, esters such as methyl formate, ethyl acetate, ketones such as acetone, methyl ethyl ketone, and cyclohexanone, aromatic hydrocarbons such as benzene, toluene, and xylene, chlorinated hydrocarbons such as dichloromethane, chloroform, 1,2-dichloroethane, 1,1,2-trichloroethane, 1,1,1-trichloroethane, tetrachloroethane, 1,2-dichloropropane, and trichloroethylene, nitrogen-containing compounds such as n-butylamine, isopropanolamine, diethylamine, triethanolamine, ethylenediamine, and triethylenediamine, and aprotic polar solvents such as acetonitrile, N-methylpyrrolidone, N,N-dimethylformamide, and dimethyl sulfoxide.

From the standpoint of environmental consciousness, preferred of these solvents are halogen-free solvents, and from the standpoint of solubility, particularly preferred of those are toluene, xylene, anisole, dimethoxyethane, tetrahydrofuran, and 1,4-dioxane. One of these may be used alone, or two or more of these may be used in any desired combination.

Although the amount of the solvent or dispersion media to be used is not particularly specified, but the amount thereof is preferably adjusted, as appropriate, in accordance with the intended purpose of each layer and nature of the selected solvent and dispersion media so as to regulate properties such as the solid content concentration or viscosity of the coating fluid to be in desired ranges.

For example, in the case of the charge transport layer of the single-layer type photoreceptor and the function allocation type photoreceptor, the solid content concentration of the coating fluid is usually set to be in a range of 5 mass % or more, preferably 10 mass % or more, and usually 40 mass % or less, preferably 35 mass % or less. Further, the viscosity of the coating fluid is usually set to be in a range of 10 cps or more, preferably 50 cps or more, and usually 500 cps or less, preferably 400 cps or less.

In the case of the charge generation layer of multilayer type photoreceptor, the solid content concentration of the coating fluid is usually set to be in a range of 0.1 mass % or more, preferably 1 mass % or more, and usually 15 mass % or less, preferably 10 mass % or less. Further, the viscosity of the coating fluid is usually set to be in a range of 0.01 cps or more, preferably 0.1 cps or more, and usually 20 cps or less, preferably 10 cps or less.

Examples of methods for applying the coating fluid include dip coating, spray coating, spinner coating, bead coating, wire-wound bar coating, blade coating, roller coating, air-knife coating, and curtain coating. However, it is also possible to use other known coating techniques.

Regarding the drying of the coating fluid, it is preferable that after room-temperature drying to the touch, the coating fluid is dried by heating in a temperature range of, usually, 30° C. or more to 200° C. or less for 1 minute to 2 hours either in a stationary atmosphere or with air blowing. The heating temperature may be constant, or the heating for drying may be performed while changing the heating temperature.

<Image Forming Apparatus>

Next, with respect to an embodiment of an image forming apparatus including the electrophotographic photoreceptor of the present invention (image forming apparatus of the present invention), description will be provided with reference to FIGURE, which illustrates the configuration of main components of the apparatus. However, embodiments of the present invention are not limited to the following description, and the embodiments can be freely modified without departing from the spirit and scope of the present invention.

As shown in FIGURE, the image forming apparatus includes an electrophotographic photoreceptor 1, a charging device 2, an exposure device 3, and a developing device 4, and may further include, as necessary, a transfer device 5, a cleaning device 6, and a fixing device 7.

The electrophotographic photoreceptor 1 is not particularly limited as long as it is the electrophotographic photoreceptor according to the present invention described above. FIGURE depicts, as an example thereof, a drum-shaped photoreceptor in which the above-described photosensitive layer is formed on a surface of a cylindrical conductive support. The respective devices of the charging device 2, the exposure device 3, the developing device 4, the transfer device 5 and the cleaning device 6 are disposed in conformance with an outer peripheral surface of the electrophotographic photoreceptor 1.

The charging device 2, which charges the electrophotographic photoreceptor 1, uniformly charges a surface of the electrophotographic photoreceptor 1 to a predetermined potential. Examples of the charging device that is frequently used include corona charging devices such as a corotron and a scorotron, direct charging devices (contact charging devices) that charge the photoreceptor by bringing a direct charging member to which a voltage is applied into contact with a surface of the photoreceptor, for example, a contact charging device such as a charging brush.

Examples of the direct charging means include contact chargers such as a charging roller and a charging brush. The charging device depicted in FIGURE, as an example of the charging device 2, is a roller type-charging device (charging roller). As the direct charging means, employable here are both one accompanied by aerial discharge and one for injection charging not accompanied by an aerial discharge. As the voltage to be applied in charging, a direct current alone may be used, but also usable is a superimposed voltage of a direct current and an alternate current.

The exposure device 3 is not particularly limited so long as the exposure device is capable of exposing the electrophotographic photoreceptor 1 to light and thereby forming an electrostatic latent image on a photosensitive surface of the electrophotographic photoreceptor 1. Specific examples thereof include a halogen lamp, fluorescent lamp, laser (semiconductor-laser or He—Ne-laser), and LED. Alternatively, the exposure may be performed by an internal photoreceptor exposure technique.

The exposing light can be selected at will, but use can be made of, for example, monochromatic light having a wavelength of 780 nm, monochromatic light having a slightly short wavelength in a range of 600 nm to 700 nm, monochromatic light having a short wavelength in a range of 380 nm 500 nm. Use of light having a short wavelength in a range of 380 nm to 500 nm increases the resolution, and is thus preferred. More preferred among them is monochromatic light having a wavelength of 405 nm.

The developing device 4 is not limited to a particular kind, and use may be made of any developing devices employing a dry development technique such as cascade development, development with a one-component insulated toner, development with a one-component conductive toner, or two-component magnetic-brush development, a wet development technique, or the like. In FIGURE, the developing device 4 includes a developing tank 41, agitators 42, a feed roller 43, a developing roller 44, and a control member 45, and has been configured so that a toner T is retained in the developing tank 41.

A replenisher (not shown) for replenishing with toner T may be provided to the developing device 4 in accordance with necessities. This replenisher is configured so that the developing device 4 can be replenished with toner T from a vessel such as a bottle or a cartridge.

The transfer device 5 is not limited to a particular kind, and use can be made of devices using any technique such as an electrostatic transfer technique, pressure transfer technique adhesive transfer technique, or the like, e.g., corona transfer, roller transfer, or belt transfer. Herein, it is assumed that the transfer device 5 includes a transfer charger, a transfer roller, and a transfer belt configured to face the electrophotographic photoreceptor 1. This transfer device 5 applies a predetermined voltage (transfer voltage) in a polarity opposite to the charge potential of the toner T, and thereby transfers a toner image formed on the electrophotographic photoreceptor 1 onto a recording paper (paper and medium) P.

The cleaning device 6 is not limited to a particular device, use may be made of any cleaning device such as a brush cleaner, a magnetic brush cleaner, an electrostatic brush cleaner, a magnetic roller cleaner, a blade cleaner, or the like. The cleaning device 6 scrapes off residual toners attached to the electrophotographic photoreceptor 1 with a cleaning member to collect the residual toners. However, in a case where the residual toners on the surface of the photoreceptor are either small or almost non-existent, the cleaning device 6 may be omitted.

The toner that has been transferred onto the recording paper P is thermally heated until the toner is molten, while passing through between the upper fixing member 71 that has been heated to a predetermined temperature and the lower fixing member 72. After passing therethrough, the toner is cooled and thereby fixed onto the recording paper P.

The electrophotographic apparatus configured as such records an image as follows. That is, first, the charging device 2 charges a surface (photosensitive surface) of the electrophotographic photoreceptor 1 to a predetermined potential (for example, −600 V). At this time, the charging device 2 may charge the photosensitive surface of the electrophotographic photoreceptor using a direct-current voltage or may charge the same using an alternate-current voltage superimposed with a direct-current voltage.

Subsequently, the charged photosensitive surface of the electrophotographic photoreceptor 1 is exposed to light by the exposure device 3 in accordance with an image to be recorded to form an electrostatic latent image on the photosensitive surface. Then, the developing device 4 develops the electrostatic latent image formed on the photosensitive surface of the electrophotographic photoreceptor 1.

The developing device 4 forms the toner T fed by a feed roller 43 into a thin layer using a control member (developing blade) 45 and simultaneously charges the toner T to a predetermined polarity (here, the same polarity as that of the charge potential of the electrophotographic photoreceptor 1: negative polarity) by means of frictional electrification, transfers the toner while supporting the toner with a developing roller 44, and brings into contact with a surface of the electrophotographic photoreceptor 1.

When the charged toner T supported with the developing roller 44 comes into contact with the surface of the electrophotographic photoreceptor 1, a toner image corresponding to the electrostatic latent image is formed on the photosensitive surface of the electrophotographic photoreceptor 1. The toner image is transferred by the transfer device 5 onto the recording paper P. Thereafter, the toners remaining on the photosensitive surface of the electrophotographic photoreceptor 1 without being transferred is removed by the cleaning device 6.

After the transfer of the toner image onto the recording paper P, the recording paper P is made to pass through the fixing device 7 such that the toner image is thermally fixed onto the recording paper P, whereby obtaining a final image.

In addition to the above-described configuration, the image forming apparatus may be configured, for example, to be capable of carrying out a erase step. The erase step is a step of carrying out eliminating the charges of the electrophotographic photoreceptor by exposing the electrophotographic photoreceptor to light, and as a charge removal device, a fluorescent lamp or LED may, for example, be used. Further, regarding the intensity of the light used in the erase step, light having exposure energy at least three times the exposure light is frequently used.

The image forming apparatus may further be modified such that the image forming apparatus is configured, for example, to be capable of carrying out a pre-exposure step or an auxiliary charging step, or to be capable of offset printing, or further may be configured as a full-color tandem system employing multiple kinds of toners.

In the invention, one or two or more of the charging device 2, the exposure device 3, the developing device 4, the transfer device 5, the cleaning device 6, and the fixing device 7 may be combined with the electrophotographic photoreceptor 1 to configure an integrated cartridge (hereinafter, referred as "electrophotographic photoreceptor cartridge" as appropriate) so that this electrophotographic photoreceptor cartridge can be mounted on and demounted from the main body of an electrophotographic apparatus such as a copier or a laser-beam printer.

With this configuration, for example, in a case where the electrophotographic photoreceptor 1 or other member has deteriorated, the electrophotographic photoreceptor cartridge can be demounted from the image forming apparatus main body, and another new electrophotographic photoreceptor cartridge can be mounted on the main body of the image forming apparatus. This makes it easy to maintain and manage the image forming apparatus.

EXAMPLES

The specific embodiments of the present invention will be described in a detailed manner with reference to the following Examples. However, the present invention is not limited to these Examples unless departing from the gist thereof.

Test Example 1

[Production of Ester Oligomer]

Production Example 1-1 (Synthesis of Ester Oligomer (1))

Resorcinol (3.00 g), 1,1-bis(4-hydroxy-3-methylphenyl) ethane (13.20 g, hereinafter referred to as BP-a), and diphenyl ether-4,4'-dicarboxylic acid chloride (16.08 g) were weighed and put into a 300 mL four-neck reaction vessel purged with nitrogen, and dissolved in dichloromethane (90 mL). Subsequently, a mixed solution of triethylamine (11.58 g) and dichloromethane (45 mL) was added dropwise over 30 minutes to the reaction vessel that has been cooled to 0° C. to 5° C. After continuous stirring for 1 hour, desalted water (100 mL) was added thereto and stirring was carried out for 10 minutes. After stirring, the organic layer was separated, and the separated organic layer was washed twice with 0.1 N hydrochloric acid (100 mL), and further washed twice with desalted water (100 mL). Thereafter, through concentration and drying, Ester Oligomer (1) having a phenol group at the molecular terminal was obtained.

Production Example 1-2 (Synthesis of Ester Oligomer (2))

Methylhydroquinone (3.00 g), BP-a (11.71 g) and diphenyl ether-4,4'-dicarboxylic acid chloride (14.26 g) were weighed and put into a 300 mL four-neck reaction vessel purged with nitrogen, and dissolved in dichloromethane (90 mL). Subsequently, a mixed solution of triethylamine (10.28 g) and dichloromethane (30 mL) was added dropwise over 30 minutes to the reaction vessel that has been cooled to 0° C. to 5° C. After continuous stirring for 1 hour, desalted water (100 mL) was added thereto and stirring was carried out for 10 minutes. After stirring, the organic layer was separated, and the separated organic layer was washed twice with 0.1 N hydrochloric acid (100 mL), and further washed twice with desalted water (100 mL). Thereafter, through concentration and drying, Ester Oligomer (2) having a phenol group at the molecular terminal was obtained.

Production Example 1-3 (Synthesis of Ester Oligomer (3))

BP-a (5.86 g) and diphenyl ether-4,4'-dicarboxylic acid chloride (14.29 g) were weighed and put into a 300 mL four-neck reaction vessel purged with nitrogen, and dissolved in dichloromethane (60 mL). Subsequently, a mixed solution of triethylamine (5.14 g) and dichloromethane (40 mL) was added dropwise over 30 minutes to the reaction vessel that has been cooled to 0° C. to 5° C. After continuous stirring for a half hour, BP-a (9.10 g) and hydroquinone (1.20 g) were added to the reaction vessel. Thereafter, a mixed solution of triethylamine (5.14 g) and dichloromethane (20 mL) was added dropwise to the reaction vessel over 30 minutes. After continuous stirring for 1 hour, desalted water (100 mL) was added thereto and stirring was carried out for 10 minutes. After stirring, the organic layer was separated, and the separated organic layer was washed twice with 0.1 N hydrochloric acid (100 mL), and further washed twice with desalted water (100 mL). Thereafter, through concentration and drying, Ester Oligomer (3) having a phenol group at the molecular terminal was obtained.

Production Example 1-4 (Synthesis of Ester Oligomer (4))

1,6-Dihydroxynaphthalene (4.00 g), BP-a (12.10 g), and diphenyl ether-4,4'-dicarboxylic acid chloride (14.74 g) were weighed and put into a 300 mL four-neck reaction vessel purged with nitrogen, and dissolved in dichloromethane (80 mL). Subsequently, a mixed solution of triethylamine (10.62 g) and dichloromethane (45 mL) was added dropwise over 30 minutes to the reaction vessel that has been cooled to 0° C. to 5° C. After continuous stirring for 1 hour, desalted water (100 mL) was added thereto and stirring was carried out for 10 minutes. After stirring, the organic layer was separated, and the separated organic layer was washed twice with 0.1 N hydrochloric acid (100 mL), and further washed twice with desalted water (100 mL). Thereafter, through concentration and drying, Ester Oligomer (4) having a phenol group at the molecular terminal was obtained.

Production Example 1-5 (Synthesis of Ester Oligomer (5))

1,5-Dihydroxynaphthalene (1.50 g), BP-a (12.86 g), and diphenyl ether-4,4'-dicarboxylic acid chloride (12.28 g) were weighed and put into a 300 mL four-neck reaction vessel purged with nitrogen, and dissolved in dichloromethane (80 mL). Subsequently, a mixed solution of triethylamine (8.84 g) and dichloromethane (40 mL) was added dropwise over 30 minutes to the reaction vessel that has been cooled to 0° C. to 5° C. After continuous stirring for 1 hour, desalted water (100 mL) was added thereto and stirring was carried out for 10 minutes. After stirring, the organic layer was separated, and the separated organic layer was washed twice with 0.1 N hydrochloric acid (100 mL), and further washed twice with desalted water (100 mL). Thereafter, through concentration and drying, Ester Oligomer (5) having a phenol group at the molecular terminal was obtained.

Production Example 1-6 (Synthesis of Ester Oligomer (6))

BP-a (7.00 g) and diphenyl ether-4,4'-dicarboxylic acid chloride (17.05 g) were weighed and put into a 500 mL four-neck reaction vessel purged with nitrogen, and dissolved in dichloromethane (160 mL). Subsequently, a mixed solution of triethylamine (6.14 g) and dichloromethane (20 mL) was added dropwise over 20 minutes to the reaction vessel that has been cooled to 0° C. to 5° C. After continuous stirring for 5 minutes, BP-a (11.90 g) and 4-hydroxybenzoate 4-hydroxyphenyl (2.00 g) were added to the reaction vessel. Thereafter, a mixed solution of triethylamine (6.14 g) and dichloromethane (20 mL) was added dropwise to the reaction vessel over 20 minutes. After continuous stirring for 1 hour, 0.1 N hydrochloric acid (170 mL) was added thereto and stirring was carried out for 30 minutes. After stirring, the organic layer was separated, and the separated organic layer was washed twice with 0.1 N hydrochloric acid (170 mL), and further washed twice with desalted water (170 mL). Thereafter, through concentration and drying, Ester Oligomer (6) having a phenol group at the molecular terminal was obtained.

Production Example 1-7 (Synthesis of Ester Oligomer (7))

BP-a (18.54 g) and trans-1,4-cyclohexane dicarboxylic acid chloride (8.00 g, manufactured by Ihara Nikkei Kagaku Kogyo Co., Ltd.) were weighed and put into a 500 mL four-neck reaction vessel purged with nitrogen, and dissolved in dichloromethane (160 mL). Subsequently, a mixed solution of triethylamine (8.52 g) and dichloromethane (30 mL) was added dropwise over 30 minutes to the reaction vessel that has been cooled to 0° C. to 5° C. After continuous stirring for 1 hour, desalted water (150 mL) was added thereto and stirring was carried out for 10 minutes. After stirring, the organic layer was separated, and the separated organic layer was washed twice with 0.1 N hydrochloric acid (150 mL), and further washed twice with desalted water (150 mL). Thereafter, through concentration and drying, Ester Oligomer (7) having a phenol group at the molecular terminal was obtained.

Production Example 1-8 (Synthesis of Ester Oligomer (8))

BP-a (17.31 g) and 1,4-phenylenediacetic acid dichloride (10.00 g, manufactured by Ihara Nikkei Kagaku Kogyo Co., Ltd.) were weighed and put into a 500 mL four-neck reaction vessel purged with nitrogen, and dissolved in dichloromethane (150 mL). Subsequently, a mixed solution of triethylamine (9.19 g) and dichloromethane (65 mL) was added dropwise over 1 hour to the reaction vessel that has been cooled to 0° C. to 5° C. After continuous stirring for 1 hour, desalted water (150 mL) was added thereto and stirring was carried out for 10 minutes. After stirring, the organic layer was separated, and the separated organic layer was washed twice with 0.1 N hydrochloric acid (150 mL), and further washed twice with desalted water (150 mL). Thereafter, through concentration and drying, Ester Oligomer (8) having a phenol group at the molecular terminal was obtained.

Production Example 1-9 (Synthesis of Ester Oligomer (9))

1,4-Benzene methanol (3.00 g) and diphenyl ether-4,4'-dicarboxylic acid chloride (12.81 g) were weighed and put into a 500 mL four-neck reaction vessel purged with nitrogen, and dissolved in dichloromethane (130 mL). Subsequently, a mixed solution of triethylamine (4.61 g) and dichloromethane (20 mL) was added dropwise over 30 minutes to the reaction vessel that has been cooled to 0° C. to 5° C. After continuous stirring for 2 hours, BP-a (10.52 g) was added to the reaction vessel. Thereafter, a mixed solution of triethylamine (4.61 g) and dichloromethane (20 mL) was added dropwise to the reaction vessel over 30 minutes. After continuous stirring for 1 hour, desalted water (150 mL) was added thereto and stirring was carried out for 10 minutes. After stirring, the organic layer was separated, and the separated organic layer was washed twice with 0.1 N hydrochloric acid (150 mL), and further washed twice with desalted water (150 mL). Thereafter, through concentration and drying, Ester Oligomer (9) having a phenol group at the molecular terminal was obtained.

Production Example 1-10 (Synthesis of Ester Oligomer (10))

Isosorbide (4.00 g) and terephthalic acid chloride (11.11 g) were weighed and put into a 300 mL four-neck reaction vessel purged with nitrogen, and dissolved in dichloromethane (90 mL). Subsequently, a mixed solution of triethylamine (5.82 g) and dichloromethane (26 mL) was added dropwise over 30 minutes to the reaction vessel that has been cooled to 0° C. to 5° C. After continuous stirring for 3 hours, BP-a (13.26 g) was added to the reaction vessel. Thereafter, a mixed solution of triethylamine (5.82 g) and dichloromethane (20 mL) was added dropwise to the reaction vessel over 30 minutes. After continuous stirring for 1 hour, desalted water (100 mL) was added thereto and stirring was carried out for 10 minutes. After stirring, the organic layer was separated, and the separated organic layer was washed twice with 0.1 N hydrochloric acid (100 mL), and further washed twice with desalted water (100 mL). Thereafter, through concentration and drying, Ester Oligomer (10) having a phenol group at the molecular terminal was obtained.

Production Example 1-11 (Synthesis of Ester Oligomer (11))

4,4'-Biphenyldimethanol (4.50 g) and diphenyl ether-4,4'-dicarboxylic acid chloride (12.04 g) were weighed and put into a 300 mL four-neck reaction vessel purged with nitrogen, and dissolved in dichloromethane (120 mL). Subsequently, a mixed solution of triethylamine (4.67 g) and dichloromethane (30 mL) was added dropwise over 20 minutes to the reaction vessel that has been cooled to 0° C. to 5° C. After the temperature of the reaction vessel was increased to 20° C., stirring was continuously carried out for 1 hour, and BP-a (10.18 g) was added to the reaction vessel. Thereafter, a mixed solution of triethylamine (4.67 g) and dichloromethane (30 mL) was added dropwise over 20 minutes to the reaction vessel that has been cooled 0° C. to 5° C. After continuous stirring for 1 hour, 0.1 N hydrochloric acid (150 mL) was added thereto and stirring was carried out for 30 minutes. After stirring, the organic layer was separated, and the separated organic layer was washed twice with 0.1 N hydrochloric acid (150 mL), and further washed twice with desalted water (150 mL). Thereafter, through concentration and drying, Ester Oligomer (11) having a phenol group at the molecular terminal was obtained.

Example 1-1 (Production of Polyester Resin (1))

Sodium hydroxide (1.57 g) was weighed and put into a 500 mL beaker and dissolved in $H_2O$ (188 mL) with stirring. 2,3,5-Trimethylphenol (0.21 g) and benzyltriethylammonium chloride (0.11 g) were added thereto and dissolved by stirring, and this alkaline aqueous solution was transferred to a 1 L reaction tank.

Separately, a mixed solution of Ester Oligomer (1) (16.13 g) that has been synthesized in Production Example 1-1, diphenyl ether-4,4'-dicarboxylic acid chloride (4.87 g), and dichloromethane (107 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (166 mL) was added and stirring was continuously carried out for 9 hours. Thereafter, the stirring was stopped and the mixture was allowed to stand for 30 minutes, and then the organic layer was separated. This organic layer was washed three times with 0.1 N hydrochloric acid (205 mL), and further washed twice with desalted water (205 mL). The washed organic layer was diluted with dichloromethane (100 mL), poured into methanol (1800 mL), and the obtained precipitate was taken out by filtration and dried to obtain the intended Polyester Resin (1). The viscosity-average molecular weight (Mv) of the obtained polyester resin was 44,200. The structural formula of Polyester Resin (1) is shown below.

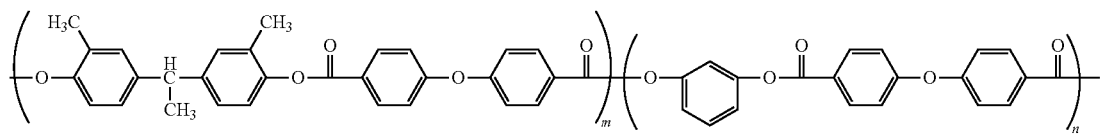

m:n = 67:33

[Measurement of Viscosity-Average Molecular Weight (Mv)]

The polyester resin was dissolved in dichloromethane to prepare a solution having a concentration C of 6.00 g/L. Using an Ubbelohde capillary viscometer having a solvent (dichloromethane) flow time to of 136.16 seconds, the sample solution was examined for flow time t in a thermo- The washed organic layer was diluted with dichloromethane (100 mL) and poured into methanol (1800 mL), and the obtained precipitate was taken out by filtration and dried to obtain the intended Polyester Resin (2). The viscosity-average molecular weight (Mv) of the obtained polyester resin was 54,200. The structural formula of Polyester Resin (2) is shown below.

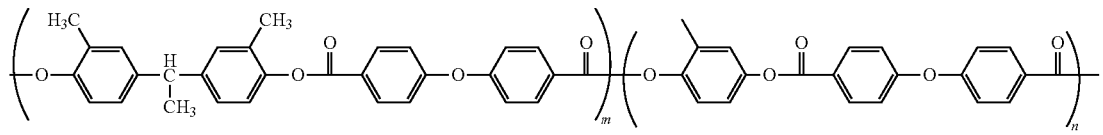

m:n = 67:33 static water bath set at 20.0° C. The viscosity-average molecular weight (Mv) was calculated according to the following equations.

$a = 0.438 \times \eta_{sp} + 1 \quad \eta_{sp} = t/t_0 - 1$ $b = 100 \times \eta_{sp}/C \quad C = 6.00 \text{ (g/L)}$ $\eta = b/a$ $Mv = 3207 \times \eta^{1.205}$ Example 1-2 (Production of Polyester Resin (2))

Sodium hydroxide (1.55 g) was weighed and put into a 500 mL beaker and dissolved in $H_2O$ (188 mL) with stirring. 2,3,5-Trimethylphenol (0.21 g) and benzyltriethylammonium chloride (0.11 g) were added thereto and dissolved by stirring, and this alkaline aqueous solution was transferred to a 1 L reaction tank.

Separately, a mixed solution of Ester Oligomer (2) (16.18 g) that has been synthesized in Production Example 1-2, diphenyl ether-4,4'-dicarboxylic acid chloride (4.81 g), and dichloromethane (107 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (166 mL) was added and stirring was continuously carried out for 9 hours. Thereafter, the stirring was stopped and the mixture was allowed to stand for 30 minutes, and then the organic layer was separated. This organic layer was washed three times with 0.1 N hydrochloric acid (205 mL), and further washed twice with desalted water (205 mL).

Example 1-3 (Production of Polyester Resin (3))

Sodium hydroxide (1.87 g) was weighed and put into a 500 mL beaker and dissolved in $H_2O$ (235 mL) with stirring. 2,3,5-Trimethylphenol (0.32 g) and benzyltriethylammonium chloride (0.14 g) were added thereto and dissolved by stirring, and this alkaline aqueous solution was transferred to a 1 L reaction tank.

Separately, a mixed solution of Ester Oligomer (3) (20.33 g) that has been synthesized in Production Example 1-3, diphenyl ether-4,4'-dicarboxylic acid chloride (5.78 g), and dichloromethane (134 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (200 mL) was added and stirring was continuously carried out for 9 hours. Thereafter, the stirring was stopped and the mixture was allowed to stand for 30 minutes, and then the organic layer was separated. This organic layer was washed three times with 0.1 N hydrochloric acid (250 mL), and further washed twice with desalted water (250 mL).

The washed organic layer was diluted with dichloromethane (150 mL) and poured into methanol (2000 mL), and the obtained precipitate was taken out by filtration and dried to obtain the intended Polyester Resin (3). The viscosity-average molecular weight (Mv) of the obtained polyester resin was 43,500. The structural formula of Polyester Resin (3) is shown below.

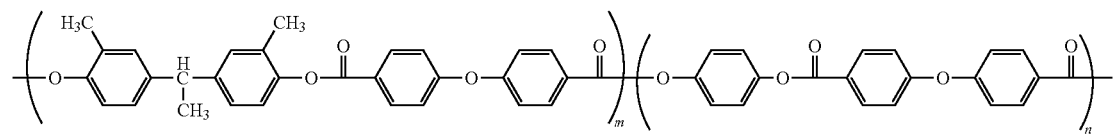

m:n = 90:10

Example 1-4 (Production of Polyester Resin (4))

Sodium hydroxide (1.52 g) was weighed and put into a 500 mL beaker and dissolved in $H_2O$ (188 mL) with stirring. 2,3,5-Trimethylphenol (0.24 g) and benzyltriethylammonium chloride (0.11 g) were added thereto and dissolved by stirring, and this alkaline aqueous solution was transferred to a 1 L reaction tank.

Separately, a mixed solution of Ester Oligomer (4) (16.22 g) that has been synthesized in Production Example 1-4, diphenyl ether-4,4'-dicarboxylic acid chloride (4.70 g), and dichloromethane (107 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (176 mL) was added and stirring was continuously carried out for 9 hours. Thereafter, the stirring was stopped and the mixture was allowed to stand for 30 minutes, and then the organic layer was separated. This organic layer was washed three times with 0.1 N hydrochloric acid (210 mL), and further washed twice with desalted water (210 mL).

The washed organic layer was diluted with dichloromethane (100 mL) and poured into methanol (1800 mL), and the obtained precipitate was taken out by filtration and dried to obtain the intended Polyester Resin (4). The viscosity-average molecular weight (Mv) of the obtained polyester resin was 39,000. The structural formula of Polyester Resin (4) is shown below.

2,3,5-Trimethylphenol (0.25 g) and benzyltriethylammonium chloride (0.11 g) were added thereto and dissolved by stirring, and this alkaline aqueous solution was transferred to a 1 L reaction tank.

Separately, a mixed solution of Ester Oligomer (5) (16.32 g) that has been synthesized in Production Example 1-5, diphenyl ether-4,4'-dicarboxylic acid chloride (4.56 g), and dichloromethane (107 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (176 mL) was added and stirring was continuously carried out for 9 hours. Thereafter, the stirring was stopped and the mixture was allowed to stand for 30 minutes, and then the organic layer was separated. This organic layer was washed three times with 0.1 N hydrochloric acid (210 mL), and further washed twice with desalted water (210 mL).

The washed organic layer was diluted with dichloromethane (100 mL) and poured into methanol (1800 mL), and the obtained precipitate was taken out by filtration and dried to

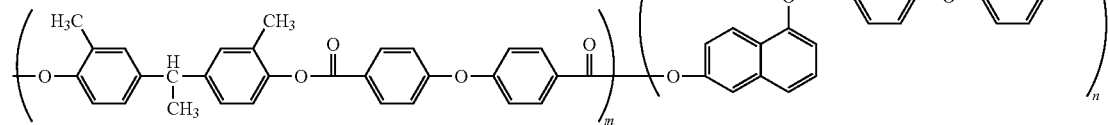

m:n = 67:33

Example 1-5 (Production of Polyester Resin (5))

Sodium hydroxide (1.47 g) was weighed and put into a 500 mL beaker and dissolved in $H_2O$ (188 mL) with stirring.

obtain the intended Polyester Resin (5). The viscosity-average molecular weight (Mv) of the obtained polyester resin was 41,300. The structural formula of Polyester Resin (5) is shown below.

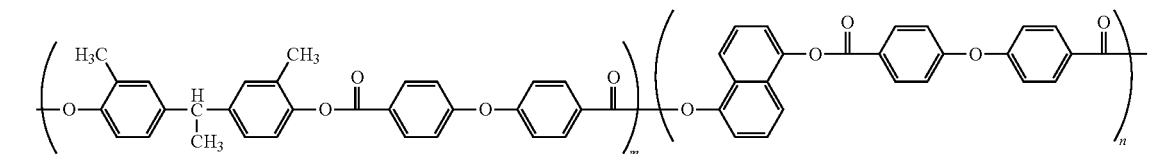

m:n = 85:15

Example 1-6 (Production of Polyester Resin (6))

Sodium hydroxide (1.78 g) was weighed and put into a 500 mL beaker and dissolved in $H_2O$ (188 mL) with stirring. 2,3,5-Trimethylphenol (0.26 g) and benzyltriethylammonium chloride (0.08 g) were added thereto and dissolved by stirring, and this alkaline aqueous solution was transferred to a 1 L reaction tank.

Separately, a mixed solution of Ester Oligomer (6) (20.57 g) that has been synthesized in Production Example 1-6, diphenyl ether-4,4'-dicarboxylic acid chloride (5.53 g), and dichloromethane (135 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (160 mL) was added and stirring was continuously carried out for 9 hours. Thereafter, the stirring was stopped and the mixture was allowed to stand for 30 minutes, and then the organic layer was separated. This organic layer was washed three times with 0.1 N hydrochloric acid (200 mL), and further washed twice with desalted water (200 mL).

The washed organic layer was diluted with dichloromethane (100 mL) and poured into methanol (1800 mL), and the obtained precipitate was taken out by filtration and dried to obtain the intended Polyester Resin (7). The viscosity-average molecular weight (Mv) of the obtained polyester resin was 35,300. The structural formula of Polyester Resin (7) is shown below.

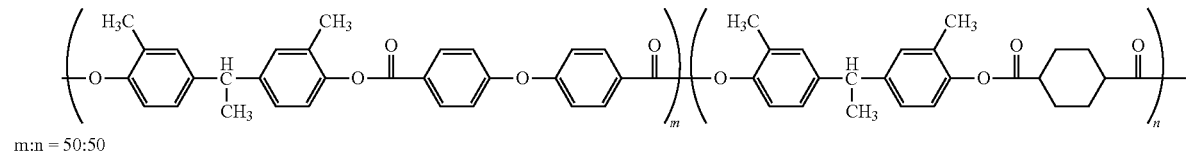

m:n = 50:50 inside the reaction tank, the dichloromethane solution was added dropwise from the dropping funnel over 1 hour. After continuous stirring for 1 hour, dichloromethane (179 mL) was added and stirring was continuously carried out for 9 hours. Thereafter, the stirring was stopped and the mixture was allowed to stand for 30 minutes, and then the organic layer was separated. This organic layer was washed three times with 0.1 N hydrochloric acid (235 mL), and further washed twice with desalted water (235 mL).

The washed organic layer was diluted with dichloromethane (180 mL) and poured into methanol (2000 mL), and the obtained precipitate was taken out by filtration and dried to obtain the intended Polyester Resin (6). The viscosity-average molecular weight (Mv) of the obtained polyester resin was 51,000. The structural formula of Polyester Resin (6) is shown below.

Example 1-8 (Production of Polyester Resin (8))

Sodium hydroxide (2.26 g) was weighed and put into a 500 mL beaker and dissolved in $H_2O$ (188 mL) with stirring. 2,3,5-Trimethylphenol (0.25 g) and benzyltriethylammonium chloride (0.17 g) were added thereto and dissolved by stirring, and this alkaline aqueous solution was transferred to a 1 L reaction tank.

Separately, a mixed solution of Ester Oligomer (8) (14.50 g) that has been synthesized in Production Example 1-8, diphenyl ether-4,4'-dicarboxylic acid chloride (6.99 g), and dichloromethane (107 mL) was transferred to a dropping funnel.

While maintaining the external temperature of the reaction tank at 20° C. and stirring the alkaline aqueous solution inside the reaction tank, the dichloromethane solution was

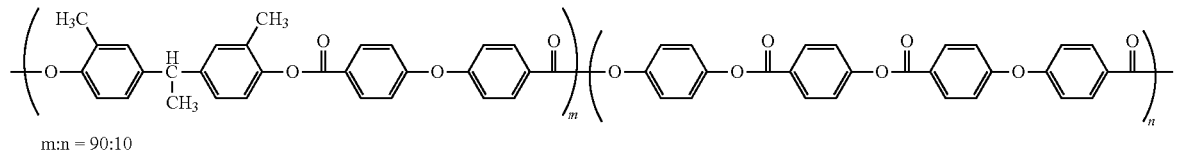

m:n = 90:10

Example 1-7 (Production of Polyester Resin (7))

Sodium hydroxide (2.31 g) was weighed and put into a 500 mL beaker and dissolved in $H_2O$ (188 mL) with stirring. 2,3,5-Trimethylphenol (0.25 g) and benzyltriethylammonium chloride (0.17 g) were added thereto and dissolved by stirring, and this alkaline aqueous solution was transferred to a 1 L reaction tank.

Separately, a mixed solution of Ester Oligomer (7) (14.37 g) that has been synthesized in Production Example 1-7, diphenyl ether-4,4'-dicarboxylic acid chloride (7.16 g), and dichloromethane (107 mL) was transferred to a dropping funnel.

While maintaining the external temperature of the reaction tank at 20° C. and stirring the alkaline aqueous solution added dropwise from the dropping funnel over 1 hour. After continuous stirring for 1 hour, dichloromethane (160 mL) was added and stirring was continuously carried out for 9 hours. Thereafter, the stirring was stopped and the mixture was allowed to stand for 30 minutes, and then the organic layer was separated. This organic layer was washed three times with 0.1 N hydrochloric acid (200 mL), and further washed twice with desalted water (200 mL).

The washed organic layer was diluted with dichloromethane (100 mL) and poured into methanol (1800 mL), and the obtained precipitate was taken out by filtration and dried to obtain the intended Polyester Resin (8). The viscosity-average molecular weight (Mv) of the obtained polyester resin was 20,200. The structural formula of Polyester Resin (8) is shown below.

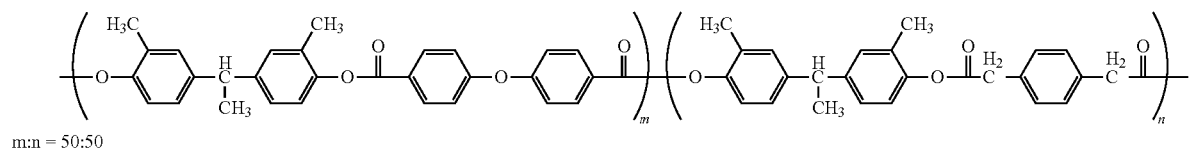

m:n = 50:50

Example 1-9 (Production of Polyester Resin (9))

Sodium hydroxide (2.72 g) was weighed and put into a 500 mL beaker and dissolved in $H_2O$ (188 mL) with stirring. BP-a (4.64 g), 2,3,5-trimethylphenol (0.26 g), and benzyltriethylammonium chloride (0.20 g) were added thereto and dissolved by stirring, and this alkaline aqueous solution was transferred to a 1 L reaction tank.

Separately, a mixed solution of Ester Oligomer (9) (8.76 g) that has been synthesized in Production Example 1-9, diphenyl ether-4,4'-dicarboxylic acid chloride (8.43 g), and dichloromethane (107 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (160 mL) was added and stirring was continuously carried out for 9 hours. Thereafter, the stirring was stopped and the mixture was allowed to stand for 30 minutes, and then the organic layer was separated. This organic layer was washed three times with 0.1 N hydrochloric acid (200 mL), and further washed twice with desalted water (200 mL).

The washed organic layer was diluted with dichloromethane (100 mL) and poured into methanol (1800 mL), and the obtained precipitate was taken out by filtration and dried to obtain the intended Polyester Resin (9). The viscosity-average molecular weight (Mv) of the obtained polyester resin was 33,200. The structural formula of Polyester Resin (9) is shown below.

2,3,5-Trimethylphenol (0.25 g) and benzyltriethylammonium chloride (0.13 g) were added thereto and dissolved by stirring, and this alkaline aqueous solution was transferred to a 1 L reaction tank.

Separately, a mixed solution of Ester Oligomer (10) (15.62 g) that has been synthesized in Production Example 1-10, diphenyl ether-4,4'-dicarboxylic acid chloride (5.50 g), and dichloromethane (107 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (143 mL) was added and stirring was continuously carried out for 9 hours. Thereafter, the stirring was stopped and the mixture was allowed to stand for 30 minutes, and then the organic layer was separated. This organic layer was washed three times with 0.1 N hydrochloric acid (190 mL), and further washed twice with desalted water (190 mL).

The washed organic layer was diluted with dichloromethane (100 mL) and poured into methanol (1800 mL), and the obtained precipitate was taken out by filtration and dried to

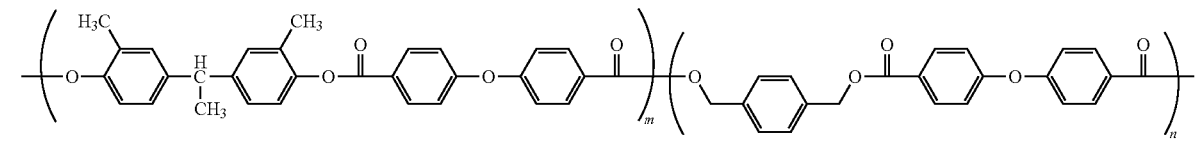

m:n = 81:19

Example 1-10 (Production of Polyester Resin (10))

Sodium hydroxide (1.77 g) was weighed and put into a 500 mL beaker and dissolved in $H_2O$ (188 mL) with stirring.

obtain the intended Polyester Resin (10). The viscosity-average molecular weight (Mv) of the obtained polyester resin was 22,500. The structural formula of Polyester Resin (10) is shown below.

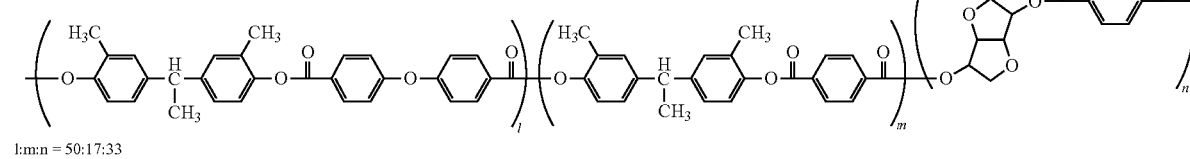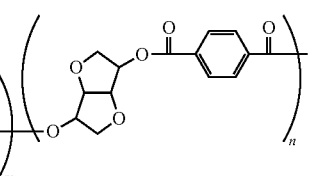

l:m:n = 50:17:33

Example 1-11 (Production of Polyester Resin (11))

Sodium hydroxide (1.45 g) was weighed and put into a 500 mL beaker and dissolved in $H_2O$ (188 mL) with stirring. 2,3,5-Trimethylphenol (0.20 g) and benzyltriethylammonium chloride (0.07 g) were added thereto and dissolved by stirring, and this alkaline aqueous solution was transferred to a 1 L reaction tank.

Separately, a mixed solution of Ester Oligomer (11) (16.42 g) that has been synthesized in Production Example 1-11, diphenyl ether-4,4'-dicarboxylic acid chloride (4.62 g), and dichloromethane (94 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (156 mL) was added and stirring was continuously carried out for 9 hours. Thereafter, the stirring was stopped and the mixture was allowed to stand for 30 minutes, and then the organic layer was separated. This organic layer was washed three times with 0.1 N hydrochloric acid (190 mL), and further washed twice with desalted water (190 mL).

The washed organic layer was diluted with dichloromethane (100 mL) and poured into methanol (1800 mL), and the obtained precipitate was taken out by filtration and dried to obtain the intended Polyester Resin (11). The viscosity-average molecular weight (Mv) of the obtained polyester resin was 40,200. The structural formula of Polyester Resin (11) is shown below.

2,3,5-Trimethylphenol (0.34 g), BP-a (10.15 g) and benzyltriethylammonium chloride (0.11 g) were added thereto and dissolved by stirring, and this alkaline aqueous solution was transferred to a 1 L reaction tank.

Separately, a mixed solution of polycarbonate resin represented by Formula (13) (4.81 g, Mv: 26,000, terminal OH amount: 63.8 μeq/g) that has been produced according to the melt polymerization method described in Production Example 1-1 of JP-A-2012-185206, diphenyl ether-4,4'-dicarboxylic acid chloride (12.86 g), and dichloromethane (117 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (195 mL) was added and stirring was continuously carried out for 9 hours. Thereafter, the stirring was stopped and the mixture was allowed to stand for 30 minutes, and then the organic layer was separated. This organic layer was washed three times with 0.1 N hydrochloric acid (235 mL), and further washed twice with desalted water (235 mL).

The washed organic layer was diluted with dichloromethane (150 mL) and poured into methanol (2300 mL), and the obtained precipitate was taken out by filtration and dried to obtain the intended Polyester-Polycarbonate Resin (12). The viscosity-average molecular weight (Mv) of the obtained polyester resin was 40,100. The structural formula of Polyester Resin (12) is shown below.

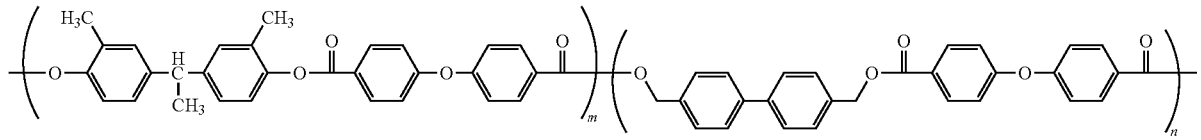

m:n = 67:33

Example 1-12 (Production of Polyester-Polycarbonate Resin (12))

Sodium hydroxide (4.16 g) was weighed and put into a 500 mL beaker and dissolved in $H_2O$ (234 mL) with stirring.

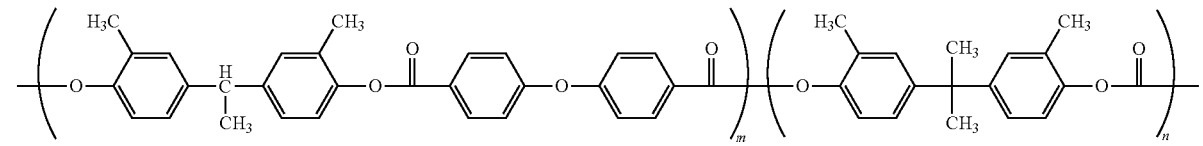

m:n = 73:27

Polyester-Polycarbonate Resin (12)
Polycarbonate Resin (13)

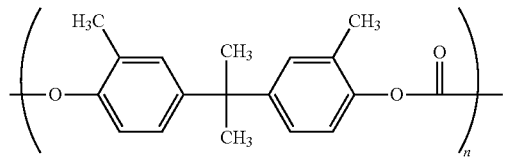

Comparative Example 1-1 (Production of Polyester Resin (3) by Interfacial Polymerization)

Sodium hydroxide (4.23 g) was weighed and put into a 500 mL beaker and dissolved in $H_2O$ (188 mL) with stirring. 2,3,5-Trimethylphenol (0.26 g), BP-a (10.15 g), hydroquinone (0.47 g) and benzyltriethylammonium chloride (0.12 g) were added thereto and dissolved by stirring, and this alkaline aqueous solution was transferred to a 1 L reaction tank.

Separately, a mixed solution of diphenyl ether-4,4'-dicarboxylic acid chloride (13.08 g), and dichloromethane (94 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (156 mL) was added and stirring was continuously carried out for 9 hours. However, during polymerization, hydroquinone was oxidized and turned the aqueous layer into brown causing dihydric phenol for reaction to be insufficient, so that a sufficiently extended polymer could not be obtained.

Comparative Example 1-2 (Production of Polyester Resin (6) by Interfacial Polymerization)

Sodium hydroxide (4.13 g) was weighed and put into a 500 mL beaker and dissolved in $H_2O$ (188 mL) with stirring. 2,3,5-Trimethylphenol (0.26 g), BP-a (9.16 g), 4-hydroxybenzoate 4-hydroxyphenyl (0.97 g), and benzyltriethylammonium chloride (0.12 g) were added thereto and dissolved by stirring, and this alkaline aqueous solution was transferred to a 1 L reaction tank.

Separately, a mixed solution of diphenyl ether-4,4'-dicarboxylic acid chloride (12.75 g), and dichloromethane (94 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (156 mL) was added and stirring was continuously carried out for 9 hours. However, during polymerization, 4-hydroxybenzoate 4-hydroxyphenyl was hydrolyzed and became hydroquinone, and oxidation of the hydroquinone turned the aqueous layer into brown causing dihydric phenol for reaction to be insufficient, so that a sufficiently extended polymer could not be obtained.

Comparative Example 1-3 (Production of Polyester Resin (11) by Interfacial Polymerization)

Sodium hydroxide (4.14 g) was weighed and put into a 500 mL beaker and dissolved in $H_2O$ (188 mL) with stirring. 2,3,5-Trimethylphenol (0.26 g), BP-a (6.93 g), 4,4'-biphenyldimethanol (3.02 g), and benzyltriethylammonium chloride (0.12 g) were added thereto and dissolved by stirring, and this alkaline aqueous solution was transferred to a 1 L reaction tank.

Separately, a mixed solution of diphenyl ether-4,4'-dicarboxylic acid chloride (12.97 g), and dichloromethane (94 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (156 mL) was added and stirring was continuously carried out for 9 hours. However, a sufficiently extended polymer could not be obtained because of the poor reactivity of the hydroxide group of 4,4'-biphenyldimethanol.

<Preparation of Photoreceptor Sheet>

Example 1-13

10 parts by mass of oxytitanium phthalocyanine and 150 parts by mass of 4-methoxy-4-methyl-2-pentanone were mixed with each other, and then, the mixture was milled and dispersed using a sand grinding mill, thus producing a pigment dispersion fluid. Oxytitanium phthalocyanine shows intense diffraction peaks at each Bragg angle (2θ±0.2) of 9.3°, 10.6°, 13.2°, 15.1°, 15.7°, 16.1°, 20.8°, 23.3°, 26.3°, and 27.1° in X-ray diffraction with CuKα radiation.

50 parts by mass of 1,2-dimethoxyethane solution containing 5 mass % of polyvinyl butyral (trade name: Denka Butyral #6000C, manufactured by DENKI KAGAKU KOGYO K.K.), and 50 parts by mass of 1,2-dimethoxyethane solution containing 5 mass % of phenoxy resin (trade name: PKHH, manufactured by Union Carbide Corporation) were mixed with the pigment dispersion fluid. An appropriate amount of 1,2-dimethoxyethane was further added to obtain a coating fluid for forming a charge generation layer having a solid content concentration of 4.0%. This coating fluid for forming a charge generation layer was applied on a polyethylene terephthalate sheet having a surface deposited with aluminum and dried so as to obtain a charge generation layer having an after-drying thickness of 0.4 μm.

Next, 50 parts by mass of a mixture (CTM-1) produced by the method described in Example 1-1 of JP-A-2002-080432, which includes a group of compounds of geometrical isomers whose main component has the following structure and serves as a charge transport substance, 100 parts by mass of Polyester Resin (1) produced in Example 1-1, 8 parts by mass of an antioxidant (Irganox 1076), and 0.05 parts by mass of silicone oil as a leveling agent were mixed with 640 parts by mass of a mixed solvent of tetrahydrofuran and toluene (80 mass % tetrahydrofuran, 20 mass % toluene) to prepare the coating fluid for forming a charge transport layer.

Charge Transport Material (CTM-1)

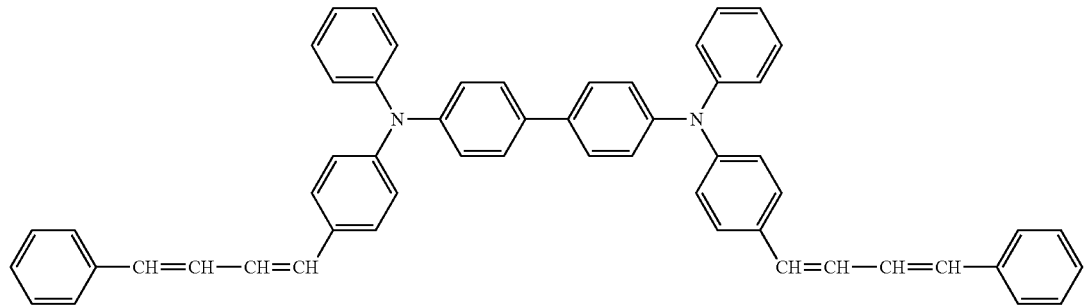 [SMILES: C(C=Cc1ccc(N(c2ccccc2)c2ccc(-c3ccc(N(c4ccccc4)c4ccc(C=CC=Cc5ccccc5)cc4)cc3)cc2)cc1)=Cc1ccccc1]

This coating fluid for forming a charge transport layer was applied on the above-described charge generation layer using an applicator to form a charge transport layer having an after-drying thickness of 25 μm, and dried at 125° C. for 20 minutes so as to prepare a photoreceptor sheet.

Example 1-14

The photoreceptor sheet was prepared in the same manner as in Example 1-1, except that Polyester Resin (1) was replaced with Polyester Resin (2).

Example 1-15

The photoreceptor sheet was prepared in the same manner as in Example 1-1, except that Polyester Resin (1) was replaced with Polyester Resin (3).

Example 1-16

The photoreceptor sheet was prepared in the same manner as in Example 1-1, except that Polyester Resin (1) was replaced with Polyester Resin (4).

Example 1-17

The photoreceptor sheet was prepared in the same manner as in Example 1-1, except that Polyester Resin (1) was replaced with Polyester Resin (5).

Example 1-18

The photoreceptor sheet was prepared in the same manner as in Example 1-1, except that Polyester Resin (1) was replaced with Polyester Resin (6).

Example 1-19

The photoreceptor sheet was prepared in the same manner as in Example 1-1, except that Polyester Resin (1) was replaced with Polyester Resin (7).

Example 1-20

The photoreceptor sheet was prepared in the same manner as in Example 1-1, except that Polyester Resin (1) was replaced with Polyester Resin (8).

Example 1-21

The photoreceptor sheet was prepared in the same manner as in Example 1-1, except that Polyester Resin (1) was replaced with Polyester Resin (9).

Example 1-22

The photoreceptor sheet was prepared in the same manner as in Example 1-1, except that Polyester Resin (1) was replaced with Polyester Resin (10).

Example 1-23

The photoreceptor sheet was prepared in the same manner as in Example 1-1, except that Polyester Resin (1) was replaced with Polyester Resin (11).

Example 1-24

The photoreceptor sheet was prepared in the same manner as in Example 1-1, except that Polyester Resin (1) was replaced with Polyester Resin (12).

Reference Example 1-1

The photoreceptor sheet was prepared in the same manner as in Example 1-1, except that Polyester Resin (1) was replaced with Polyester Resin (14) having the following structure (viscosity-average molecular weight: 36,200) produced by the method described in Example 6 of JP-A-2006-53549.

Polyester Resin (14)

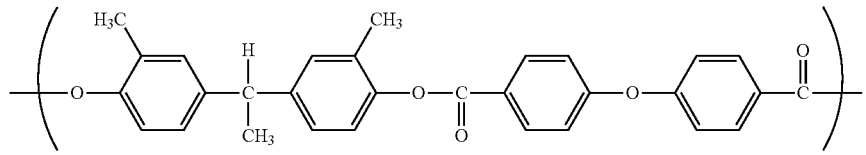

[Evaluation of Electrical Properties]

Using an electrophotographic properties evaluation apparatus (The Imaging Society of Japan (1996), Electrophotography-Bases and Applications II, CORONAPUBLISHING, pp. 404-405), which complies with the measurement standard by the Imaging Society of Japan, electrical properties evaluation test was carried out as follows. Each of the photoreceptors was cylindrically stuck on an aluminum drum. Then, the drum was rotated at a constant revolution rate while conductivity between the aluminum drum and an aluminum substrate of the photoreceptor was attained so as to carry out the evaluation test through the cycles of charging, exposure, potential measurement, and neutralizing. In the evaluation, the initial surface potential was set to −700 V, and a surface potential (VL) at the time of irradiation with exposure light having an intensity of 2.4 µJ/cm$^2$ was measured using beams of monochromatic light having wavelengths of 780 nm and 660 nm as exposure light and neutralizing light respectively. In measuring VL, the time required from exposure to potential measurement was set at 139 ms. The irradiation energy (half-decay irradiation energy µJ/cm$^2$) at the time when the surface potential becomes half of the initial surface potential (−350 V) was measured as a sensitivity ($E_{1/2}$). The smaller the absolute value of VL indicates more excellent electrical properties, and the smaller value of $E_{1/2}$ indicates higher sensitivity of the photoreceptor. The measurement was carried out at the temperature of 25° C. and relative humidity of 50% or below (N/N). The result is shown in Table 1-1.

TABLE 1-1

|  | Polyester Resin No. | Electrical Properties Test (N/N) | |
|---|---|---|---|
|  |  | $E_{1/2}$ (µJ/cm$^2$) | VL (−V) |
| Example 1-13 | 1 | 0.346 | 61 |
| Example 1-14 | 2 | 0.375 | 105 |
| Example 1-15 | 3 | 0.329 | 46 |
| Example 1-16 | 4 | 0.316 | 59 |
| Example 1-17 | 5 | 0.307 | 46 |
| Example 1-18 | 6 | 0.382 | 63 |
| Example 1-19 | 7 | 0.338 | 54 |
| Example 1-20 | 8 | 0.336 | 64 |
| Example 1-21 | 9 | 0.333 | 51 |
| Example 1-22 | 10 | 0.327 | 42 |
| Example 1-23 | 11 | 0.350 | 55 |
| Example 1-24 | 12 | 0.306 | 47 |
| Reference Example 1-1 | 14 | 0.340 | 59 |

[Wear Resistance Test]

Each of the photoreceptor films was cut into spherical pieces with a diameter of 10 cm and the wear resistance thereof was evaluated using Taber abrasion tester (manufactured by Toyo Seiki Co., Ltd.). Under a test condition of 25° C. and 50% RH atmosphere, the wear amount after 1000 turns under 500 g load was measured by comparing the masses of the photoreceptor before and after the test using a wear wheel CS-10F. The result is shown in Table 1-2.

TABLE 1-2

|  | Polyester Resin No. | Wear Resistance Test (−mg) |
|---|---|---|
| Example 1-25 | 6 | 1.14 |
| Reference Example 1-2 | 14 | 1.95 |

Based on the above results, it has become clear that according to the present invention, polyester resins can be produced even with a dihydric phenol, which has problems such as easy oxidization and hydrolyzation thereof, or a dihydric alcohol, which exhibits poor reactivity. It also has become clear that polyester resin having a sufficiently high molecular weight for a photoreceptor can be produced. It further has become clear that polyester-polycarbonate resin can be easily produced. It still further has become clear that the photoreceptor provided using a polyester resin which is produced according to the present invention exhibits excellent electrical properties and an excellent wear resistance.

Test Example 2

[Measurement of Residual Acid Chloride Monomer in Ester Oligomer]
[Production of Ester Oligomer]

Production Example 2-1 (Production of Ester Oligomer (2-1))

1,1-Bis-(4-hydroxy-3-methylphenyl)ethane (8.32 g, hereinafter referred to as BP-1), 2,3,5-trimethylphenol (0.085 g), and diphenyl ether-4,4'-dicarboxylic acid chloride (12.83 g, hereinafter referred to as AC-1) were weighed and put into a 500 mL four-neck reaction vessel purged with nitrogen, and dissolved in dichloromethane (80 mL). Subsequently, a mixed solution of triethylamine (6.92 g, manufactured by Tokyo Chemical Industry Co., Ltd.) and dichloromethane (15 mL) was added dropwise over 20 minutes to the reaction vessel that has been cooled to 5° C. to 15° C., and thereafter stirring was continuously carried out for 10 minutes to generate Ester Oligomer (2-1).

Subsequently, as an internal standard for measuring an acid chloride monomer described below, methyl benzoate (6.41 g) was added to the generated ester oligomer solution.

[Measurement of Residual Acid Chloride Monomer]

Analysis of an acid chloride was carried out by HPLC analysis after stabilizing the acid chloride by amidation. The peaks of the acid chloride monomers listed in the present specification are HPLC peaks of the amidates. The method carrying out the measurement is described below.

To a 100 mL sample bottle containing morpholine (0.3 mL, manufactured by Tokyo Chemical Industry Co., Ltd.)

and acetonitrile (50 mL, HPLC grade, manufactured by JUNSEI CHEMICAL CO., LTD.), the solution of Ester Oligomer (2-1) weighed 1.25 g was put and mixed. After acid chloride moieties had been amidized by allowing the mixed solution to stand for 30 minutes, 1 mL of the solution was weighed and mixed with 9 mL of mobile phase used for HPLC analysis that is described below. The solid content was removed by subjecting the mixed solution to filtration using GL chromatography disk 13 P (pore size 0.45 μm, manufactured by GL Sciences Inc.) to prepare a sample solution.

Subsequently, HPLC analysis was carried out using the sample solution under the following condition. The area ratio between the peak of the acid chloride monomer and the peak of the methyl benzoate was calculated and the amount of the acid chloride monomer was determined from the calibration curve drawn based on the result. The amount of residual acid chloride monomer contained in Ester Oligomer (2-1) is listed in Table 2-1 shown below.

(HPLC Measurement Condition)

Column: Inertsil ODS-3 5 μm 4.6 mm×150 mm (manufactured by GL Sciences Inc.)

Column temperature: 40° C.

Mobile phase: methanol:pure water:acetic acid=60:40: 0.05 (vol %)

Flow rate: 1.0 mL/min

Measurement time: 20 min

Detection wavelength: 254 nm

Sample solution injection amount: 10 μl (Drawing of Calibration Curve)

The calibration curve of the area ratio between the peak of the acid chloride monomer and the peak of the methyl benzoate was drawn by amidizing acid chloride moieties and carrying out HPLC analysis in the same manner as described in Measurement of Residual Acid Chloride Monomer, except that the sample was replaced with samples, instead of the solution of Ester Oligomer (2-1), each having ratios of 100:50, 50:50, 20:50, 10:50, 5:50, 3:50, 1:50, 0.5:50, and 0.1:50 (mg) between the acid chloride monomer and the benzoate of samples.

Production Example 2-2 (Production of Ester Oligomer (2-2))

BP-1 (7.27 g), 2,3,5-trimethylphenol (0.090 g), and AC-1 (12.88 g) were weighed and put into a 500 mL four-neck reaction vessel purged with nitrogen, and dissolved in dichloromethane (80 mL). Subsequently, a mixed solution of triethylamine (6.12 g) and dichloromethane (15 mL) was added dropwise over 20 minutes to the reaction vessel that has been cooled to 5° C. to 15° C., and thereafter stirring was continuously carried out for 10 minutes to generate Ester Oligomer (2-2). Subsequently, methyl benzoate (6.44 g) was added to the generated ester oligomer solution.

The amount of residual acid chloride monomer included in Ester Oligomer (2-2) was measured in the same manner as in Production Example 2-1. The result is shown in Table 2-1.

Production Example 2-3 (Production Ester Oligomer (2-3))

BP-1 (6.27 g), 2,3,5-trimethylphenol (0.090 g), and AC-1 (12.88 g) were weighed and put into a 500 mL four-neck reaction vessel purged with nitrogen, and dissolved in dichloromethane (80 mL). Subsequently, a mixed solution of triethylamine (5.26 g) and dichloromethane (15 mL) was added dropwise over 20 minutes to the reaction vessel that has been cooled to 5° C. to 15° C., and thereafter stirring was continuously carried out for 10 minutes to generate Ester Oligomer (2-3). Subsequently, methyl benzoate (6.44 g) was added to the generated ester oligomer solution.

The amount of residual acid chloride monomer included in Ester Oligomer (2-3) was measured in the same manner as in Production Example 2-1. The result is shown in Table 2-1.

Production Example 2-4 (Production of Ester Oligomer (2-4))

BP-1 (8.32 g), 2,3,5-trimethylphenol (0.085 g), and AC-1 (12.83 g) were weighed and put into a 500 mL four-neck reaction vessel purged with nitrogen, and dissolved in dichloromethane (80 mL). Subsequently, a mixed solution of triethylamine (4.35 g) and dichloromethane (15 mL) was added dropwise over 20 minutes to the reaction vessel that has been cooled to 5° C. to 15° C., and thereafter stirring was continuously carried out for 10 minutes to generate Ester Oligomer (2-4). Subsequently, methyl benzoate (6.41 g) was added to the generated ester oligomer solution.

The amount of residual acid chloride monomer included in Ester Oligomer (2-4) was measured in the same manner as in Production Example 2-1. The result is shown in Table 2-1.

Production Example 2-5 (Production of Ester Oligomer (2-5))

BP-1 (5.21 g), 2,3,5-trimethylphenol (0.090 g), and AC-1 (12.93 g) were weighed and put into a 500 mL four-neck reaction vessel purged with nitrogen, and dissolved in dichloromethane (80 mL). Subsequently, a mixed solution of triethylamine (4.61 g) and dichloromethane (15 mL) was added dropwise over 20 minutes to the reaction vessel that has been cooled to 5° C. to 15° C., and thereafter stirring was continuously carried out for 10 minutes to generate Ester Oligomer (2-5). Subsequently, methyl benzoate (6.47 g) was added to the generated ester oligomer solution.

The amount of residual acid chloride monomer included in Ester Oligomer (2-5) was measured in the same manner as in Production Example 2-1. The result is shown in Table 2-1.

TABLE 2-1

|  | | Feeds for Oligomer (molar ratio) | | | Residual Dicarboxylic Acid Monomer/Feed Dicarboxylic Acid |
| --- | --- | --- | --- | --- | --- |
|  | Ester Oligomer No. | Dicarboxylic Acid Chloride | Bisphenol | Triethylamine |  |
| Production Example 2-1 | 2-1 | 100 | 80 | 160 | 0.025 |
| Production Example 2-2 | 2-2 | 100 | 70 | 140 | 0.084 |
| Production Example 2-3 | 2-3 | 100 | 60 | 120 | 0.153 |
| Production Example 2-4 | 2-4 | 100 | 80 | 100 | 0.307 |
| Production Example 2-5 | 2-5 | 100 | 50 | 105 | 0.249 |

[Production of Polyester Resin]

Example 2-1 (Synthesis of Polyester Resin (1-1) 1: With Formulation of Ester Oligomer (2-1))

After producing ester oligomer with the same formulation as described in Production Example 2-1, production of Polyester Resin (1-1) was carried out in the same reaction vessel. The production method is as follows.

BP-1 (14.57 g), 2,3,5-trimethylphenol (0.102 g), and AC-1 (22.44 g) were weighed and put into a 1000 mL four-neck reaction vessel purged with nitrogen, and dissolved in dichloromethane (140 mL). Subsequently, a mixed solution of triethylamine (12.17 g) and dichloromethane (35 mL) was added dropwise over 20 minutes to the reaction vessel that has been cooled to 5° C. to 15° C., and thereafter stirring was continuously carried out for 10 minutes to generate ester oligomer.

Subsequently, 4-hydroxybenzoate 4-hydroxyphenyl (3.46 g, hereinafter referred to as BP-2) was added into the reaction vessel. Thereafter, a mixed solution of triethylamine (3.22 g) and dichloromethane (35 mL) was added dropwise to the reaction vessel that has been cooled to 5° C. to 15° C. over 20 minutes. While maintaining the temperature inside the reaction system at 15° C. to 23° C., stirring was continuously carried out for 0.5 hours, the mixed solution was diluted with dichloromethane (230 mL), and stirring was further carried out for 0.5 hours. Subsequently, the solution was further diluted with dichloromethane (230 mL), and stirring was carried out for 4 hours. Thereafter, the solution was washed with desalted water (490 mL), and then washed three times with 0.2 N hydrochloric acid (490 mL), and further washed twice with desalted water (490 mL).

The washed organic layer was diluted with dichloromethane (300 mL) and poured into methanol (4000 mL), and the obtained precipitate was taken out by filtration and dried to obtain the Polyester Resin (1-1). The viscosity-average molecular weight (Mv) of the obtained polyester resin was 61,000. The structural formula of Polyester Resin (1-1) group is shown below.

Polyester Resin (1-1)

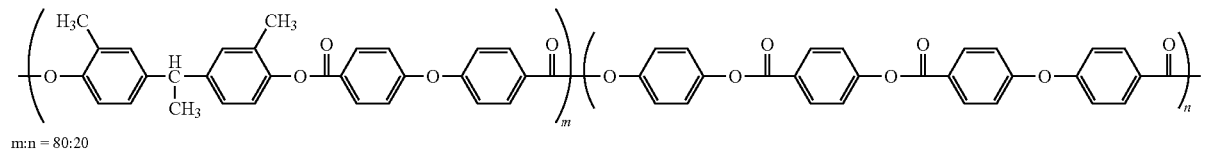

m:n = 80:20

[Measurement of Viscosity-Average Molecular Weight (Mv)]

The polyester resin was dissolved in dichloromethane to prepare a solution having a concentration C of 6.00 g/L. Using an Ubbelohde capillary viscometer having a solvent (dichloromethane) flow time $t_0$ of 136.16 seconds, the sample solution was examined for flow time t in a thermostatic water bath set at 20.0° C. The viscosity-average molecular weight (Mv) was calculated according to the following equations.

$$a=0.438\times\eta_{sp}+1 \quad \eta_{sp}=t/t_0-1$$

$$b=100\times\eta_{sp}/C \quad C=6.00 \text{ (g/L)}$$

$$\eta=b/a$$

$$Mv=3207\times\eta^{1.205}$$

Comparative Example 2-1 (Synthesis of Polyester Resin (1-2) 2: Without Forming Ester Oligomer as Intermediate)

BP-1 (8.33 g), BP-2 (1.98 g), 2,3,5-trimethylphenol (0.059 g), and AC-1 (12.83 g) were weighed and put into a 500 mL four-neck reaction vessel purged with nitrogen, and dissolved in dichloromethane (100 mL). Subsequently, a mixed solution of triethylamine (9.37 g) and dichloromethane (35 mL) was added dropwise over 40 minutes to the reaction vessel that has been cooled to 5° C. to 15° C. While maintaining the temperature inside the reaction system at 15° C. to 23° C., stirring was continuously carried out for 0.1 hours, and the mixed solution was diluted with dichloromethane (120 mL), and stirring was carried out for 0.5 hours. Subsequently, the solution was further diluted with dichloromethane (120 mL), and stirring was carried out for 4 hours. Thereafter, the solution was washed with desalted water (280 mL), and then washed three times with 0.2 N hydrochloric acid (280 mL), and further washed twice with desalted water (280 mL). The washed organic layer was diluted with dichloromethane (100 mL) and poured into methanol (2000 mL), and the obtained precipitate was taken out by filtration and dried to obtain the Polyester Resin (1-2). The viscosity-average molecular weight (Mv) of the obtained polyester resin was 36,800.

Comparative Example 2-2 (Synthesis of Polyester Resin (1-3) 3: With Formulation of Ester Oligomer (2-4))

After producing ester oligomer with the same formulation as described in Production Example 2-4, production of Polyester Resin (1-3) was carried out in the same reaction vessel. The production method is as follows.

BP-1 (8.33 g), 2,3,5-trimethylphenol (0.059 g), and AC-1 (12.83 g) were weighed and put into a 500 mL four-neck reaction vessel purged with nitrogen, and dissolved in dichloromethane (80 mL). Subsequently, a mixed solution of triethylamine (4.35 g) and dichloromethane (20 mL) was added dropwise over 20 minutes to the reaction vessel that has been cooled to 5° C. to 15° C., and thereafter stirring was continuously carried out for 10 minutes to generate ester oligomer.

Subsequently, and BP-2 (1.98 g) were added into the reaction vessel. Thereafter, a mixed solution of triethylamine (5.03 g) and dichloromethane (35 mL) was added dropwise to the reaction vessel that has been cooled to 5° C. to 15° C. over 20 minutes. While maintaining the temperature inside the reaction system at 15° C. to 23° C., stirring was continuously carried out for 0.2 hours, the mixed solution was diluted with dichloromethane (120 mL), and stirring was further carried out for 0.5 hours. Subsequently, the solution was further diluted with dichloromethane (120 mL), and stirring was carried out for 4 hours. Thereafter, the solution was washed with desalted water (280 mL), and then washed three times with 0.2 N hydrochloric acid (280 mL), and further washed twice with desalted water (280 mL)

The washed organic layer was diluted with dichloromethane (100 mL) and poured into methanol (2000 mL), and the obtained precipitate was taken out by filtration and dried to obtain Polyester Resin (1-3). The viscosity-average molecular weight (Mv) of the obtained polyester resin was 45,000.

Comparative Example 2-3 (Synthesis of Polyester Resin (1-4) 4: With Formulation of Ester Oligomer (2-5))

After producing ester oligomer with the same formulation as described in Production Example 2-5, production of Polyester Resin (1-4) was carried out in the same reaction vessel. The production method is as follows.

BP-1 (5.21 g), 2,3,5-trimethylphenol (0.059 g), and AC-1 (12.83 g) were weighed and put into a 500 mL four-neck reaction vessel purged with nitrogen, and dissolved in dichloromethane (80 mL). Subsequently, a mixed solution of triethylamine (4.46 g) and dichloromethane (20 mL) was added dropwise over 20 minutes to the reaction vessel that has been cooled to 5° C. to 15° C., and thereafter stirring was continuously carried out for 10 minutes to generate ester oligomer.

Subsequently, BP-1 (3.12 g) and BP-2 (1.98 g) were added into the reaction vessel. Thereafter, a mixed solution of triethylamine (4.92 g) and dichloromethane (35 mL) was added dropwise to the reaction vessel that has been cooled to 5° C. to 15° C. over 20 minutes. While maintaining the temperature inside the reaction system at 15° C. to 23° C., stirring was continuously carried out for 0.2 hours, the mixed solution was diluted with dichloromethane (120 mL), and stirring was further carried out for 0.5 hours. Subsequently, the solution was further diluted with dichloromethane (120 mL), and stirring was carried out for 4 hours. Thereafter, the solution was washed with desalted water (280 mL), and then washed three times with 0.2 N hydrochloric acid (280 mL), and further washed twice with desalted water (280 mL).

The washed organic layer was diluted with dichloromethane (100 mL) and poured into methanol (2000 mL), and the obtained precipitate was taken out by filtration and dried to obtain Polyester Resin (1-4). The viscosity-average molecular weight (Mv) of the obtained polyester resin was 46,500.

Example 2-2 (Synthesis of Polyester Resin (2-1): With Formulation of Ester Oligomer (2-2))

After producing ester oligomer with the same formulation as described in Production Example 2-2, production of Polyester Resin (2-1) was carried out in the same reaction vessel. The production method is as follows.

BP-1 (7.92 g), 2,3,5-trimethylphenol (0.064 g), and AC-1 (13.86 g) were weighed and put into a 500 mL four-neck reaction vessel purged with nitrogen, and dissolved in dichloromethane (80 mL). Subsequently, a mixed solution of triethylamine (6.64 g) and dichloromethane (20 mL) was added dropwise over 20 minutes to the reaction vessel that has been cooled to 5° C. to 15° C., and thereafter stirring was continuously carried out for 10 minutes to generate ester oligomer.

Subsequently, BP-2 (2.96 g) was added into the reaction vessel. Thereafter, a mixed solution of triethylamine (3.20 g) and dichloromethane (30 mL) was added dropwise to the reaction vessel that has been cooled to 5° C. to 15° C. over 20 minutes. While maintaining the temperature inside the reaction system at 15° C. to 23° C., stirring was continuously carried out for 0.5 hours, the mixed solution was diluted with dichloromethane (120 mL), and stirring was further carried out for 0.5 hours. subsequently, the solution was further diluted with dichloromethane (120 mL), and stirring was carried out for 4 hours. Thereafter, the solution was washed with desalted water (280 mL), and then washed three times with 0.2 N hydrochloric acid (280 mL), and further washed twice with desalted water (280 mL).

The washed organic layer was diluted with dichloromethane (150 mL) and poured into methanol (2000 mL), and the obtained precipitate was taken out by filtration and dried to obtain the intended Polyester Resin (2-1). The viscosity-average molecular weight (Mv) of the obtained polyester resin was 75,000. The structural formula of Polyester Resin (2-1) group is shown below.

Polyester Resin (2-1)

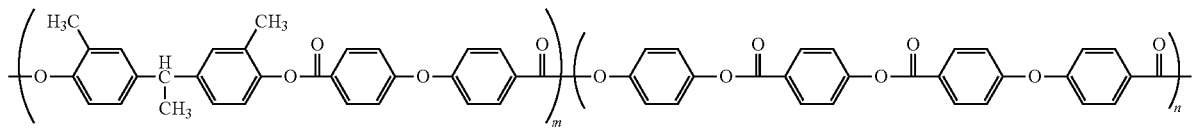

m:n = 70:30

Example 2-3 (Synthesis of Polyester Resin (3-1) 1: With Formulation of Ester Oligomer (2-2))

After producing ester oligomer with the same formulation as described in Production Example 2-2, production of Polyester Resin (3-1) was carried out in the same reaction vessel. The production method is as follows.

BP-1 (13.89 g), 2,3,5-trimethylphenol (0.067 g), and AC-1 (24.33 g) were weighed and put into a 1000 mL four-neck reaction vessel purged with nitrogen, and dissolved in dichloromethane (120 mL). Subsequently, a mixed solution of triethylamine (11.60 g) and dichloromethane (30 mL) was added dropwise over 20 minutes to the reaction vessel that has been cooled to 5° C. to 15° C., and thereafter stirring was continuously carried out for 10 minutes to generate ester oligomer.

Subsequently, hydroquinone (2.71 g, hereinafter referred to as BP-3) was added into the reaction vessel. Thereafter, a mixed solution of triethylamine (6.13 g) and dichloromethane (50 mL) was added dropwise to the reaction vessel that has been cooled to 5° C. to 15° C. over 20 minutes. While maintaining the temperature inside the reaction system at 15° C. to 23° C., stirring was continuously carried out for 0.5 hours, the mixed solution was diluted with dichloromethane (230 mL), and stirring was further carried out for 0.5 hours. Subsequently, the solution was further diluted with dichloromethane (230 mL), and stirring was carried out for 4 hours. Thereafter, the solution was washed with desalted water (490 mL), and then washed three times with 0.2 N hydrochloric acid (490 mL), and further washed twice with desalted water (490 mL).

The washed organic layer was diluted with dichloromethane (300 mL) and poured into methanol (4000 mL), and the obtained precipitate was taken out by filtration and dried to obtain the intended Polyester Resin (3-1). The viscosity-average molecular weight (Mv) of the obtained polyester resin was 55,000. The structural formula of Polyester Resin (3-1) group is shown below.

Polyester Resin (3-1)

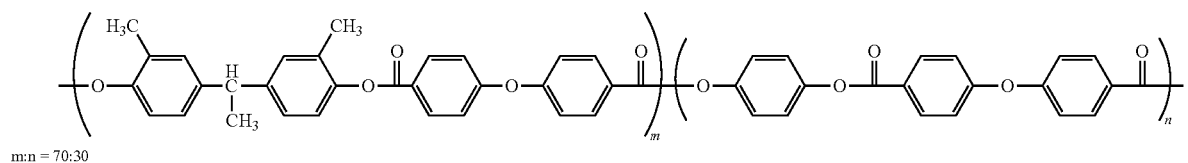

m:n = 70:30

Comparative Example 2-4 (Synthesis of Polyester Resin (3-2) 2: Without Forming Ester Oligomer as Intermediate)

BP-1 (6.95 g), BP-3 (1.35 g), 2,3,5-trimethylphenol (0.034 g), and AC-1 (12.17 g) were weighed and put into a 500 mL four-neck reaction vessel purged with nitrogen, and dissolved in dichloromethane (100 mL). Subsequently, a mixed solution of triethylamine (8.87 g) and dichloromethane (35 mL) was added dropwise over 40 minutes to the reaction vessel that has been cooled to 5° C. to 15° C. While maintaining the temperature inside the reaction system at 15° C. to 23° C., stirring was continuously carried out for 0.1 hours, and the mixed solution was diluted with dichloromethane (120 mL), and stirring was carried out for 0.5 hours. Subsequently, the solution was further diluted with dichloromethane (120 mL), and stirring was carried out for 4 hours. Thereafter, the solution was washed with desalted water (280 mL), and then washed three times with 0.2 N hydrochloric acid (280 mL), and further washed twice with desalted water (280 mL). The washed organic layer was diluted with dichloromethane (150 mL) and poured into methanol (2000 mL), and the obtained precipitate was taken out by filtration and dried to obtain the Polyester Resin (3-2). The viscosity-average molecular weight (Mv) of the obtained polyester resin was 39,000.

Example 2-4 (Synthesis of Polyester Resin (4-1): With Formulation of Ester Oligomer (2-3))

After producing ester oligomer with the same formulation as described in Production Example 2-3, production of Polyester Resin (4-1) was carried out in the same reaction vessel. The production method is as follows.

BP-1 (7.00 g), 2,3,5-trimethylphenol (0.065 g), and AC-1 (14.34 g) were weighed and put into a 500 mL four-neck reaction vessel purged with nitrogen, and dissolved in dichloromethane (80 mL). Subsequently, a mixed solution of triethylamine (5.87 g) and dichloromethane (20 mL) was added dropwise over 20 minutes to the reaction vessel that has been cooled to 5° C. to 15° C., and thereafter stirring was continuously carried out for 10 minutes to generate ester oligomer.

Subsequently, BP-3 (2.12 g) was added into the reaction vessel. Thereafter, a mixed solution of triethylamine (4.56 g) and dichloromethane (30 mL) was added dropwise to the reaction vessel that has been cooled to 5° C. to 15° C. over 20 minutes. While maintaining the temperature inside the reaction system at 15° C. to 23° C., stirring was continuously carried out for 0.5 hours, the mixed solution was diluted with dichloromethane (120 mL), and stirring was further carried out for 0.5 hours. Subsequently, the solution was further diluted with dichloromethane (120 mL), and stirring was carried out for 4 hours. Thereafter, the solution was washed with desalted water (280 mL), and then washed three times with 0.2 N hydrochloric acid (280 mL), and further washed twice with desalted water (280 mL).

The washed organic layer was diluted with dichloromethane (150 mL) and poured into methanol (2000 mL), and the obtained precipitate was taken out by filtration and dried to obtain the intended Polyester Resin (4-1). The viscosity-average molecular weight (Mv) of the obtained polyester resin was 57,500. The structural formula of Polyester Resin (4-1) group is shown below.

Polyester Resin (4-1)

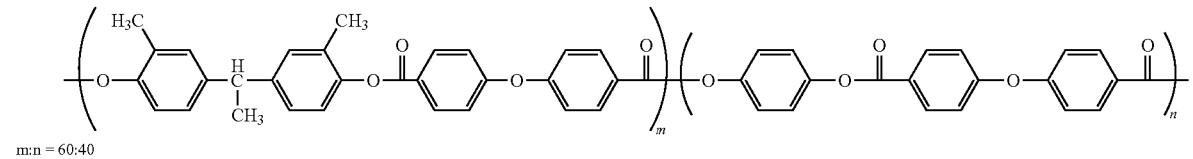

m:n = 60:40

Example 2-5 (Synthesis of Polyester Resin (5-1) 1: With Formulation of Ester Oligomer (2-1))

After producing ester oligomer with the same formulation as described in Production Example 2-1, production of Polyester Resin (5-1) was carried out in the same reaction vessel. The production method is as follows.

BP-1 (8.44 g), 2,3,5-trimethylphenol (0.119 g), and AC-1 (13.02 g) were weighed and put into a 500 mL four-neck reaction vessel purged with nitrogen, and dissolved in dichloromethane (80 mL). Subsequently, a mixed solution of triethylamine (7.07 g) and dichloromethane (20 mL) was added dropwise over 20 minutes to the reaction vessel that has been cooled to 5° C. to 15° C., and thereafter stirring was continuously carried out for 10 minutes to generate ester oligomer.

Subsequently, 4,4'-biphenol (1.62 g, hereinafter referred to as BP-4) was added into the reaction vessel. Thereafter, a mixed solution of triethylamine (2.42 g) and dichloromethane (30 mL) was added dropwise to the reaction vessel that has been cooled to 5° C. to 15° C. over 20 minutes. While maintaining the temperature inside the reaction system at 15° C. to 23° C., stirring was continuously carried out for 0.5 hours, the mixed solution was diluted with dichloromethane (90 mL), and stirring was further carried out for 0.5 hours. Subsequently, the solution was further diluted with dichloromethane (80 mL), and stirring was carried out for 4 hours. Thereafter, the solution was washed with desalted water (230 mL), and then washed three times with 0.2 N hydrochloric acid (230 mL), and further washed twice with desalted water (230 mL).

The washed organic layer was diluted with dichloromethane (150 mL) and poured into methanol (2000 mL), and the obtained precipitate was taken out by filtration and dried to obtain the intended Polyester Resin (5-1). The viscosity-average molecular weight (Mv) of the obtained polyester resin was 38,200. The structural formula of Polyester Resin (5-1) is shown below.

Polyester Resin (5-1)

chloric acid (230 mL), and further washed twice with desalted water (230 mL). The washed organic layer was diluted with dichloromethane (150 mL) and poured into methanol (2000 mL), and the obtained precipitate was taken out by filtration and dried to obtain the intended Polyester Resin (5-2). The viscosity-average molecular weight (Mv) of the obtained polyester resin was 25,000.

Example 2-6 (Synthesis of Polyester Resin (6-1): With Formulation of Ester Oligomer (2-3))

After producing ester oligomer with the same formulation as described in Production Example 2-3, production of Polyester Resin (6-1) was carried out in the same reaction vessel. The production method is as follows.

BP-1 (6.36 g), 2,3,5-trimethylphenol (0.060 g), and AC-1 (13.07 g) were weighed and put into a 500 mL four-neck reaction vessel purged with nitrogen, and dissolved in dichloromethane (80 mL). Subsequently, a mixed solution of triethylamine (5.42 g) and dichloromethane (20 mL) was added dropwise over 20 minutes to the reaction vessel that has been cooled to 5° C. to 15° C., and thereafter stirring was continuously carried out for 10 minutes to generate ester oligomer.

Subsequently, 4,4'-dihydroxy-3,3'-dimethylbiphenyl (3.75 g, hereinafter referred to as BP-5) was added into the reaction vessel. Thereafter, a mixed solution of triethylamine

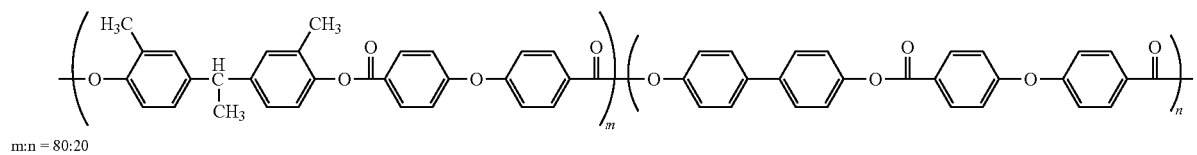

m:n = 80:20

Comparative Example 2-5 (Synthesis of Polyester Resin (5-2) 2: Without Forming Ester Oligomer as Intermediate)

BP-1 (8.44 g), BP-4 (1.62 g), 2,3,5-trimethylphenol (0.119 g), and AC-1 (13.02 g) were weighed and put into a 500 mL four-neck reaction vessel purged with nitrogen, and dissolved in dichloromethane (100 mL). Subsequently, a mixed solution of triethylamine (9.49 g) and dichloromethane (35 mL) was added dropwise over 40 minutes to the reaction vessel that has been cooled to 5° C. to 15° C. While maintaining the temperature inside the reaction system at 15° C. to 23° C., stirring was continuously carried out for 0.1 hours, the mixed solution was diluted with dichloromethane (85 mL), and stirring was further carried out for 0.5 hours. Subsequently, the solution was further diluted with dichloromethane (80 mL), and stirring was carried out for 4 hours. Thereafter, the solution was washed with desalted water (230 mL), and then washed three times with 0.2 N hydro- (4.16 g) and dichloromethane (50 mL) was added dropwise to the reaction vessel that has been cooled to 5° C. to 15° C. over 20 minutes. While maintaining the temperature inside the reaction system at 15° C. to 23° C., stirring was continuously carried out for 0.5 hours, the mixed solution was diluted with dichloromethane (75 mL), and stirring was further carried out for 0.5 hours. Subsequently, the solution was further diluted with dichloromethane (75 mL), and stirring was carried out for 4 hours. Thereafter, the solution was washed with desalted water (230 mL), and then washed three times with 0.2 N hydrochloric acid (230 mL), and further washed twice with desalted water (230 mL).

The washed organic layer was diluted with dichloromethane (150 mL) and poured into methanol (2000 mL), and the obtained precipitate was taken out by filtration and dried to obtain the intended Polyester Resin (6-1). The viscosity-average molecular weight (Mv) of the obtained polyester resin was 55,200. The structural formula of Polyester Resin (6-1) is shown below.

Polyester Resin (6-1)

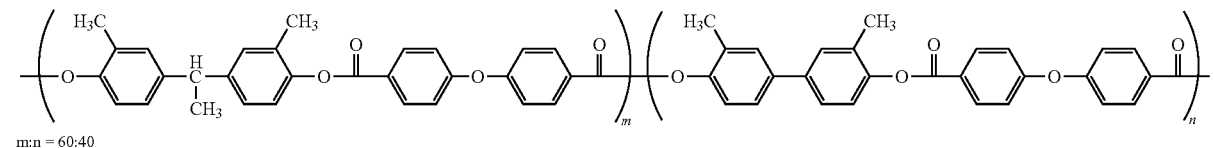

m:n = 60:40

Example 2-7 (Synthesis of Polyester Resin (7-1))

After producing ester oligomer with the same formulation as described in Production Example 2-2, production of Polyester Resin (7-1) was carried out in the same reaction vessel. The production method is as follows.

BP-1 (7.63 g), 2,3,5-trimethylphenol (0.092 g), and AC-1 (13.42 g) were weighed and put into a 500 mL four-neck reaction vessel purged with nitrogen, and dissolved in dichloromethane (80 mL). Subsequently, a mixed solution of triethylamine (6.42 g) and dichloromethane (20 mL) was added dropwise over 20 minutes to the reaction vessel that has been cooled to 5° C. to 15° C., and thereafter stirring was continuously carried out for 10 minutes to generate ester oligomer.

Subsequently, 2,6-dihydroxynaphthalene (2.16 g, hereinafter referred to as BP-6) was added into the reaction vessel. Thereafter, a mixed solution of triethylamine (3.41 g) and dichloromethane (30 mL) was added dropwise to the reaction vessel that has been cooled to 5° C. to 15° C. over 20 minutes. While maintaining the temperature inside the reaction system at 15° C. to 23° C., stirring was continuously carried out for 0.5 hours, the mixed solution was diluted with dichloromethane (90 mL), and stirring was further carried out for 0.5 hours. Subsequently, the solution was further diluted with dichloromethane (80 mL), and stirring was carried out for 4 hours. Thereafter, the solution was washed with desalted water (200 mL), and then washed three times with 0.2 N hydrochloric acid (200 mL), and further washed twice with desalted water (200 mL).

The washed organic layer was diluted with dichloromethane (150 mL) and poured into methanol (2000 mL), and the obtained precipitate was taken out by filtration and dried to obtain the intended Polyester Resin (7-1). The viscosity-average molecular weight (Mv) of the obtained polyester resin was 40,700. The structural formula of Polyester Resin (7-1) group is shown below.

Polyester Resin (7-1)

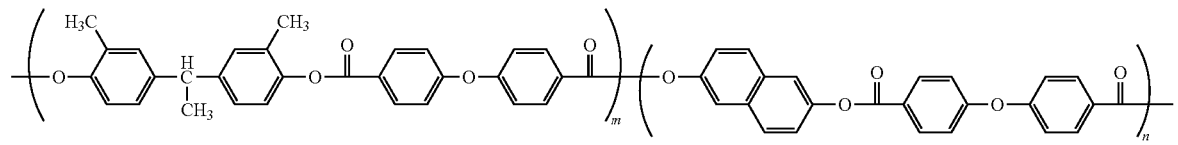

m:n = 70:30

Example 2-8 (Synthesis of Polyester Resin (8-1))

The Polyester Resin (8-1) was obtained in the same manner as in Example 2-7, except that 2,6-dihydroxynaphthalene in Example 2-7 was replaced with 2,7-dihydroxynaphthalene (hereinafter, referred to as BP-7). The viscosity-average molecular weight (Mv) of the obtained polyester resin was 35,500. The structural formula of Polyester Resin (8-1) is shown below.

Polyester Resin (8-1)

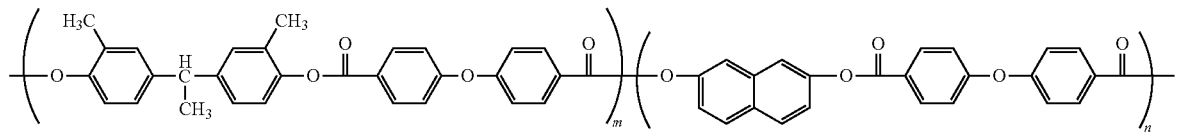

m:n = 70:30

Example 2-9 (Synthesis of Polyester Resin (9-1))

After producing ester oligomer with the same formulation as described in Production Example 2-1, production of Polyester Resin (9-1) was carried out in the same reaction vessel. The production method is as follows.

Bis(4-hydroxy-3-methylphenyl)methane (9.03 g, hereinafter referred to as BP-8), 2,3,5-trimethylphenol (0.060 g), and AC-1 (13.13 g) were weighed and put into a 500 mL four-neck reaction vessel purged with nitrogen, and dissolved in dichloromethane (75 mL). Subsequently, a mixed solution of triethylamine (7.20 g) and dichloromethane (20 mL) was added dropwise over 20 minutes to the reaction vessel that has been cooled to 5° C. to 15° C., and thereafter stirring was continuously carried out for 10 minutes to generate ester oligomer.

Subsequently, BP-1 (1.01 g) was added to the reaction vessel. Thereafter, a mixed solution of triethylamine (2.41 g) and dichloromethane (80 mL) was added dropwise to the reaction vessel that has been cooled to 5° C. to 15° C. over 20 minutes. While maintaining the temperature inside the reaction system at 15° C. to 23° C., stirring was continuously carried out for 0.2 hours, the mixed solution was diluted with dichloromethane (50 mL), and stirring was further carried out for 0.5 hours. Subsequently, the solution was further diluted with dichloromethane (70 mL), and stirring was carried out for 4 hours. Thereafter, the solution was washed with desalted water (210 mL), and then washed three times with 0.2 N hydrochloric acid (210 mL), and further washed twice with desalted water (210 mL).

The washed organic layer was diluted with dichloromethane (150 mL) and poured into methanol (2000 mL), and the obtained precipitate was taken out by filtration and dried to obtain the intended Polyester Resin (9-1). The viscosity-average molecular weight (Mv) of the obtained polyester resin was 60,100. The structural formula of Polyester Resin (9-1) is shown below.

Polyester Resin (9-1)

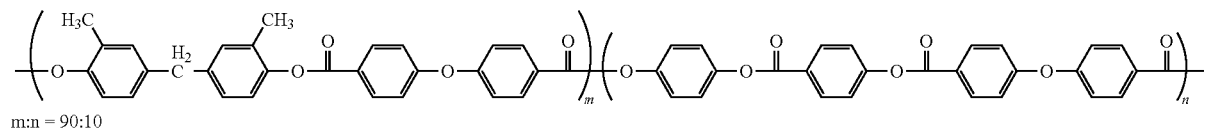

m:n = 90:10

Example 2-10 (Synthesis of Polyester Resin (10-1))

The Polyester Resin (10-1) was obtained in the same manner as in Example 2-10, except that bis(4-hydroxy-3-methylphenyl)methane in Example 2-10 was replaced with 1,1-bis(4-hydroxyphenyl)ethane (hereinafter, referred to as BP-9). The viscosity-average molecular weight (Mv) of the obtained polyester resin was 56,200. The structural formula of Polyester Resin (10-1) is shown below.

Polyester Resin (10-1)

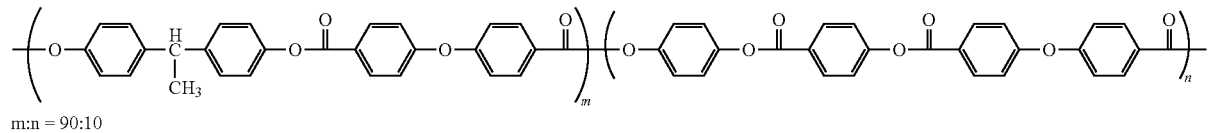

m:n = 90:10

<Appearance of THF Solution of Polyester>

100 parts by mass of each of the polyester resins produced in Examples 2-1 to 2-10 and Comparative Examples 2-1 to 2-5 was placed in a transparent sample bottle and then dissolved in 660 parts by mass of a tetrahydrofuran solvent to visually evaluate the appearance of the solution. When the solution was transparent, the solution was rated as "O". When the solution was cloudy, the solution was rated as "X". The result is shown in Table 2-2.

TABLE 2-2

| | Polyester Resin No. | Production Formulation of Ester Oligomer | Proportion of Residual Chloride Monomer | Appearance of Tetra-hydrofuran Solution |
|---|---|---|---|---|
| Example 2-1 | 1-1 | Production Example 2-1 | 0.025 | O |
| Example 2-2 | 2-1 | Production Example 2-2 | 0.084 | O |
| Example 2-3 | 3-1 | Production Example 2-2 | 0.084 | O |
| Example 2-4 | 4-1 | Production Example 2-3 | 0.153 | O |
| Example 2-5 | 5-1 | Production Example 2-1 | 0.025 | O |
| Example 2-6 | 6-1 | Production Example 2-3 | 0.153 | O |
| Example 2-7 | 7-1 | Production Example 2-2 | 0.084 | O |
| Example 2-8 | 8-1 | Production Example 2-2 | 0.084 | O |
| Example 2-9 | 9-1 | Production Example 2-1 | 0.025 | O |
| Example 2-10 | 10-1 | Production Example 2-1 | 0.025 | O |
| Comparative Example 2-1 | 1-2 | — | No Oligomer | X |
| Comparative Example 2-2 | 1-3 | Production Example 2-4 | 0.307 | X |
| Comparative Example 2-3 | 1-4 | Production Example 2-5 | 0.249 | X |

TABLE 2-2-continued

| | Polyester Resin No. | Production Formulation of Ester Oligomer | Proportion of Residual Chloride Monomer | Appearance of Tetra-hydrofuran Solution |
|---|---|---|---|---|
| Comparative Example 2-4 | 3-2 | — | No Oligomer | X |

TABLE 2-2-continued

| Polyester Resin No. | Production Formulation of Ester Oligomer | Proportion of Residual Chloride Monomer | Appearance of Tetrahydrofuran Solution |
|---|---|---|---|
| Comparative Example 2-5 | 5-2 | — | No Oligomer | X |

* Comparative Example 2-2 and Comparative Example 2-3 are Comparative Examples corresponding to claim 4.

From the result of Table 2-2, it has become clear that a polyester resin having an excellent solubility can be obtained by forming an ester oligomer as an intermediate and setting the residual amount of an acid chloride monomer in the ester oligomer within the range of the present invention. On the contrary, in a case where an ester oligomer is not formed as an intermediate, or in a case where the residual amount of an acid chloride monomer in the ester oligomer is higher than the range of the present invention, an insoluble oligomer is formed so that the solution becomes cloudy.

<Preparation of Photoreceptor Sheet>

Example 2-11

10 parts by mass of oxytitanium phthalocyanine and 150 parts by mass of 4-methoxy-4-methyl-2-pentanone were mixed with each other, and then, the mixture was milled and dispersed using a sand grinding mill, thus producing a pigment dispersion fluid. Oxytitanium phthalocyanine shows intense diffraction peaks at each Bragg angle (2θ+ 0.2) of 9.3°, 10.6°, 13.2°, 15.1°, 15.7°, 16.1°, 20.8°, 23.3°, 26.3°, and 27.1° in X-ray diffraction with CuKα radiation.

50 parts by mass of 1,2-dimethoxyethane solution containing 5 mass % of polyvinyl butyral (trade name: Denka Butyral #6000C, manufactured by DENKI KAGAKU KOGYO K.K.), and 50 parts by mass of 1,2-dimethoxyethane solution containing 5 mass % of phenoxy resin (trade name: PKHH, manufactured by Union Carbide Corporation) were mixed with the pigment dispersion fluid. An appropriate amount of 1,2-dimethoxyethane was further added to obtain a coating fluid for forming a charge generation layer having a solid content concentration of 4.0%. This coating fluid for forming a charge generation layer was applied on a polyethylene terephthalate sheet having a surface deposited with aluminum and dried so as to obtain a charge generation layer having an after-drying thickness of 0.4 μm.

Next, 50 parts by mass of a mixture (CTM-1) produced by the method described in Example 1 of JP-A-2002-080432, which includes a group of compounds of geometrical isomers whose main component has the following structure and serves as a charge transport substance, 100 parts by mass of Polyester Resin (1-1) produced in Example 2-1, 8 parts by mass of an antioxidant (Irganox 1076), and 0.05 parts by mass of silicone oil as a leveling agent were mixed with 640 parts by mass of a mixed solvent of tetrahydrofuran and toluene (80 mass % tetrahydrofuran, 20 mass % toluene) to prepare the coating fluid for forming a charge transport layer.

Charge Transport Material (CTM-1)

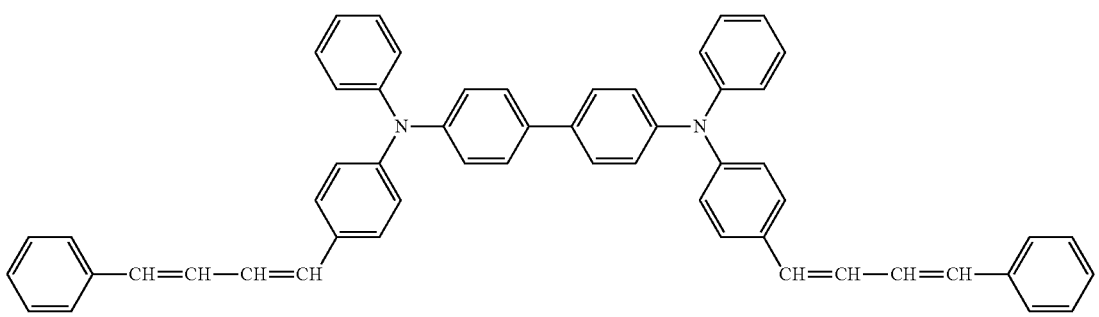 [SMILES: C(C=Cc1ccc(N(c2ccccc2)c2ccc(-c3ccc(N(c4ccccc4)c4ccc(C=CC=Cc5ccccc5)cc4)cc3)cc2)cc1)=Cc1ccccc1]

This coating fluid for forming a charge transport layer was applied on the above-described charge generation layer using an applicator to form a charge transport layer having an after-drying thickness of 25 μm, and dried at 125° C. for 20 minutes so as to prepare a photoreceptor sheet.

Example 2-12

The photoreceptor sheet was prepared in the same manner as in Example 2-11, except that Polyester Resin (1-1) was replaced with Polyester Resin (3-1) produced in Example 2-3.

Example 2-13

The photoreceptor sheet was prepared in the same manner as in Example 2-11, except that Polyester Resin (1-1) was replaced with Polyester Resin (5-1) produced in Example 2-5.

Example 2-14

The photoreceptor sheet was prepared in the same manner as in Example 2-11, except that Polyester Resin (1-1) was replaced with Polyester Resin (6-1) produced in Example 2-6.

Example 2-15

The photoreceptor sheet was prepared in the same manner as in Example 2-11, except that Polyester Resin (1-1) was replaced with Polyester Resin (7-1) produced in Example 2-7.

Example 2-16

The photoreceptor sheet was prepared in the same manner as in Example 2-11, except that Polyester Resin (1-1) was replaced with Polyester Resin (8-1) produced in Example 2-8.

Example 2-17

The photoreceptor sheet was prepared in the same manner as in Example 2-11, except that Polyester Resin (1-1) was replaced with Polyester Resin (9-1) produced in Example 2-9.

Comparative Example 2-6

The photoreceptor sheet was prepared in the same manner as in Example 2-11, except that Polyester Resin (1-1) was replaced with Polyester Resin (1-2) produced in Comparative Example 2-1.

Comparative Example 2-7

The photoreceptor sheet was prepared in the same manner as in Example 2-11, except that Polyester Resin (1-1) was replaced with Polyester Resin (1-3) produced in Comparative Example 2-2.

Reference Example 2-1

The photoreceptor sheet was prepared in the same manner as in Example 2-1, except that Polyester Resin (1-1) was replaced with Polyester Resin (11) having the following structure (viscosity-average molecular weight: 36,200) produced by the method described in Example 6 of JP-A-2006-53549.

Polyester Resin (11)

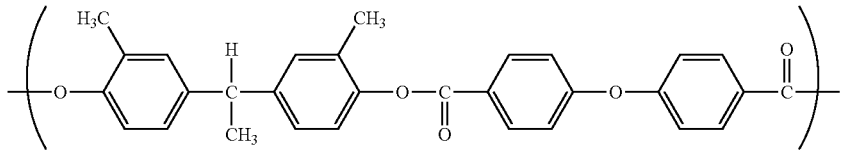

[Surface Condition of Charge Transport Layer]

The surface conditions of the photoreceptor sheets prepared in Examples 2-11 to 2-17, Comparative Examples 2-6 to 2-7, and Reference Example 2-1 were visually evaluated. In the visual evaluation, a photoreceptor sheet having an even surface was rated as "0", and a photoreceptor sheet having an uneven surface was rated as "X". Visibly recognizable unevenness appears as defects in a printed image.

[Evaluation of Electrical Properties]

The measurement was carried out using the photoreceptor sheets prepared in Examples 2-11 to 2-17, Comparative Examples 2-6 to 2-7, and Reference Example 2-1. An electrophotographic properties evaluation apparatus (The Imaging Society of Japan (1996), Electrophotography-Bases and Applications II, CORONAPUBLISHING, pp. 404-405), which complies with the measurement standard by the Imaging Society of Japan, was used in electrical properties evaluation test. Each of the photoreceptor sheets was cylindrically stuck on an aluminum drum. Then, the evaluation was carried out while conductivity between the aluminum drum and an aluminum substrate of the photoreceptor was attained. The evaluation apparatus is capable of performing cycles of charging, exposure, potential measurement, and neutralizing by rotating the drum at a constant revolution rate. To evaluate the electrical properties, the photoreceptor was charged to −700 V, and the potential holding rate (i.e. dark decay rate DDR (%)) thereof after being left for 5 seconds was measured. As the DDR value increases, the stability of the photoreceptor improves, and possibility of image defect occurrence such as fog decreases. The measurement was carried out at the temperature of 25° C. and relative humidity of 50% or below (N/N). The result is shown in Table 2-3.

TABLE 2-3

| | Polyester Resin No. | Production Formulation of Ester Oligomer | Surface Condition of Charge Transport Layer | DDR (%) |
|---|---|---|---|---|
| Example 2-11 | 1-1 | Production Example 2-1 | ○ | 90.7 |
| Example 2-12 | 3-1 | Production Example 2-2 | ○ | 91.9 |
| Example 2-13 | 5-1 | Production Example 2-1 | ○ | 90.7 |
| Example 2-14 | 6-1 | Production Example 2-3 | ○ | 91.6 |
| Example 2-15 | 7-1 | Production Example 2-2 | ○ | 89.5 |
| Example 2-16 | 8-1 | Production Example 2-2 | ○ | 89.5 |
| Example 2-17 | 9-1 | Production Example 2-2 | ○ | 91.6 |
| Comparative Example 2-6 | 1-2 | — | X | 83.1 |
| Comparative Example 2-7 | 1-3 | Production Example 2-4 | X | 85.7 |
| Reference Example 2-1 | 11 | — | ○ | 90.6 |

* Comparative Example 2-7 is a Comparative Example corresponding to claim 4.

[Wear Resistance Test]

Each of the photoreceptor films was cut into spherical pieces with a diameter of 10 cm and the wear resistance thereof was evaluated using Taber abrasion tester (manufactured by Toyo Seiki Co., Ltd.). Under a test condition of 25° C. and 50% RH atmosphere, the wear amount after 1000 turns under 500 g load was measured by comparing the masses of the photoreceptor before and after the test using a wear wheel CS-10F. A lower value indicates a greater wear resistance. The result is shown in Table 2-4.

TABLE 2-4

| | Polyester Resin No. | Production Formulation of Ester Oligomer | Wear Resistance Test (−mg) |
|---|---|---|---|
| Example 2-11 | 1-1 | Production Example 2-1 | 1.01 |
| Example 2-12 | 3-1 | Production Example 2-2 | 1.39 |
| Example 2-13 | 5-1 | Production Example 2-1 | 1.91 |
| Example 2-14 | 6-1 | Production Example 2-3 | 0.74 |
| Example 2-15 | 7-1 | Production Example 2-2 | 1.63 |
| Example 2-16 | 8-1 | Production Example 2-2 | 1.64 |
| Example 2-17 | 9-1 | Production Example 2-2 | 0.81 |
| Reference Example 2-1 | 11 | — | 2.60 |

Based on the above results, it has become apparent that a clear coating film without defects can be obtained by using a polyester resin according to the present invention, thereby enabling to provide an electrophotographic photoreceptor having excellent electrical properties and a wear resistance.

Test Example 3

[Production of Ester Oligomer]

Production Example 3-1 (Synthesis of Ester Oligomer (3-1))

1,1-Bis(4-hydroxy-3-methylphenyl)methane (7.00 g) and diphenyl ether-4,4'-dicarboxylic acid chloride (17.05 g) were weighed and put into a 500 mL four-neck reaction vessel purged with nitrogen, and dissolved in dichloromethane (160 mL). Subsequently, a mixed solution of triethylamine (6.14 g) and dichloromethane (20 mL) was added dropwise over 20 minutes to the reaction vessel that has been cooled to 0° C. to 5° C. After continuous stirring for 5 minutes, 1,1-bis(4-hydroxy-3-methylphenyl)ethane (11.90 g) and 4-hydroxybenzoate 4-hydroxyphenyl (2.00 g) were added to the reaction vessel. Thereafter, a mixed solution of triethylamine (6.14 g) and dichloromethane (20 mL) was added dropwise to the reaction vessel over 20 minutes. After continuous stirring for 1 hour, 0.1 N hydrochloric acid (170 mL) was added thereto and stirring was carried out for 30 minutes. After stirring, the organic layer was separated, and the separated organic layer was washed twice with 0.1 N hydrochloric acid (170 mL), and further washed twice with desalted water (170 mL). Thereafter, through concentration and drying, Ester Oligomer (3-1) having a phenol group at the molecular terminal was obtained.

Example 3-1 (Production of Polyester Resin (3-1) Using Ester Oligomer (3-1))

Sodium hydroxide (1.78 g) was weighed and put into a 500 mL beaker and dissolved in $H_2O$ (188 mL) with stirring. 2,3,5-Trimethylphenol (0.26 g) and benzyltriethylammonium chloride (0.08 g) were added thereto and dissolved by stirring, and this alkaline aqueous solution was transferred to a 1 L reaction tank.

Separately, a mixed solution of Ester Oligomer (3-1) (20.57 g) that has been synthesized in Production Example 3-1, diphenyl ether-4,4'-dicarboxylic acid chloride (5.53 g), and dichloromethane (135 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (179 mL) was added and stirring was continuously carried out for 9 hours. Thereafter, the stirring was stopped and the mixture was allowed to stand for 30 minutes, and then the organic layer was separated. This organic layer was washed three times with 0.1 N hydrochloric acid (235 mL), and further washed twice with desalted water (235 mL).

The washed organic layer was diluted with dichloromethane (180 mL) and poured into methanol (2000 mL), and the obtained precipitate was taken out by filtration and dried to obtain the intended Polyester Resin (3-1). The viscosity-average molecular weight (Mv) of the obtained polyester resin was 51,000. The structural formula of Polyester Resin (3-1) is shown below.

Polyester Resin (3-1)

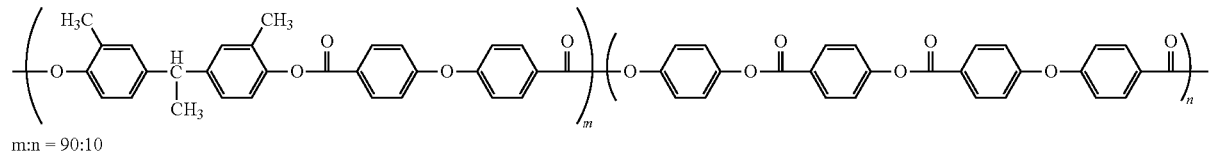

m:n = 90:10

[Measurement of Viscosity-Average Molecular Weight (Mv)]

The polyester resin was dissolved in dichloromethane to prepare a solution having a concentration C of 6.00 g/L. Using an Ubbelohde capillary viscometer having a solvent (dichloromethane) flow time $t_0$ of 136.16 seconds, the sample solution was examined for flow time t in a thermostatic water bath set at 20.0° C. The viscosity-average molecular weight (Mv) was calculated according to the following equations.

$$a=0.438 \times \eta_{sp}+1 \quad \eta_{sp}=t/t_0-1$$

$$b=100 \times \eta_{sp}/C \quad C=6.00 \text{ (g/L)}$$

$$\eta=b/a$$

$$Mv=3207 \times \eta^{1.205}$$

Example 3-2 (Production of Polyester Resin (3-1) by Solution Polymerization Method)

1,1-Bis(4-hydroxy-3-methylphenyl)ethane (3.43 g) and diphenyl ether-4,4'-dicarboxylic acid chloride (8.35 g) were weighed and put into a 500 mL four-neck reaction vessel purged with nitrogen, and dissolved in dichloromethane (80 mL). Subsequently, a mixed solution of triethylamine (3.01 g) and dichloromethane (15 mL) was added dropwise over 20 minutes to the reaction vessel that has been cooled to 5° C. to 15° C. After continuous stirring for 5 minutes, 1,1-bis(4-hydroxy-3-methylphenyl)ethane (5.83 g) and 4-hydroxybenzoate 4-hydroxyphenyl (0.98 g) were added to the reaction vessel. Thereafter, a mixed solution of triethylamine (3.29 g) and dichloromethane (15 mL) was added dropwise to the reaction vessel that has been cooled to 10° C. to 20° C. over 20 minutes. After continuous stirring for 10 minutes, 2,3,5-trimethylphenyl (0.10 g), and diphenyl ether-4,4'-dicarboxylic acid chloride (4.40 g) were added to the reaction vessel. Thereafter, a mixed solution of triethylamine (3.72 g) and dichloromethane (50 mL) was added dropwise to the reaction vessel that has been cooled to 0° C. to 10° C. over 30 minutes. After the temperature of the reaction vessel was increased to a room temperature, stirring was continuously carried out for 30 minutes. Then, dichloromethane (179 mL) was added thereto, and stirring was continuously carried out for 3 hours.

Thereafter, the solution was alkali-washed with 0.1 N aqueous sodium hydroxide solution (280 mL), and then washed three times with 0.1 N aqueous hydrochloric acid solution (280 mL), and further washed twice with desalted water (280 mL).

The washed organic layer was diluted with dichloromethane (100 mL) and poured into methanol (2000 mL), and the obtained precipitate was taken out by filtration and dried to obtain the intended Polyester Resin (3-1). The viscosity-average molecular weight (Mv) of the obtained polyester resin was 36,800.

Example 3-3 (Production of Polyester Resin (3-2) by Solution Polymerization Method)

1,1-Bis(4-hydroxy-3-methylphenyl)ethane (3.46 g) and diphenyl ether-4,4'-dicarboxylic acid chloride (8.43 g) were weighed and put into a 500 mL four-neck reaction vessel purged with nitrogen, and dissolved in dichloromethane (80 mL). Subsequently, a mixed solution of triethylamine (3.03 g) and dichloromethane (15 mL) was added dropwise over 20 minutes to the reaction vessel that has been cooled to 5° C. to 15° C. After continuous stirring for 5 minutes, 1,1-bis(4-hydroxy-3-methylphenyl)ethane (3.29 g), 1,1-bis(4-hydroxyphenyl)methane (2.14 g), and 4-hydroxybenzoate 4-hydroxyphenyl (0.99 g) were added to the reaction vessel. Thereafter, a mixed solution of triethylamine (3.32 g) and dichloromethane (15 mL) was added dropwise to the reaction vessel that has been cooled to 10° C. to 20° C. over 20 minutes. After continuous stirring for 10 minutes, 2,3,5-trimethylphenyl (0.03 g), and diphenyl ether-4,4'-dicarboxylic acid chloride (4.35 g) were added to the reaction vessel. Thereafter, a mixed solution of triethylamine (3.76 g) and dichloromethane (50 mL) was added dropwise to the reaction vessel that has been cooled to 0° C. to 10° C. over 30 minutes. After the temperature of the reaction vessel was increased to a room temperature, stirring was continuously carried out for 30 minutes. Then, dichloromethane (220 mL) was added thereto, and stirring was continuously carried out for 3 hours.

Thereafter, the solution was alkali-washed with 0.1 N aqueous sodium hydroxide solution (280 mL), and then washed three times with 0.1 N aqueous hydrochloric acid solution (280 mL), and further washed twice with desalted water (280 mL).

The washed organic layer was diluted with dichloromethane (150 mL) and poured into methanol (2000 mL), and the obtained precipitate was taken out by filtration and dried to obtain the intended Polyester Resin (3-2). The viscosity-average molecular weight (Mv) of the obtained polyester resin was 79,700.

Polyester Resin (3-2)

Comparative Example 3-1 (Production of Polyester Resin (3-1) by Interfacial Polymerization Method)

Sodium hydroxide (4.13 g) was weighed and put into a 500 mL beaker and dissolved in $H_2O$ (188 mL) with stirring. 2,3,5-Trimethylphenol (0.26 g), BP-a (9.16 g), 4-hydroxybenzoate 4-hydroxyphenyl (0.97 g), and benzyltriethylammonium chloride (0.12 g) were added thereto and dissolved by stirring, and this alkaline aqueous solution was transferred to a 1 L reaction tank.

Separately, a mixed solution of diphenyl ether-4,4'-dicarboxylic acid chloride (12.75 g), and dichloromethane (94 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (156 mL) was added and stirring was continuously carried out for 9 hours. However, during polymerization, 4-hydroxybenzoate 4-hydroxyphenyl was hydrolyzed and became hydroquinone, and oxidation of the hydroquinone turned the aqueous layer into brown causing dihydric phenol for reaction to be insufficient, so that a sufficiently extended polymer could not be obtained.

<Preparation of Photoreceptor Sheet>

Example 3-4

10 parts by mass of oxytitanium phthalocyanine and 150 parts by mass of 4-methoxy-4-methyl-2-pentanone were mixed with each other, and then, the mixture was milled and dispersed using a sand grinding mill, thus producing a pigment dispersion fluid. Oxytitanium phthalocyanine shows intense diffraction peaks at each Bragg angle (2θ±0.2) of 9.3°, 10.6°, 13.2°, 15.1°, 15.7°, 16.1°, 20.8°, 23.3°, 26.3°, and 27.1° in X-ray diffraction with CuKα radiation. 50 parts by mass of 1,2-dimethoxyethane solution containing 5 mass % of polyvinyl butyral (trade name: Denka Butyral #6000C, manufactured by DENKI KAGAKU KOGYO K.K.), and 50 parts by mass of 1,2-dimethoxyethane solution containing 5 mass % of phenoxy resin (trade name: PKHH, manufactured by Union Carbide Corporation) were mixed with the pigment dispersion fluid. An appropriate amount of 1,2-dimethoxyethane was further added to obtain a coating fluid for forming a charge generation layer having a solid content concentration of 4.0%. This coating fluid for forming a charge generation layer was applied on a polyethylene terephthalate sheet having a surface deposited with aluminum and dried so as to obtain a charge generation layer having an after-drying thickness of 0.4 μm.

Next, 50 parts by mass of a mixture (CTM-1) produced by the method described in Example 1 of JP-A-2002-080432, which includes a group of compounds of geometrical isomers whose main component has the following structure and

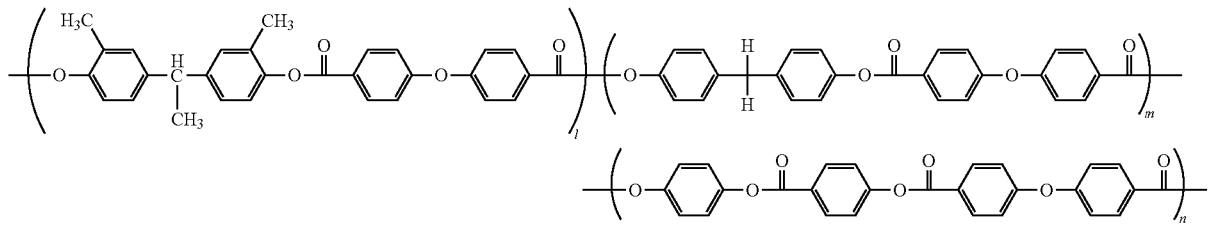

l:m:n = 65:25:10 serves as a charge transport substance, 100 parts by mass of Polyester Resin (3-1) produced in Example 3-1, 8 parts by mass of an antioxidant (Irganox 1076), and 0.05 parts by mass of silicone oil as a leveling agent were mixed with 640 parts by mass of a mixed solvent of tetrahydrofuran and toluene (80 mass % tetrahydrofuran, 20 mass % toluene) to prepare the coating fluid for forming a charge transport layer.

Charge Transport Material (CTM-1)

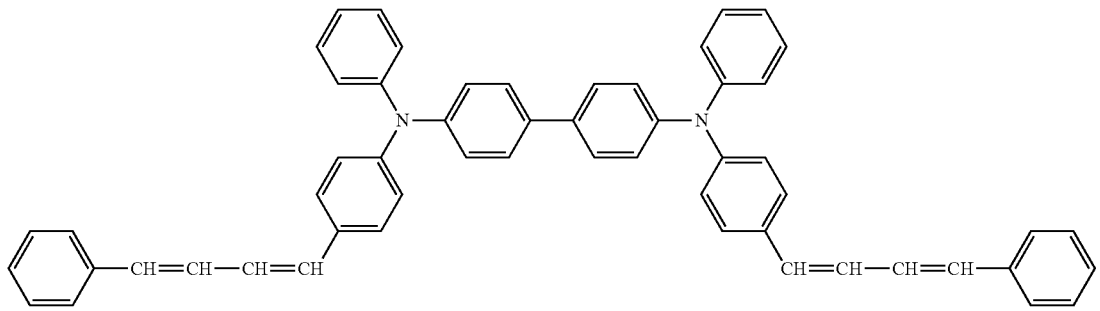 [SMILES: C(C=Cc1ccc(N(c2ccccc2)c2ccc(-c3ccc(N(c4ccccc4)c4ccc(C=CC=Cc5ccccc5)cc4)cc3)cc2)cc1)=Cc1ccccc1]

This coating fluid for forming a charge transport layer was applied on the above-described charge generation layer using an applicator to form a charge transport layer having an after-drying thickness of 25 μm, and dried at 125° C. for 20 minutes so as to prepare a photoreceptor sheet.

Example 3-5

The photoreceptor sheet was prepared in the same manner as in Example 3-1, except that Polyester Resin (3-1) was replaced with Polyester Resin (3-1) produced in Example 3-2.

Example 3-6

The photoreceptor sheet was prepared in the same manner as in Example 3-1, except that Polyester Resin (3-1) was replaced with Polyester Resin (3-2).

Comparative Example 3-1

The photoreceptor sheet was prepared in the same manner as in Example 3-1, except that Polyester Resin (3-1) was replaced with Polyester Resin (3-3) having the following structure (viscosity-average molecular weight: 36,200) produced by the method described in Example 6 of JP-A-2006-53549.

Polyester Resin (3-3)

[Evaluation of Electrical Properties]

Using an electrophotographic properties evaluation apparatus (The Imaging Society of Japan (1996), Electrophotography-Bases and Applications II, CORONAPUBLISHING, pp. 404-405), which complies with the measurement standard by the Imaging Society of Japan, electrical properties evaluation test was carried out as follows. Each of the photoreceptors was cylindrically stuck on an aluminum drum. Then, the drum was rotated at a constant revolution rate while conductivity between the aluminum drum and an aluminum substrate of the photoreceptor was attained so as to carry out the evaluation test through the cycles of charging, exposure, potential measurement, and neutralizing. In the evaluation, the initial surface potential was set to −700 V, and a surface potential (VL) at the time of irradiation with exposure light having an intensity of 2.4 μJ/cm$^2$ was measured using beams of monochromatic light having wavelengths of 780 nm and 660 nm as exposure light and neutralizing light respectively. In measuring VL, the time required from exposure to potential measurement was set at 139 ms. The irradiation energy (half-decay irradiation energy μJ/cm$^2$) at the time when the surface potential becomes half of the initial surface potential (−350 V) was measured as a sensitivity ($E_{1/2}$). The smaller the absolute value of VL indicates more satisfactory electrical properties, and the smaller value of $E_{1/2}$ indicates higher sensitivity of the photoreceptor. The measurement was carried out at the temperature of 25° C. and relative humidity of 50% or below (N/N). The result is shown in Table 3-1.

[Wear Resistance Test]

Each of the photoreceptor films was cut into spherical pieces with a diameter of 10 cm and the wear resistance thereof was evaluated using Taber abrasion tester (manufactured by Toyo Seiki Co., Ltd.). Under a test condition of 25° C. and 50% RH atmosphere, the wear amount after 1000 turns under 500 g load was measured by comparing the

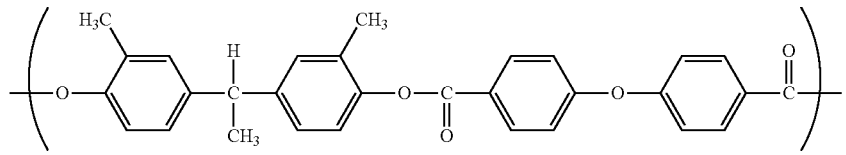

masses of the photoreceptor before and after the test using a wear wheel CS-10F. A lower value indicates a greater wear resistance. The result is shown in Table 3-1.

TABLE 3-1

| | Polyester Resin No. | Polymerization Method | Electrical Properties Test (N/N) | | Wear Resistance Test (−mg) |
|---|---|---|---|---|---|
| | | | $E_{1/2}$ (µJ/cm$^2$) | VL (−V) | |
| Example 3-4 | 3-1 | Solution Polymerization + Interfacial Polymerization | 0.378 | 68 | 0.95 |
| Example 3-5 | 3-1 | Solution Polymerization | 0.372 | 63 | 0.89 |
| Example 3-6 | 3-2 | Solution Polymerization | 0.368 | 70 | 0.28 |
| Comparative Example 3-2 | 3-3 | Interfacial Polymerization | 0.374 | 68 | 1.53 |

Based on the above results, it has become clear that an electrophotographic photoreceptor including a specific polyester resin according to the present invention exhibits not only excellent electrical properties but also an excellent wear resistance. It has also become clear that using a low molecular weight dihydric phenol having an ester bond as a raw material, the polyester resin according to the present invention that has properties that meets requirements for an electrophotographic photoreceptor can be easily produced by a solution polymerization method or a method combining a solution polymerization method an interfacial polymerization method.

Test Example 4

[Production of Ester Oligomer]

Oligomer Production Example 4-1 (Production of Ester Oligomer (4-1))

Resorcinol (3.00 g, hereinafter referred to as BP-1), 1,1-bis(4-hydroxy-3-methylphenyl)ethane (13.20 g, hereinafter referred to as BP-2), and diphenyl ether-4,4'-dicarboxylic acid chloride (16.08 g, hereinafter referred to as AC-1) were weighed and put into a 300 mL four-neck reaction vessel purged with nitrogen, and dissolved in dichloromethane (90 mL). Subsequently, a mixed solution of triethylamine (11.58 g) and dichloromethane (45 mL) was added dropwise over 30 minutes to the reaction vessel that has been cooled to 0° C. to 5° C. After continuous stirring for 1 hour, desalted water (100 mL) was added thereto and stirring was carried out for 10 minutes. After stirring, the organic layer was separated, and the separated organic layer was washed twice with 0.1 N hydrochloric acid (100 mL), and further washed twice with desalted water (100 mL). Thereafter, through concentration and drying, Ester Oligomer (4-1) having a phenol group at the molecular terminal was obtained.

Oligomer Production Example 4-2 (Production of Ester Oligomer (4-2))

Methylhydroquinone (3.00 g, hereinafter referred as BP-3), BP-2 (11.71 g), and AC-1 (14.26 g) were weighed and put into a 300 mL four-neck reaction vessel purged with nitrogen, and dissolved in dichloromethane (90 mL). Subsequently, a mixed solution of triethylamine (10.28 g) and dichloromethane (30 mL) was added dropwise over 30 minutes to the reaction vessel that has been cooled to 0° C. to 5° C. After continuous stirring for 1 hour, desalted water (100 mL) was added thereto and stirring was carried out for 10 minutes. After stirring, the organic layer was separated, and the separated organic layer was washed twice with 0.1 N hydrochloric acid (100 mL), and further washed twice with desalted water (100 mL). Thereafter, through concentration and drying, Ester Oligomer (4-2) having a phenol group at the molecular terminal was obtained.

Oligomer Production Example 4-3 (Synthesis of Ester Oligomer (4-3))

1,6-dihydroxynaphthalene (4.00 g, hereinafter referred as BP-4), BP-2 (12.10 g), and AC-1 (14.74 g) were weighed and put into a 300 mL four-neck reaction vessel purged with nitrogen, and dissolved in dichloromethane (80 mL). Subsequently, a mixed solution of triethylamine (10.62 g) and dichloromethane (45 mL) was added dropwise over 30 minutes to the reaction vessel that has been cooled to 0° C. to 5° C. After continuous stirring for 1 hour, desalted water (100 mL) was added thereto and stirring was carried out for 10 minutes. After stirring, the organic layer was separated, and the separated organic layer was washed twice with 0.1 N hydrochloric acid (100 mL), and further washed twice with desalted water (100 mL). Thereafter, through concentration and drying, Ester Oligomer (4-3) having a phenol group at the molecular terminal was obtained.

Oligomer Production Example 4-4 (Production of Ester Oligomer (4-4))

1,5-dihydroxynaphthalene (1.50 g, hereinafter referred as BP-5), BP-2 (12.86 g), and AC-1 (12.28 g) were weighed and put into a 300 mL four-neck reaction vessel purged with nitrogen, and dissolved in dichloromethane (80 mL). Subsequently, a mixed solution of triethylamine (8.84 g) and dichloromethane (40 mL) was added dropwise over 30 minutes to the reaction vessel that has been cooled to 0° C. to 5° C. After continuous stirring for 1 hour, desalted water (100 mL) was added thereto and stirring was carried out for 10 minutes. After stirring, the organic layer was separated, and the separated organic layer was washed twice with 0.1 N hydrochloric acid (100 mL), and further washed twice with desalted water (100 mL). Thereafter, through concentration and drying, Ester Oligomer (4-4) having a phenol group at the molecular terminal was obtained.

[Production of Polyester Resin]

Polyester Production Example 4-1 (Production of Polyester Resin (4-1))

Sodium hydroxide (1.57 g) was weighed and put into a 500 mL beaker and dissolved in H$_2$O (188 mL) with stirring. 2,3,5-Trimethylphenol (0.21 g) and benzyltriethylammonium chloride (0.11 g) were added thereto and dissolved by stirring, and this alkaline aqueous solution was transferred to a 1 L reaction tank.

Separately, a mixed solution of Ester Oligomer (4-1) (16.13 g) that has been synthesized in Oligomer Production Example 4-1, AC-1 (4.87 g), and dichloromethane (107 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (166 mL) was added thereto and stirring was continuously carried out for 9 hours. Thereafter, the stirring was stopped and the mixture was allowed to stand for 30 minutes, and then the organic layer was separated. This organic layer was washed three times with 0.1 N hydrochloric acid (205 mL), and further washed twice with desalted water (205 mL). The washed organic layer was diluted with dichloromethane (100 mL) and poured into methanol (1800 mL), and the obtained precipitate was taken out by filtration and dried to obtain the intended Polyester Resin (4-1). The viscosity-average molecular weight (Mv) of the obtained polyester resin was 44,200. The structural formula of Polyester Resin (4-1) is shown below.

Polyester Resin (4-1)

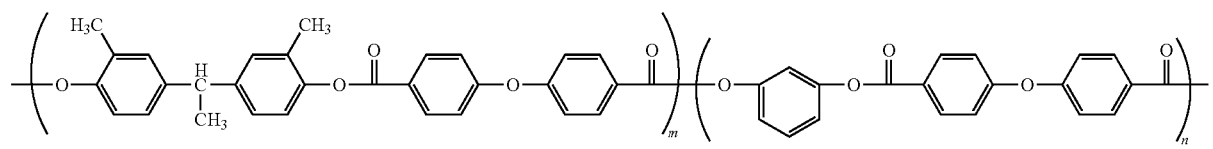

m:n = 67:33

[Measurement of Viscosity-Average Molecular Weight (Mv)]

The polyester resin was dissolved in dichloromethane to prepare a solution having a concentration C of 6.00 g/L. Using an Ubbelohde capillary viscometer having a solvent (dichloromethane) flow time to of 136.16 seconds, the sample solution was examined for flow time t in a thermostatic water bath set at 20.0° C. The viscosity-average molecular weight (Mv) was calculated according to the following equations.

$a = 0.438 \times \eta_{sp} + 1 \quad \eta_{sp} = t/t_0 - 1$ $b = 100 \times \eta_{sp}/C \quad C = 6.00 \text{ (g/L)}$ $\eta = b/a$ $Mv = 3207 \times \eta^{1.205}$ Polyester Production Example 4-2 (Production of Polyester Resin (4-2))

Sodium hydroxide (1.55 g) was weighed and put into a 500 mL beaker and dissolved in H₂O (188 mL) with stirring. 2,3,5-Trimethylphenol (0.21 g) and benzyltriethylammonium chloride (0.11 g) were added thereto and dissolved by stirring, and this alkaline aqueous solution was transferred to a 1 L reaction tank.

Separately, a mixed solution of Ester Oligomer (4-2) (16.18 g) that has been synthesized in Oligomer Production Example 4-2, AC-1 (4.81 g), and dichloromethane (107 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (166 mL) was added thereto and stirring was continuously carried out for 9 hours. Thereafter, the stirring was stopped and the mixture was allowed to stand for 30 minutes, and then the organic layer was separated. This organic layer was washed three times with 0.1 N hydrochloric acid (205 mL), and further washed twice with desalted water (205 mL).

The washed organic layer was diluted with dichloromethane (100 mL) and poured into methanol (1800 mL), and the obtained precipitate was taken out by filtration and dried to obtain the intended Polyester Resin (4-2). The viscosity-average molecular weight (Mv) of the obtained polyester resin was 54,200. The structural formula of Polyester Resin (4-2) is shown below.

Polyester Resin (4-2)

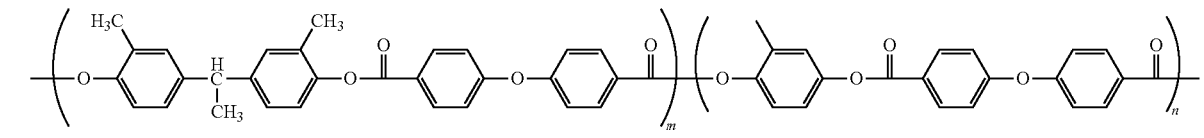

m:n = 67:33

Polyester Production Example 4-3 (Production of Polyester Resin (4-3))

Sodium hydroxide (1.52 g) was weighed and put into a 500 mL beaker and dissolved in H₂O (188 mL) with stirring. 2,3,5-Trimethylphenol (0.24 g) and benzyltriethylammonium chloride (0.11 g) were added thereto and dissolved by stirring, and this alkaline aqueous solution was transferred to a 1 L reaction tank.

Separately, a mixed solution of Ester Oligomer (4-3) (16.22 g) that has been synthesized in Oligomer Production Example 4-3, AC-1 (4.70 g), and dichloromethane (107 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (176 mL) was added thereto and stirring was continuously carried out for 9 hours. Thereafter, the stirring was stopped and the mixture was allowed to stand for 30 minutes, and then the organic layer was separated. This organic layer was washed three times with 0.1 N hydrochloric acid (210 mL), and further washed twice with desalted water (210 mL).

The washed organic layer was diluted with dichloromethane (100 mL) and poured into methanol (1800 mL), and the obtained precipitate was taken out by filtration and dried to obtain the intended Polyester Resin (4-3). The viscosity-average molecular weight (Mv) of the obtained polyester resin was 39,000. The structural formula of Polyester Resin (4-3) is shown below.

Polyester Resin (4-3)

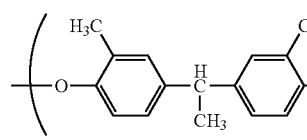

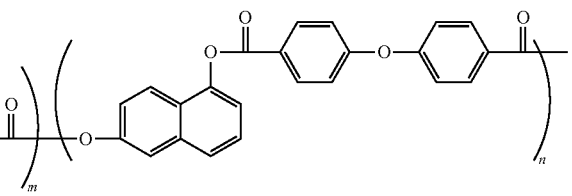

m:n = 67:33

Polyester Production Example 4-4 (Production of Polyester Resin (4-4))

Sodium hydroxide (1.47 g) was weighed and put into a 500 mL beaker and dissolved in $H_2O$ (188 mL) with stirring. 2,3,5-Trimethylphenol (0.25 g) and benzyltriethylammonium chloride (0.11 g) were added thereto and dissolved by stirring, and this alkaline aqueous solution was transferred to a 1 L reaction tank.

Separately, a mixed solution of Ester Oligomer (4-4) (16.32 g) that has been synthesized in Oligomer Production Example 4-4, AC-1 (4.56 g), and dichloromethane (107 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (176 mL) was added thereto and stirring was continuously carried out for 9 hours. Thereafter, the stirring was stopped and the mixture was allowed to stand for 30 minutes, and then the organic layer was separated. This organic layer was washed three times with 0.1 N hydrochloric acid (210 mL), and further washed twice with desalted water (210 mL).

The washed organic layer was diluted with dichloromethane (100 mL) and poured into methanol (1800 mL), and the obtained precipitate was taken out by filtration and dried to obtain the intended Polyester Resin (4-4). The viscosity-average molecular weight (Mv) of the obtained polyester resin was 41,300. The structural formula of Polyester Resin (4-4) is shown below.

Polyester Resin (4-4)

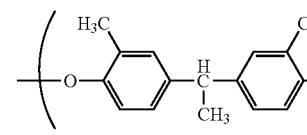

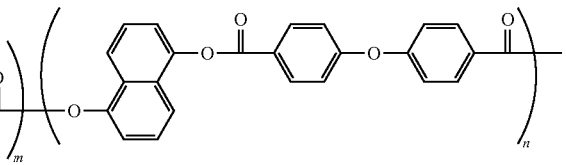

m:n = 67:33

Polyester Production Example 4-5 (Production of Polyester Resin (4-5))

BP-2 (13.89 g), 2,3,5-trimethylphenol (0.067 g) and AC-1 (24.33 g) were weighed and put into a 1000 mL four-neck reaction vessel purged with nitrogen, and dissolved in dichloromethane (120 mL). Subsequently, a mixed solution of triethylamine (11.60 g) and dichloromethane (30 mL) was added dropwise over 20 minutes to the reaction vessel that has been cooled to 5° C. to 15° C. and thereafter stirring was continuously carried out for 10 minutes to generate ester oligomer.

Subsequently, hydroquinone (2.71 g, hereinafter BP-6) was added to the reaction vessel. Thereafter, a mixed solution of triethylamine (6.13 g) and dichloromethane (50 mL) was added dropwise to the reaction vessel that has been cooled to 5° C. to 15° C. over 20 minutes. While maintaining the temperature inside the reaction system at 15° C. to 23° C., stirring was continuously carried out for 0.5 hours, the mixed solution was diluted with dichloromethane (230 mL), and stirring was further carried out for 0.5 hours. Subsequently, the solution was further diluted with dichloromethane (230 mL), and stirring was carried out for 4 hours. Thereafter, the solution was washed with desalted water (490 mL), and then washed three times with 0.2 N hydrochloric acid (490 mL), and further washed twice with desalted water (490 mL).

The washed organic layer was diluted with dichloromethane (300 mL) and poured into methanol (4000 mL), and the obtained precipitate was taken out by filtration and dried to obtain the intended Polyester Resin (4-5). The viscosity-average molecular weight (Mv) of the obtained polyester resin was 55,000. The structural formula of Polyester Resin (4-5) is shown below.

Polyester Resin (4-5)

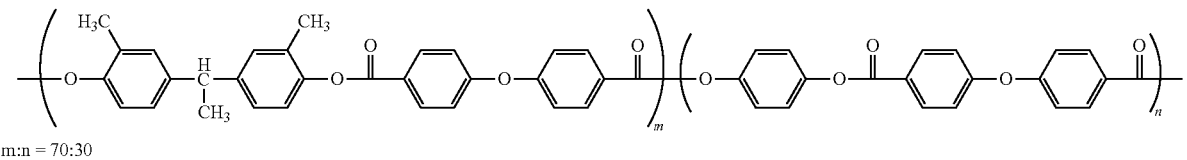

m:n = 70:30

Polyester Production Example 4-6 (Synthesis of Polyester Resin (4-6))

BP-2 (7.63 g), 2,3,5-trimethylphenol (0.092 g), and AC-1 (13.42 g) were weighed and put into a 500 mL four-neck reaction vessel purged with nitrogen, and dissolved in dichloromethane (80 mL). Subsequently, a mixed solution of triethylamine (6.42 g) and dichloromethane (20 mL) was added dropwise over 20 minutes to the reaction vessel that has been cooled to 5° C. to 15° C., and thereafter stirring was continuously carried out for 10 minutes to generate ester oligomer.

Subsequently, 2,6-dihydroxynaphthalene (2.16 g, hereinafter referred to as BP-7) was added to the reaction vessel. Thereafter, a mixed solution of triethylamine (3.41 g) and dichloromethane (30 mL) was added dropwise to the reaction vessel that has been cooled to 5° C. to 15° C. over 20 minutes. While maintaining the temperature inside the reaction system at 15° C. to 23° C., stirring was continuously carried out for 0.5 hours, the mixed solution was diluted with dichloromethane (90 mL), and stirring was further carried out for 0.5 hours. Subsequently, the solution was further diluted with dichloromethane (80 mL), and stirring was carried out for 4 hours. Thereafter, the solution was washed with desalted water (200 mL), and then washed three times with 0.2 N hydrochloric acid (200 mL), and further washed twice with desalted water (200 mL).

The washed organic layer was diluted with dichloromethane (150 mL) and poured into methanol (2000 mL), and the obtained precipitate was taken out by filtration and dried to obtain the intended Polyester Resin (4-6). The viscosity-average molecular weight (Mv) of the obtained polyester resin was 40,700. The structural formula of Polyester Resin (4-6) is shown below.

Polyester Resin (4-6)

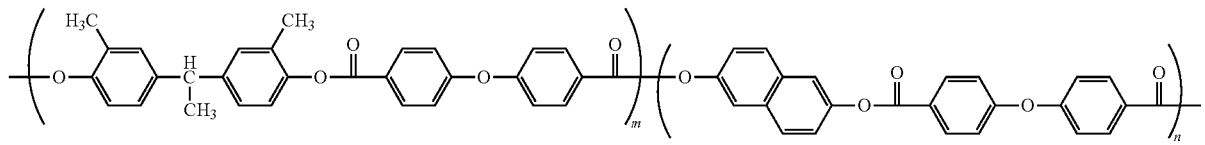

m:n = 70:30

Polyester Production Example 4-7 (Synthesis of Polyester Resin (4-7))

The Polyester Resin (4-7) was obtained in the same manner as in Polyester Production Example 4-6, except that 2,6-dihydroxynaphthalene (BP-7) in Polyester Production Example 4-6 was replaced with 2,7-dihydroxynaphthalene (hereinafter, referred to as BP-8). The viscosity-average molecular weight (Mv) of the obtained polyester resin was 35,500. The structural formula of Polyester Resin (4-7) is shown below.

Polyester Resin (4-7)

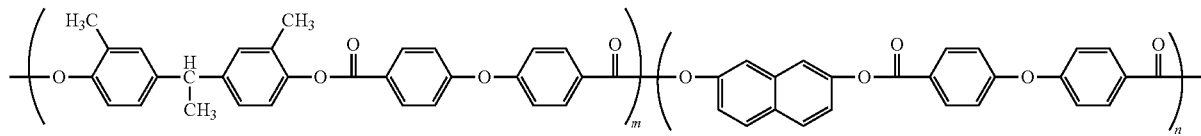

m:n = 70:30

Polyester Production Example 4-8 (Production of Polyester Resin (4-8) by Interfacial Polymerization)

Sodium hydroxide (4.23 g) was weighed and put into a 500 mL beaker and dissolved in $H_2O$ (188 mL) with stirring. 2,3,5-Trimethylphenol (0.26 g), BP-2 (10.15 g), BP-6 (0.47 g), and benzyltriethylammonium chloride (0.12 g) were added thereto and dissolved by stirring, and this alkaline aqueous solution was transferred to a 1 L reaction tank.

Separately, a mixed solution of AC-1 (13.08 g) and dichloromethane (94 mL) was transferred to a dropping funnel.

While maintaining the external temperature of the reaction tank at 20° C. and stirring the alkaline aqueous solution inside the reaction tank, the dichloromethane solution was added dropwise from the dropping funnel over 1 hour. After continuous stirring for 1 hour, dichloromethane (156 mL) was added and stirring was continuously carried out for 9 hours. However, during polymerization, hydroquinone was oxidized and turned the aqueous layer into brown causing dihydric phenol for reaction to be insufficient, so that a sufficiently extended polymer could not be obtained.

<Preparation of Photoreceptor Sheet>

Example 4-1

10 parts by mass of oxytitanium phthalocyanine and 150 parts by mass of 4-methoxy-4-methyl-2-pentanone were mixed with each other, and then, the mixture was milled and dispersed using a sand grinding mill, thus producing a pigment dispersion fluid. Oxytitanium phthalocyanine shows intense diffraction peaks at each Bragg angle (2θ±0.2) of 9.3°, 10.6°, 13.2°, 15.1°, 15.7°, 16.1°, 20.8°, 23.3°, 26.3°, and 27.1° in X-ray diffraction with CuKα radiation.

50 parts by mass of 1,2-dimethoxyethane solution containing 5 mass % of polyvinyl butyral (trade name: Denka Butyral #6000C, manufactured by DENKI KAGAKU KOGYO K.K.), and 50 parts by mass of 1,2-dimethoxyethane solution containing 5 mass % of phenoxy resin (trade name: PKHH, manufactured by Union Carbide Corporation) were mixed with the pigment dispersion fluid. An appropriate amount of 1,2-dimethoxyethane was further added to obtain a coating fluid for forming a charge generation layer having a solid content concentration of 4.0%. This coating fluid for forming a charge generation layer was applied on a polyethylene terephthalate sheet having a surface deposited with aluminum and dried so as to obtain a charge generation layer having an after-drying thickness of 0.4 μm.

Next, 50 parts by mass of a mixture (CTM-1) produced by the method described in Example 1 of JP-A-2002-080432, which includes a group of compounds of geometrical isomers whose main component has the following structure and serves as a charge transport substance, 100 parts by mass of Polyester Resin (4-1), 8 parts by mass of an antioxidant (Irganox 1076), and 0.05 parts by mass of silicone oil as a leveling agent were mixed with 640 parts by mass of a mixed solvent of tetrahydrofuran and toluene (80 mass % tetrahydrofuran, 20 mass % toluene) to prepare the coating fluid for forming a charge transport layer.

Charge Transport Material (CTM-1)

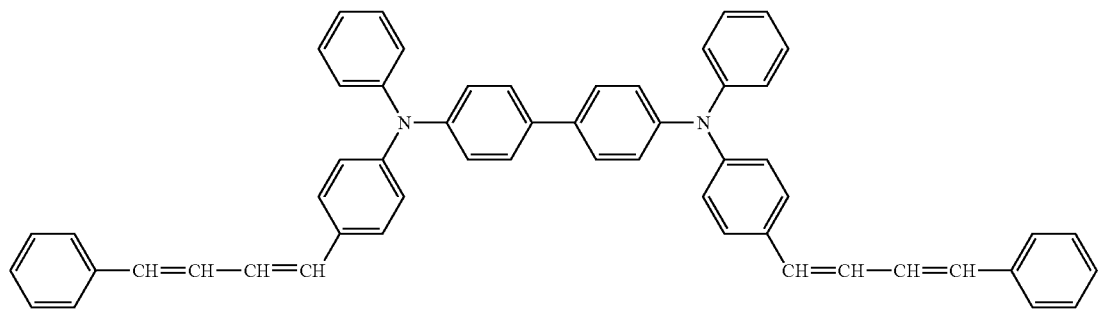 [SMILES: C(C=Cc1ccc(N(c2ccccc2)c2ccc(-c3ccc(N(c4ccccc4)c4ccc(C=CC=Cc5ccccc5)cc4)cc3)cc2)cc1)=Cc1ccccc1]

This coating fluid for forming a charge transport layer was applied on the above-described charge generation layer using an applicator to form a charge transport layer having an after-drying thickness of 25 μm, and dried at 125° C. for 20 minutes so as to prepare a photoreceptor sheet.

Example 4-2

The photoreceptor sheet was prepared in the same manner as in Example 4-1, except that Polyester Resin (4-1) was replaced with Polyester Resin (4-2).

Example 4-3

The photoreceptor sheet was prepared in the same manner as in Example 4-1, except that Polyester Resin (4-1) was replaced with Polyester Resin (4-3).

Example 4-4

The photoreceptor sheet was prepared in the same manner as in Example 4-1, except that Polyester Resin (4-1) was replaced with Polyester Resin (4-4).

Example 4-5

The photoreceptor sheet was prepared in the same manner as in Example 4-1, except that Polyester Resin (4-1) was replaced with Polyester Resin (4-5).

Example 4-6

The photoreceptor sheet was prepared in the same manner as in Example 4-1, except that Polyester Resin (4-1) was replaced with Polyester Resin (4-6).

Example 4-7

The photoreceptor sheet was prepared in the same manner as in Example 4-1, except that Polyester Resin (4-1) was replaced with Polyester Resin (4-7).

Comparative Example 4-1

The photoreceptor sheet was prepared in the same manner as in Example 4-1, except that Polyester Resin (4-1) was replaced with Polyester Resin (4-9) having the following structure (viscosity-average molecular weight: 36,200) produced by the method described in Example 6 of JP-A-2006-53549.

Polyester Resin (4-9)

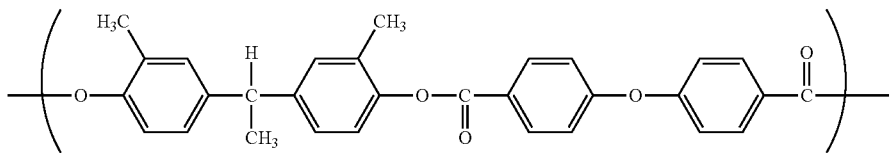

[Evaluation of Electrical Properties]

Using an electrophotographic properties evaluation apparatus (The Imaging Society of Japan (1996), Electrophotography-Bases and Applications II, CORONAPUBLISHING, pp. 404-405), which complies with the measurement standard by the Imaging Society of Japan, electrical properties evaluation test was carried out as follows. Each of the photoreceptors was cylindrically stuck on an aluminum drum. Then, the drum was rotated at a constant revolution rate while conductivity between the aluminum drum and an aluminum substrate of the photoreceptor was attained so as to carry out the evaluation test through the cycles of charging, exposure, potential measurement, and neutralizing. In the evaluation, the initial surface potential was set to −700 V, and a surface potential (VL) at the time of irradiation with exposure light having an intensity of 2.4 μJ/cm² was measured using beams of monochromatic light having wavelengths of 780 nm and 660 nm as exposure light and neutralizing light respectively. In measuring VL, the time required from exposure to potential measurement was set at 139 ms. The irradiation energy (half-decay irradiation energy μJ/cm²) at the time when the surface potential becomes half of the initial surface potential (−350 V) was measured as a sensitivity ($E_{1/2}$). The smaller the absolute value of VL indicates more excellent electrical properties, and the smaller value of $E_{1/2}$ indicates higher sensitivity of the photoreceptor. The measurement was carried out at the temperature of 25° C. and relative humidity of 50% or below (N/N). The result is shown in Table 4-1.

TABLE 4-1

| | | Polyester Resin | | Electrical Properties Test (N/N) | |
|---|---|---|---|---|---|
| | No. | Polymerization Method | Bisphenol Used (molar ratio) | $E_{1/2}$ (μJ/cm²) | VL (−V) |
| Example 4-1 | 4-1 | Solution Polymerization + Interfacial Polymerization | BP-2:BP-1 = 67:33 | 0.351 | 61 |
| Example 4-2 | 4-2 | Solution Polymerization + Interfacial Polymerization | BP-2:BP-3 = 67:33 | 0.375 | 105 |
| Example 4-3 | 4-3 | Solution Polymerization + Interfacial Polymerization | BP-2:BP-4 = 67:33 | 0.350 | 59 |
| Example 4-4 | 4-4 | Solution Polymerization + Interfacial Polymerization | BP-2:BP-5 = 85:15 | 0.358 | 46 |
| Example 4-5 | 4-5 | Solution Polymerization | BP-2:BP-6 = 70:30 | 0.351 | 46 |
| Example 4-6 | 4-6 | Solution Polymerization | BP-2:BP-7 = 70:30 | 0.398 | 90 |
| Example 4-7 | 4-7 | Solution Polymerization | BP-2:BP-8 = 70:30 | 0.383 | 74 |
| Comparative Example 4-1 | 4-9 | Interfacial Polymerization | BP-2 = 100 | 0.383 | 70 |

[Wear Resistance Test]

Each of the photoreceptor films was cut into spherical pieces with a diameter of 10 cm and the wear resistance thereof was evaluated using Taber abrasion tester (manufactured by Toyo Seiki Co., Ltd.). Under a test condition of 25° C. and 50% RH atmosphere, the wear amount after 1000 turns under 500 g load was measured by comparing the masses of the photoreceptor before and after the test using a wear wheel CS-10F. A lower value indicates a greater wear resistance. The result is shown in Table 4-2.

TABLE 4-2

| | Polyester Resin No. | Wear Resistance Test (−mg) |
|---|---|---|
| Example 4-2 | 4-2 | 2.41 |
| Example 4-3 | 4-3 | 2.42 |
| Example 4-5 | 4-5 | 1.39 |
| Example 4-6 | 4-6 | 1.63 |
| Example 4-7 | 4-7 | 1.64 |
| Comparative Example 4-1 | 4-9 | 2.60 |

Based on the above results, it has become clear that an electrophotographic photoreceptor including a specific polyester resin according to the present invention exhibits not only excellent electrical properties but also an excellent wear resistance. It has also become clear that using a readily oxidizable dihydric phenol, the polyester resin according to the present invention that has properties that meets requirements for an electrophotographic photoreceptor can be easily produced by a solution polymerization method or a method combining a solution polymerization method and an interfacial polymerization method.

Although the invention has been described in detail using specific embodiments, it will be apparent to those skilled in the art that various modifications and variations are possible without departing from the spirit and scope of the invention. This application is based on a Japanese patent application (Japanese Patent Application No. 2015-060011) filed on Mar. 23, 2015, Japanese patent application (Japanese Patent Application No. 2015-064865) filed on Mar. 26, 2015, Japanese patent application (Japanese Patent Application No. 2015-212163) filed on Oct. 28, 2015, and Japanese patent application (Japanese Patent Application No. 2015-233304) filed on Nov. 30, 2015, the entirety of which is incorporated by reference.

REFERENCE SIGNS LIST

1 Electrophotographic Photoreceptor
2 Charging Device (Charging Roller)
3 Exposure Device
4 Developing Device
5 Transfer Device
6 Cleaning Device
7 Fixing Device
41 Developing Tank
42 Agitator
43 Feed Roller
44 Developing Roller
45 Control Member
71 Upper Fixing Member (Pressurizing Roller)
72 Lower Fixing Member (Fixing Roller)
73 Heating Device
T: Toner
P: Recording Paper

The invention claimed is:

1. An electrophotographic photoreceptor comprising:
a conductive support; and
a photosensitive layer disposed on the conductive support,
wherein the photosensitive layer comprises a polyester resin comprising a dihydric phenol residue and a dicarboxylic acid residue,
the dihydric phenol residue comprises: at least one dihydric phenol residue selected from the group consisting of dihydric phenol residues represented by Formula (1) to Formula (3); and a dihydric phenol residue represented by Formula (4), and
a content of a total of the at least one dihydric phenol residue selected from the group consisting of the dihydric phenol residues represented by Formula (1) to Formula (3) is 15 mol % or more with respect to an entire dihydric phenol residue in the polyester resin:

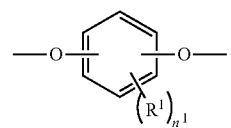

Formula (1)

wherein in Formula (1), $R^1$ represents a hydrogen atom, an alkyl group having 1 to 20 carbon atoms which may have a substituent, an alkoxy group, an aromatic group that may be substituted, or a halogen group, and $n^1$ is an integer of 0 to 4,

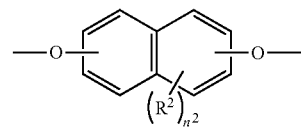

Formula (2)

wherein in Formula (2), $R^2$ represents a hydrogen atom, an alkyl group having 1 to 20 carbon atoms which may have a substituent, an alkoxy group, an aromatic group that may be substituted, or a halogen group, and $n^2$ is an integer of 0 to 6,

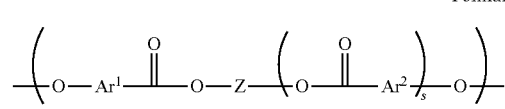

Formula (3)

wherein in Formula (3), $Ar^1$ and $Ar^2$ each independently represent an arylene group having 6 to 16 carbon atoms which may have a substituent; and Z is an arylene group that may have a substituent, and s is an integer of 0 or 1,

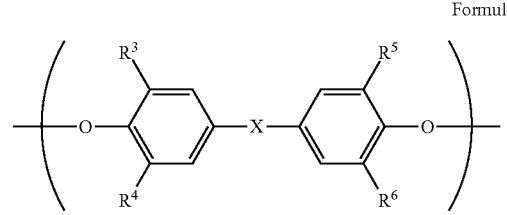

Formula (4)

wherein in Formula (4), $R^3$ to $R^6$ each independently represent any one of a hydrogen atom, an alkyl group having 1 to 20 carbon atoms which may have a substituent, an alkoxy group, an aromatic group that may be substituted, or a halogen group; X represents a single bond, —$CR^7R^8$—, O, CO, or S; and $R^7$ and $R^8$ each independently represent a hydrogen atom or an alkyl group having 1 to 10 carbon atoms, or $R^7$ and $R^8$ taken together represent a cycloalkylidene group having 5 to 10 carbon atoms together with the carbon atom bonded to $R^7$ and $R^8$.

2. The electrophotographic photoreceptor according to claim 1,
wherein the content of the total of the at least one dihydric phenol residue selected from the group consisting of the dihydric phenol residues represented by Formula (1) to Formula (3) is 15 to 80 mol % with respect to the entire dihydric phenol residue in the polyester resin.

3. The electrophotographic photoreceptor according to claim 1,
wherein the dicarboxylic acid residue in the polyester resin is represented by Formula (5):

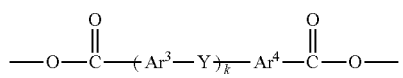

Formula (5)

wherein in Formula (5), Ara and $Ar^4$ each independently represent an arylene group that may have a substituent; Y represents a single bond, an oxygen atom, a sulfur atom, or a divalent organic residue having a structure represented by Formula (6) or Formula (7); $R^9$ and $R^{10}$ in Formula (6) each independently represent a hydrogen atom, an alkyl group, or an aryl group, or $R^9$ and $R^{10}$ taken together represent a cycloalkylidene group together with the carbon atom bonded to $R^9$ and $R^{10}$; $R^{11}$ in Formula (7) is an alkylene group, an arylene group, or a group represented by Formula (8); $R^{12}$ and $R^{13}$ in Formula (8) each independently represent an alkylene group, and $Ar^5$ represents an arylene group; and k represents an integer of 0 to 5,

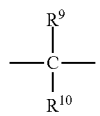

Formula (6)

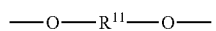

Formula (7)

Formula (8)

4. The electrophotographic photoreceptor according to claim 1, wherein $R^1$ in Formula (1) represents an alkyl group having 1 to 6 carbon atoms, an alkoxy group having 1 to 6 carbon atoms, or an unsubstituted aromatic group.

5. The electrophotographic photoreceptor according to claim 1,
wherein $n^1$ in Formula (1) is an integer of 0 or 1.

6. The electrophotographic photoreceptor according to claim 1,
wherein $R^2$ in Formula (2) represents an alkyl group having 1 to 6 carbon atoms or an alkoxy group having 1 to 6 carbon atoms.

7. The electrophotographic photoreceptor according to claim 1,
wherein $n^2$ in Formula (2) is an integer of 0.

8. The electrophotographic photoreceptor according to claim 1,
wherein the content of the total of the at least one dihydric phenol residue selected from the group consisting of the dihydric phenol residues represented by Formula (1) to Formula (3) is 15 to 60 mol % with respect to the entire dihydric phenol residue in the polyester resin.

9. The electrophotographic photoreceptor according to claim 1,
wherein the content of the total of the at least one dihydric phenol residue selected from the group consisting of the dihydric phenol residues represented by Formula (1) to Formula (3) is 15 to 40 mol % with respect to the entire dihydric phenol residue in the polyester resin.

10. The electrophotographic photoreceptor according to claim 1,
wherein a total amount of nitrogen included in the polyester resin is 3000 ppm or less.

11. The electrophotographic photoreceptor according to claim 1,
wherein an amount of free dihydric phenol included in the polyester resin is from 0.001 to 100 ppm.

12. The electrophotographic photoreceptor according to claim 1,
wherein an amount of free dihydric phenol included in the polyester resin is from 0.01 to 50 ppm.

13. The electrophotographic photoreceptor according to claim 1, wherein the polyester resin is selected from the group consisting of Polyester Resin (4-5), Polyester Resin (4-6), and Polyester Resin (4-7):

Polyester Resin (4-5)

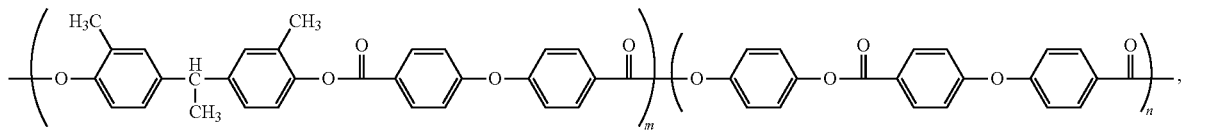

m:n = 70:30

Polyester Resin (4-6)

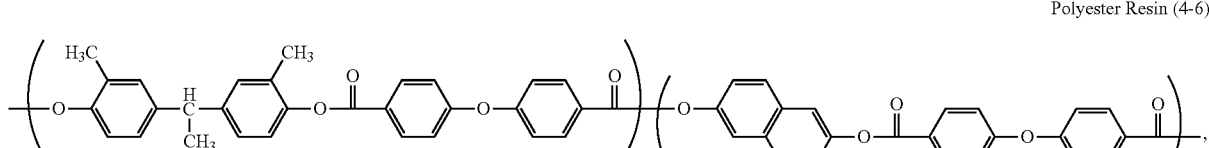

m:n = 70:30

Polyester Resin (4-7)

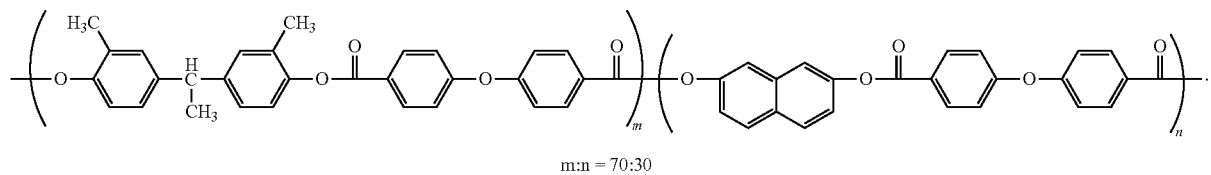

m:n = 70:30

14. The electrophotographic photoreceptor according to claim 1, wherein the polyester resin is Polyester Resin (4-5):

Polyester Resin (4-5)

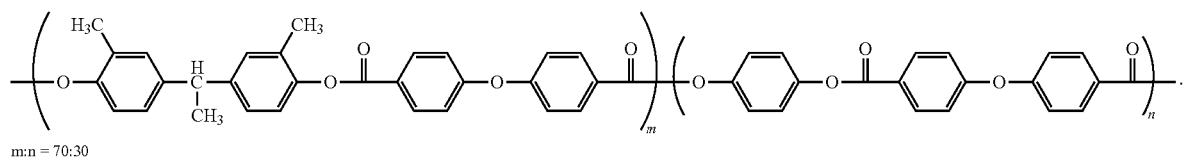

m:n = 70:30

15. The electrophotographic photoreceptor according to claim 1, wherein the polyester resin is Polyester Resin (4-6):

Polyester Resin (4-6)

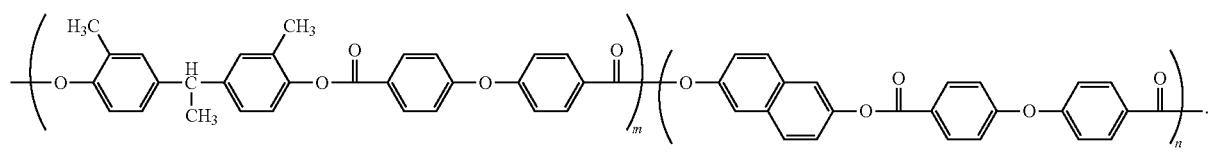

m:n = 70:30

16. The electrophotographic photoreceptor according to claim 1, wherein the polyester resin is Polyester Resin (4-7):

Polyester Resin (4-7)

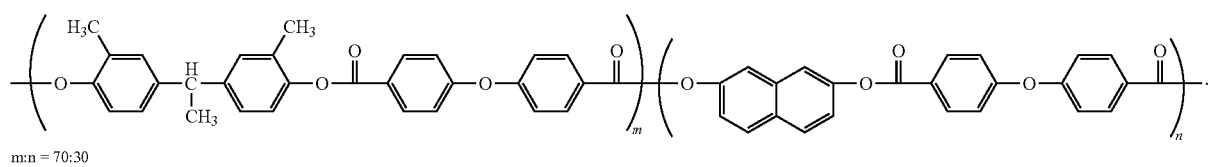

m:n = 70:30

\* \* \* \* \*

UNITED STATES PATENT AND TRADEMARK OFFICE
CERTIFICATE OF CORRECTION

PATENT NO. : 10,725,391 B2
APPLICATION NO. : 15/713126
DATED : July 28, 2020
INVENTOR(S) : Atsushi Yoshizawa et al.

Page 1 of 1

It is certified that error appears in the above-identified patent and that said Letters Patent is hereby corrected as shown below:

In the Claims

Column 137, Line 15, Claim 3, "wherein in Formula (5), Ara and $Ar^4$ each independently" should read -- wherein in Formula (5), $Ar^3$ and $Ar^4$ each independently --.

Signed and Sealed this
Thirteenth Day of October, 2020

Andrei Iancu
*Director of the United States Patent and Trademark Office*